US012706687B2

(12) United States Patent
Gan et al.

(10) Patent No.: US 12,706,687 B2
(45) Date of Patent: Aug. 11, 2026

(54) COMMUNICATION METHOD AND APPARATUS

(71) Applicant: HUAWEI TECHNOLOGIES CO., LTD., Shenzhen (CN)

(72) Inventors: Ming Gan, Shenzhen (CN); Jia Jia, Dongguan (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/624,974

(22) Filed: Apr. 2, 2024

(65) Prior Publication Data

US 2024/0333418 A1 Oct. 3, 2024

Related U.S. Application Data

(63) Continuation of application No. 17/150,869, filed on Jan. 15, 2021, now Pat. No. 11,984,972, which is a (Continued)

(30) Foreign Application Priority Data

Jul. 17, 2018 (CN) ......................... 201810786769.9

(51) Int. Cl.
*H04L 1/00* (2006.01)
*H04L 5/00* (2006.01)

(52) U.S. Cl.
CPC .......... *H04L 1/0009* (2013.01); *H04L 5/0053* (2013.01)

(58) Field of Classification Search
CPC ............................ H04L 1/0009; H04L 5/0053
(Continued)

(56) References Cited

U.S. PATENT DOCUMENTS

2016/0211961 A1* 7/2016 Azizi ...................... H04L 5/001
2016/0353414 A1 12/2016 Choi et al.
(Continued)

FOREIGN PATENT DOCUMENTS

CN 101155406 A 4/2008
CN 106664165 A 5/2017
(Continued)

OTHER PUBLICATIONS

IEEE P802.11ax™/D3.0, Jun. 2018 (Year: 2018).*
(Continued)

*Primary Examiner* — Intekhaab A Siddiquee
(74) *Attorney, Agent, or Firm* — Leydig, Voit & Mayer, Ltd.

(57) ABSTRACT

A method includes: generating, by an access point AP, a first frame, where the first frame includes P station information fields, each of the P station information fields corresponds to one resource unit RU allocated to a first station STA, P is a positive integer greater than 1, each station information field further includes end indication information, and the end indication information is used to indicate whether the station information field is the last station information field in the P station information fields. The AP may allocate P RUs to the first STA, and indicate the P RUs to the first STA through the P station information fields in the first frame. Therefore, a resource allocation manner of the AP can be more flexible, a frequency selective gain of an OFDMA system can be effectively improved, and a system capacity can be increased.

18 Claims, 30 Drawing Sheets

Related U.S. Application Data continuation of application No. PCT/CN2019/096196, filed on Jul. 16, 2019.

(58) Field of Classification Search
USPC .......................................................... 370/329
See application file for complete search history.

(56) References Cited

U.S. PATENT DOCUMENTS

| | | | |
|---|---|---|---|
| 2016/0366254 A1 | 12/2016 | Asterjadhi et al. | |
| 2017/0041929 A1 | 2/2017 | Noh et al. | |
| 2019/0260531 A1 | 8/2019 | Chen et al. | |
| 2020/0007265 A1* | 1/2020 | Min | H04L 1/0003 |
| 2021/0144696 A1* | 5/2021 | Cariou | H04B 7/0452 |

FOREIGN PATENT DOCUMENTS

| | | |
|---|---|---|
| CN | 107006006 A | 8/2017 |
| CN | 107079458 A | 8/2017 |
| CN | 107431676 A | 12/2017 |
| EP | 3337074 A1 | 6/2018 |
| WO | 2018094214 A1 | 5/2018 |

OTHER PUBLICATIONS

Deng et al., "IEEE 802.11ax: Highly Efficient WLANs for Intelligent Information Infrastructure," IEEE Communications Magazine (vol. 55, Issue: 12) pp. 52-59, Institute of Electrical and Electronics Engineers, New York, New York (Dec. 2017).

"IEEE Standard for Information technology—Telecommunications and information exchange between systems, Local and metropolitan area networks—Specific requirements, Part 11: Wireless LAN Medium Access Control (MAC) and Physical Layer (PHY) Specifications," IEEE Std 802.11-2016, total 3534 pages, Institute of Electrical and Electronics Engineers, New York, New York (2016).

"IEEE P802.11ax™/D2.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN," total 596 pages, Institute of Electrical and Electronics Engineers, New York, New York (Oct. 2017).

* cited by examiner

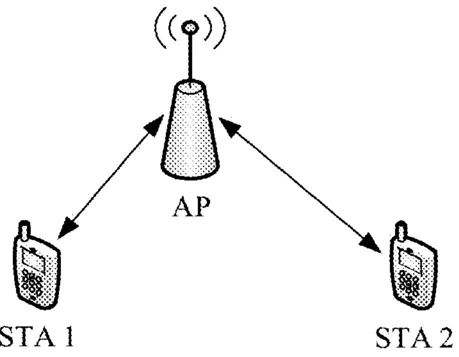
FIG. 2
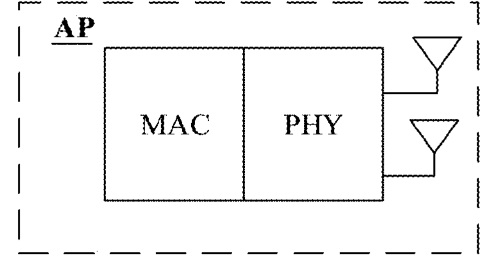
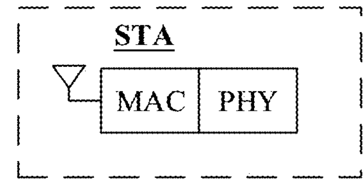
FIG. 3

RU 1 First STA uses an MCS 6

RU 2 Second STA uses an MCS 5

RU 3 Second STA uses the MCS 5

RU 4 First STA uses an MCS 4

RU 5 Third STA uses the MCS 4

RU 6 Third STA uses an MCS 8

RU 7 Third STA uses the MCS 5

RU 8 Fourth STA uses an MCS 7

RU 9 First STA uses an MCS 9

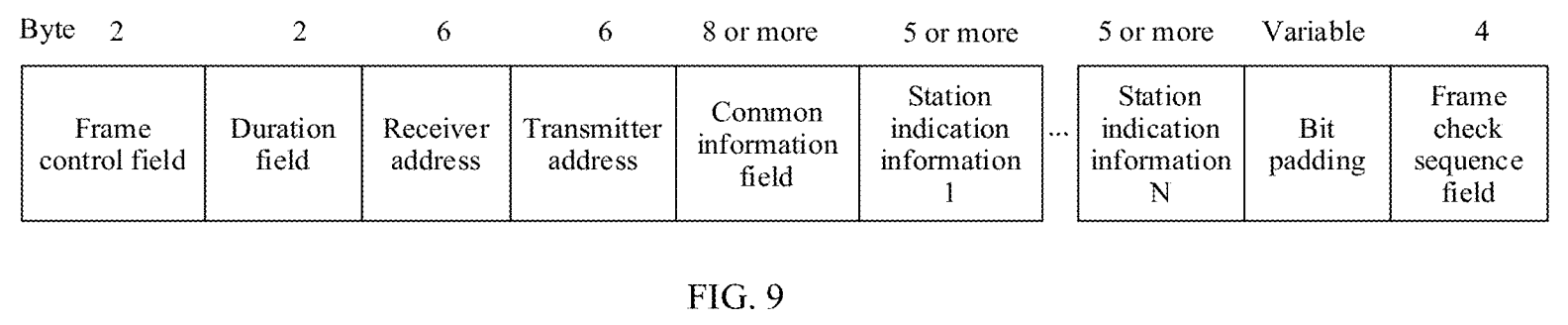

| Byte | 2 | 2 | 6 | 6 | 8 or more | 5 or more | | 5 or more | Variable | 4 |
|---|---|---|---|---|---|---|---|---|---|---|
| | Frame control field | Duration field | Receiver address | Transmitter address | Common information field | Station indication information 1 | ... | Station indication information N | Bit padding | Frame check sequence field |

FIG. 9

| | | | | | | |
|---|---|---|---|---|---|---|
| L-Preamble Legacy preamble | BPSK symbol | First EHT signaling | Second EHT signaling (40 MHz) | EHT-STF | EHT-LTF | Data data payload |
| L-Preamble Legacy preamble | BPSK symbol | First EHT signaling | | EHT-STF | EHT-LTF | Data data payload |
| L-Preamble Legacy preamble | BPSK symbol | First EHT signaling | Second EHT signaling (40 MHz) | EHT-STF | EHT-LTF | Data data payload |
| L-Preamble Legacy preamble | BPSK symbol | First EHT signaling | | EHT-STF | EHT-LTF | Data data payload |

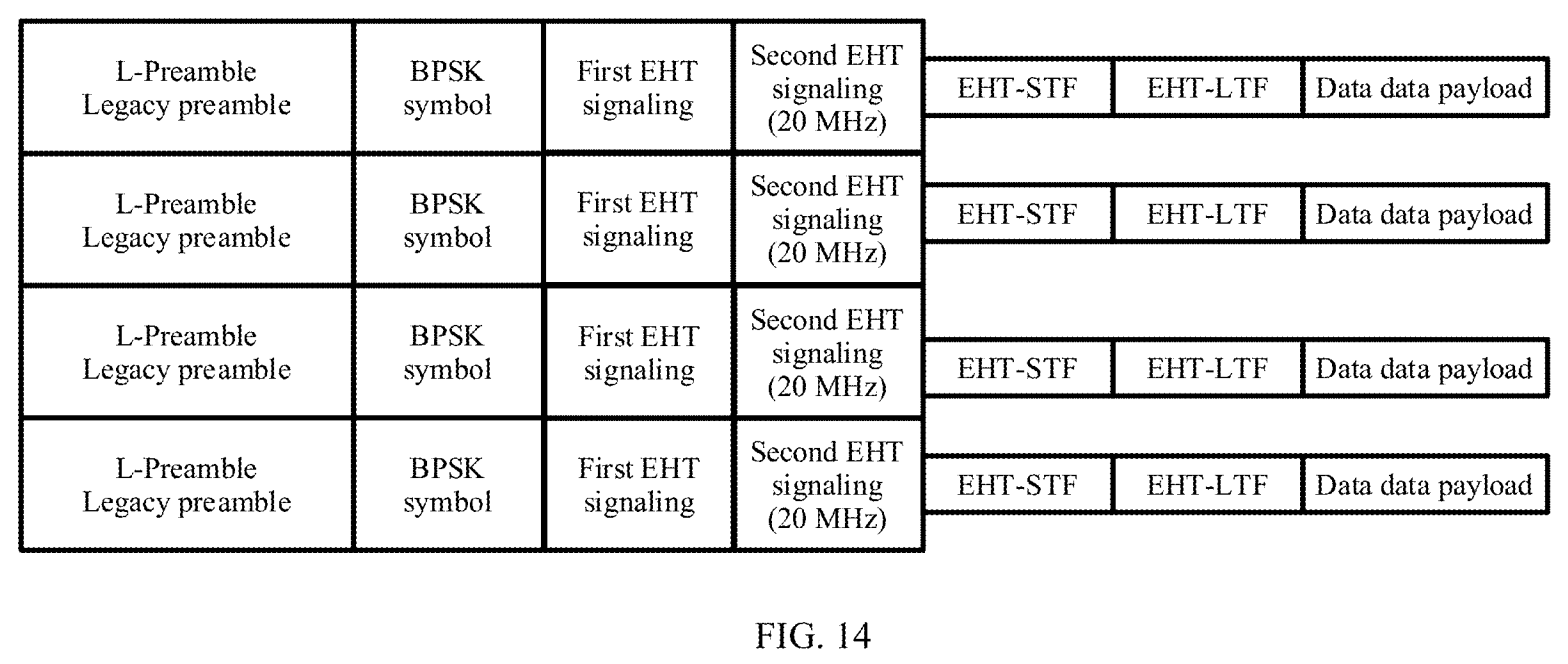

L-Preamble Legacy preamble
BPSK symbol
First EHT signaling
Second EHT signaling (20 MHz)
EHT-STF
EHT-LTF
Data data payload L-Preamble Legacy preamble
BPSK symbol
First EHT signaling
Second EHT signaling (20 MHz)
EHT-STF
EHT-LTF
Data data payload L-Preamble Legacy preamble
BPSK symbol
First EHT signaling
Second EHT signaling (20 MHz)
EHT-STF
EHT-LTF
Data data payload L-Preamble Legacy preamble
BPSK symbol
First EHT signaling
Second EHT signaling (20 MHz)
EHT-STF
EHT-LTF
Data data payload

FIG. 14

CONT. FROM FIG. 16A

Figure 17B:
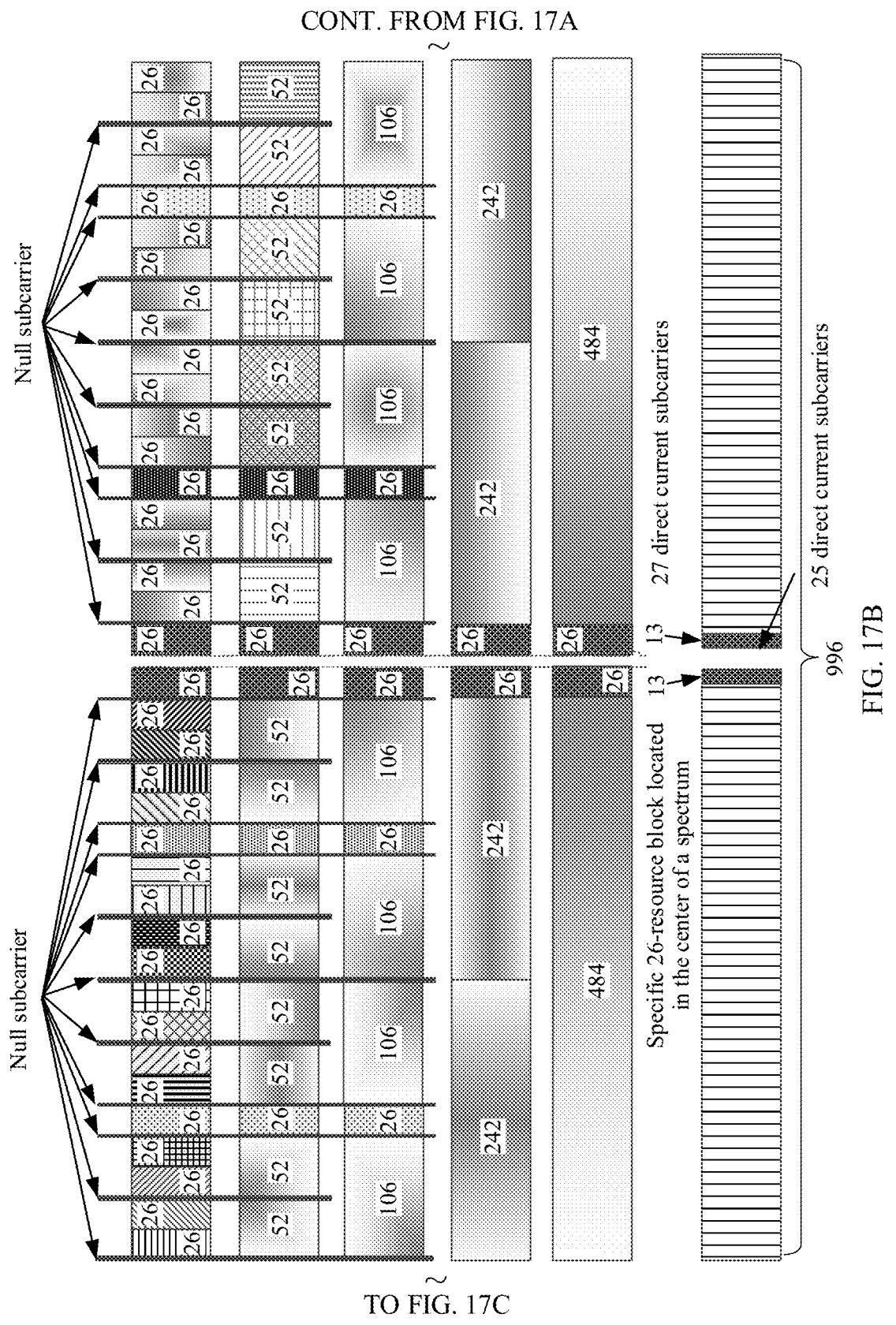

CONT. FROM FIG. 17A

Null subcarrier 27 direct current subcarriers 25 direct current subcarriers

Specific 26-resource block located in the center of a spectrum

CONT. FROM FIG. 18A

TO FIG. 18C

CONT. FROM FIG. 18B

TO FIG. 18D

CONT. FROM FIG. 19B

TO FIG. 19D

| L-STF | L-LTF | L-SIG | VHT-SIG-A | VHT-STF | VHT-LTF | VHT-SIG-B | Data data payload |
|---|---|---|---|---|---|---|---|
FIG. 24
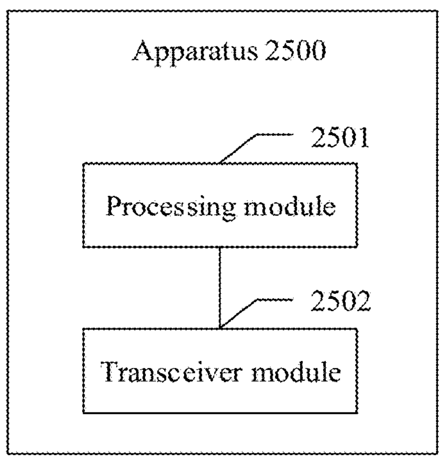
FIG. 25
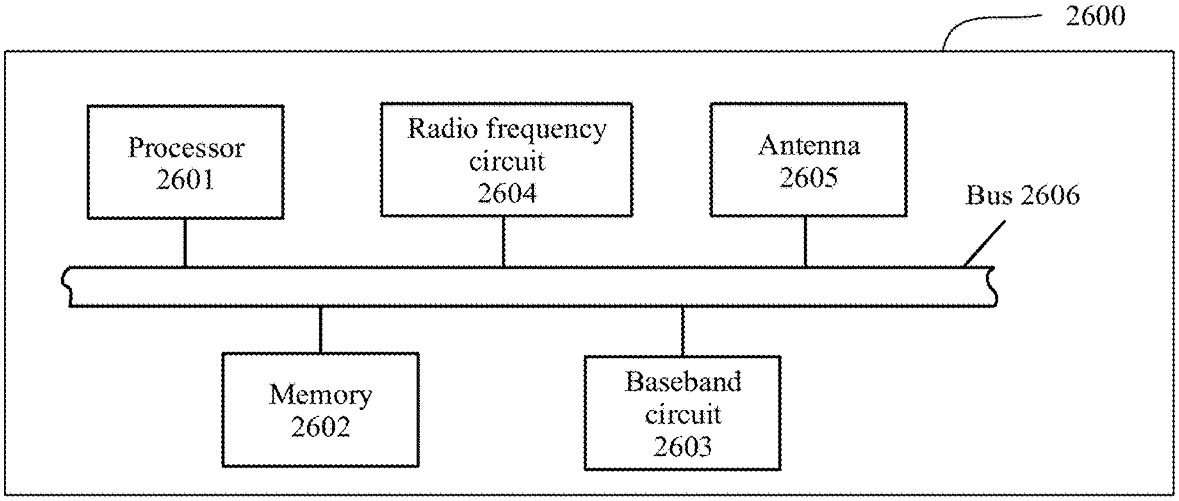
FIG. 26

COMMUNICATION METHOD AND APPARATUS

CROSS-REFERENCE TO RELATED APPLICATIONS

This application is a continuation of U.S. patent application Ser. No. 17/150,869, filed on Jan. 15, 2021, which is a continuation of International Application No. PCT/CN2019/096196, filed on Jul. 16, 2019, which claims priority to Chinese Patent Application No. 201810786769.9, filed on Jul. 17, 2018. All of the afore-mentioned patent applications are hereby incorporated by reference in their entireties.

TECHNICAL FIELD

Embodiments of this application relate to the field of wireless communications technologies, and in particular, to a communication method and an apparatus.

BACKGROUND

To support downlink multi-user transmission, an 802.11ax protocol proposes a multi-user frame format, namely, a high-efficiency multi-user physical layer protocol data unit (HE MU PPDU). As shown in FIG. 1, the frame format includes three parts: a legacy preamble (L-preamble), a high-efficiency preamble (HE-preamble), and a physical layer convergence service data unit (PSDU). The HE-preamble further includes fields such as a repeated legacy signaling/signal (RL-SIG) field, a high-efficiency signaling/signal A (HE-SIG-A) field, a high-efficiency signaling/signal B (HE-SIG-B) field, a high-efficiency short training field (HE-STF), and a high-efficiency long training field (HE-LTF), and the PSDU includes a data field and a packet extension (PE) field.

In the prior art, if a transmission bandwidth is greater than 20 MHz, the RL-SIG field and the HE-SIG-A field in the L-preamble and the HE-preamble are replicated and transmitted every 20 MHz bandwidth, and the HE-SIG B uses a "1212" transmission method, to be specific, the HE-SIG B includes two HE-SIG B content channels. One content channel is transmitted in 20 MHz frequency segments with odd indexes in the transmission bandwidth, and includes resource allocation information of the plurality of 20 MHz frequency segments with odd indexes and station information transmitted in the plurality of 20 MHz frequency segments with odd indexes. The other content channel is transmitted in 20 MHz frequency segments with even indexes in the transmission bandwidth, and includes resource allocation information of the plurality of 20 MHz frequency segments with even indexes and station information transmitted in the plurality of 20 MHz frequency segments with even indexes. Although content transmitted on the two HE-SIG B content channels may be different, it is required that quantities of orthogonal frequency division multiplexing (OFDM) symbols included in the two content channels are the same. In this way, an additional operation is required to balance lengths of signaling information carried on odd and even channels, so that quantities of bits included in the two content channels are the same, and it is ensured that a quantity of wasted bits is the smallest. If a quantity of bits included in one content channel is greater than a quantity of bits included in the other content channel, the shorter content channel needs to be padded with bits for alignment.

SUMMARY

This application provides a communication method and an apparatus, to resolve a prior-art technical problem that when two content channels are used to transmit HE-SIG B, an additional operation is required to balance lengths of signaling information carried on odd and even channels.

According to a first aspect, an embodiment of this application provides a communication method. The method includes:

An access point AP generates a first frame, where the first frame includes P station information fields, each of the P station information fields corresponds to one resource unit RU allocated to a first station STA, P is a positive integer greater than 1, each station information field further includes end indication information, and the end indication information is used to indicate whether the station information field is the last station information field in the P station information fields; and the AP sends the first frame to the first STA.

In this embodiment of this application, the AP may allocate P RUs to the first STA, and indicate the P RUs to the first STA through the P station information fields in the first frame. Therefore, a resource allocation manner of the AP can be more flexible, a frequency selective gain of an OFDMA system can be effectively improved, and a system capacity can be increased.

Further, because P is a positive integer greater than 1, to enable the first STA to effectively identify a station information field related to the first STA in the first frame in a scenario such as multi-user OFDMA transmission, each station information field may further include the end indication information, which is used to indicate whether the station information field is the last station information field in the P station information fields. In this way, when reading the station information fields one by one, if the first STA reads the last station information field related to the first STA, the first STA may learn that all RUs allocated by the AP to the first STA have been indicated, and the first STA does not need to continue to read another subsequent station information field unrelated to the first STA, thereby effectively reducing power consumption of the STA.

In this embodiment of this application, each station information field in the first frame may include the end indication information, and the end indication information may have a plurality of possible implementations. The station information field related to the first STA is used as an example. In a possible implementation, the end indication information is located in a first indication field in each station information field, and when a value of the first indication field is a first value, it indicates that the station information field is the last station information field in the P station information fields, or when a value of the first indication field is a second value, it indicates that the station information field is not the last station information field in the P station information fields.

In another possible implementation, the end indication information is a modulation and coding scheme MCS field in the station information field, and a same MCS is used when RUs allocated to a same STA carry data information; and when a value of the MCS field is an MCS used when the RU carries data, it indicates that the station information field is the last station information field in the P station information fields, or when a value of the MCS field is a specific MCS, it indicates that the station information field is not the last station information field in the P station information fields.

In this way, it can be learned that the last station information field in the P station information fields related to the first STA may be effectively distinguished from another station information field through different values of the first indication field or the MCS field in the station information field. Therefore, when the first STA reads a station information field, if a value of a first indication field in the station information field is the first value, and all values of first indication fields in other station information fields before the station information field are the second value, or if a value of an MCS field in the station information field is an MCS used when the RU carries data, and all values of MCS fields in other station information fields before the station information field are specific MCSs, it may be determined that the current station information field is the last station information field related to the first STA. Further, the first STA does not read a subsequent unrelated station information field, thereby reducing power consumption.

In a possible design, the first frame is a downlink physical layer protocol data unit PPDU, the downlink PPDU includes a second extremely high throughput EHT signaling field, the second EHT signaling field includes resource allocation indication information and a plurality of station information fields including the P station information fields, and the resource allocation indication information is used to indicate that a transmission bandwidth of the downlink PPDU is divided into a plurality of RUs; and positions, of the P station information fields, in the plurality of station information fields and the resource allocation indication information jointly determine the RU allocated to the first STA.

In a possible design, the P RUs allocated to the first STA are configured to: jointly carry a same data frame of the first STA, or respectively carry a plurality of data frames of the first STA.

It can be learned that, in this embodiment of this application, there are a plurality of possible implementations of carrying the data information by the plurality of RUs allocated to the first STA. For example, the P RUs may carry a same data frame of the first STA in a manner such as distribution of encoded bits or data frame segmentation; alternatively, each RU may be separately used to carry one data frame of the first STA, thereby effectively improving flexibility of data transmission.

According to a second aspect, an embodiment of this application provides another communication method. The method includes:

A first station STA receives a first frame sent by an access point AP, where the first frame includes P station information fields, each of the P station information fields corresponds to one resource unit RU allocated to the first station STA, P is a positive integer greater than 1, each station information field further includes end indication information, and the end indication information is used to indicate whether the station information field is the last station information field in the P station information fields; and the first STA receives or sends data information based on the P allocated RUs.

In this embodiment of this application, the AP may allocate P RUs to the first STA, and indicate the P RUs to the first STA through the P station information fields in the first frame. Therefore, a resource allocation manner of the AP can be more flexible, a frequency selective gain of an OFDMA system can be effectively improved, and a system capacity can be increased.

Further, because P is a positive integer greater than 1, to enable the first STA to effectively identify a station information field related to the first STA in the first frame in a scenario such as multi-user OFDMA transmission, each station information field may further include the end indication information, which is used to indicate whether the station information field is the last station information field in the P station information fields. In this way, when reading the station information fields one by one, if the first STA reads the last station information field related to the first STA, the first STA may learn that all RUs allocated by the AP to the first STA have been indicated, and the first STA does not need to continue to read another subsequent station information field unrelated to the first STA, thereby effectively reducing power consumption of the STA.

In this embodiment of this application, each station information field in the first frame may include the end indication information, and the end indication information may have a plurality of possible implementations. The station information field related to the first STA is used as an example. In a possible implementation, the end indication information is located in a first indication field in each station information field, the first STA determines that a station information field whose value of the first indication field is a first value is the last station information field in the P station information fields, and that a station information field whose value of the first indication field is a second value is not the last station information field in the P station information fields.

In another possible implementation, the end indication information is a modulation and coding scheme MCS field in the station information field, and a same MCS is used when RUs allocated to a same STA carry data information; and the first STA determines that a station information field whose value of the MCS field is an MCS used when the RU carries data is the last station information field in the P station information fields, and that a station information field whose value of the MCS field is a specific MCS is not the last station information field in the P station information fields.

In this way, it can be learned that the last station information field in the P station information fields related to the first STA may be effectively distinguished from another station information field through different values of the first indication field or the MCS field in the station information field. Therefore, when the first STA reads a station information field, if a value of a first indication field in the station information field is the first value, and all values of first indication fields in other station information fields before the station information field are the second value, or if a value of an MCS field in the station information field is an MCS used when the RU carries data, and all values of MCS fields in other station information fields before the station information field are specific MCSs, it may be determined that the current station information field is the last station information field related to the first STA. Further, the first STA does not read a subsequent unrelated station information field, thereby reducing power consumption.

In a possible design, the first frame is a downlink physical layer protocol data unit PPDU, the downlink PPDU includes a second extremely high throughput EHT signaling field, the second EHT signaling field includes resource allocation indication information and a plurality of station information fields including the P station information fields, and the resource allocation indication information is used to indicate that a transmission bandwidth of the downlink PPDU is divided into a plurality of RUs; and positions, of the P station information fields, in the plurality of station information fields and the resource allocation indication information jointly determine the RU allocated to the first STA.

In a possible design, the P RUs allocated to the first STA are configured to: jointly carry a same data frame of the first STA, or respectively carry a plurality of data frames of the first STA.

It can be learned that, in this embodiment of this application, there are a plurality of possible implementations of carrying the data information by the plurality of RUs allocated to the first STA. For example, the P RUs may carry a same data frame of the first STA in a manner such as distribution of encoded bits or data frame segmentation; alternatively, each RU may be separately used to carry one data frame of the first STA, thereby effectively improving flexibility of data transmission.

According to a third aspect, an embodiment of this application provides a communication method. The method includes:

An access point AP generates a trigger frame, where the trigger frame includes P station information fields, each of the P station information fields corresponds to one resource unit RU allocated to a first station STA, the P station information fields are consecutively arranged, and P is a positive integer greater than 1; and the AP sends the trigger frame to the first STA.

In an uplink data transmission scenario, the AP may allocate P RUs (where P is a positive integer greater than or equal to 1) to the first STA, and indicate the P RUs to the first STA through the P station information fields in the trigger frame. Because the P station information fields used to indicate the RUs allocated to the first STA are consecutively arranged, there is no need to additionally set end indication information in the station information fields. When the first STA reads the station information fields, if it is found, when the first STA reads a station information field, that the station information field includes an identifier of another STA, it may be determined that the RUs allocated by the AP to the first STA have been indicated, and a previous station information field is the last station information field related to the first STA, thereby effectively reducing power consumption of the STA.

In a possible design, the P RUs allocated to the first STA are configured to: jointly carry a same data frame of the first STA, or respectively carry a plurality of data frames of the first STA.

It can be learned that, in this embodiment of this application, there are also a plurality of possible implementations of carrying uplink data information by the plurality of RUs allocated to the first STA. For example, the P RUs may carry a same data frame of the first STA in a manner such as distribution of encoded bits or data frame segmentation; alternatively, each RU may be separately used to carry one data frame of the first STA, thereby effectively improving flexibility of data transmission.

According to a fourth aspect, an embodiment of this application provides another communication method. The method includes:

A first station STA receives a trigger frame sent by an access point AP, where the trigger frame includes P station information fields, each of the P station information fields corresponds to one resource unit RU allocated to the first station STA, the P station information fields are consecutively arranged, and P is a positive integer greater than 1; and the first STA sends data information based on the P allocated RUs.

In an uplink data transmission scenario, the AP may allocate P RUs (where P is a positive integer greater than or equal to 1) to the first STA, and indicate the P RUs to the first STA through the P station information fields in the trigger frame. Because the P station information fields used to indicate the RUs allocated to the first STA are consecutively arranged, there is no need to additionally set end indication information in the station information fields. When the first STA reads the station information fields, if it is found, when the first STA reads a station information field, that the station information field includes an identifier of another STA, it may be determined that the RUs allocated by the AP to the first STA have been indicated, and a previous station information field is the last station information field related to the first STA, thereby effectively reducing power consumption of the STA.

In a possible design, the P RUs allocated to the first STA are configured to jointly carry a same data frame sent by the first STA, or the P RUs are configured to respectively carry a plurality of data frames sent by the first STA.

It can be learned that, in this embodiment of this application, there are also a plurality of possible implementations of carrying uplink data information by the plurality of RUs allocated to the first STA. For example, the P RUs may carry a same data frame of the first STA in a manner such as distribution of encoded bits or data frame segmentation; alternatively, each RU may be separately used to carry one data frame of the first STA, thereby effectively improving flexibility of data transmission.

According to a fifth aspect, an embodiment of this application provides a communication method. The method includes:

An access point AP generates a downlink physical layer protocol data unit PPDU, where the downlink PPDU includes a second extremely high throughput EHT signaling field; the AP sends the downlink PPDU to a first station STA; and the second EHT signaling field is replicated and transmitted in a unit of a second bandwidth within a transmission bandwidth range of the downlink PPDU, where the second bandwidth is $2^N$ times a first bandwidth, and N is 0 or a positive integer.

It can be learned that in this embodiment of this application, the second EHT signaling field in the downlink PPDU may be transmitted in a unit of a bandwidth $2^N$ times the first bandwidth or the first bandwidth. In this way, when the second EHT signaling field is transmitted in a unit of a large bandwidth $2^N$ times the first bandwidth, a technical problem, that lengths of signaling information carried on an odd content channel and an even content channel need to be balanced when two content channels are used to transmit the second EHT signaling field, can be effectively avoided. In addition, more signaling information may be further carried in the second EHT signaling field, so as to better support OFDMA transmission in an ultra-large bandwidth. When the second EHT field is transmitted in a unit of a basic bandwidth, in a scenario such as a scenario in which a transmission bandwidth of the downlink PPDU is a small bandwidth or a non-contiguous bandwidth, an effect of transmitting the second EHT field in a preamble puncturing manner may be further implemented.

In a possible design, the downlink PPDU further includes a legacy preamble field, a binary phase shift keying BPSK symbol field, and a first EHT signaling field. The first EHT signaling field includes M channel estimation subcarriers, the value of M is determined by the AP based on a quantity of subcarriers used in the second EHT signaling field and a quantity of channel estimation subcarriers provided by the legacy preamble and the BPSK symbol field within a range of the second bandwidth, and M is a positive integer.

In this way, when the second EHT field is transmitted in a unit of the large bandwidth $2^N$ times the first bandwidth, the M channel estimation subcarriers in the first EHT signaling field may perform channel estimation on an extra data subcarrier in the second EHT signaling field, so that the first STA can correctly decode the downlink PPDU after receiving the downlink PPDU.

In a possible design, the downlink PPDU further includes first indication information, and the first indication information is used to indicate whether the value of N is a positive integer.

In this way, the first STA can learn of a transmission manner of the second EHT signaling field in time through the first indication information in the downlink PPDU. When the first indication information indicates that the value of N is a positive integer, it indicates that the AP transmits the second EHT signaling field in a unit of the bandwidth $2^N$ times the first bandwidth; or when the first indication information indicates that the value of N is 0, it indicates that the AP transmits the second EHT signaling field in a unit of the first bandwidth (that is, in the preamble puncturing manner). Therefore, the first STA can correctly decode, based on a transmission bandwidth of the second EHT signaling field, signaling information carried in the second EHT signaling field.

In a possible design, the first indication information is located in one of the legacy preamble, the first EHT signaling field, and the BPSK symbol field.

According to a sixth aspect, an embodiment of this application further provides another communication method. The method includes:

A first station STA receives a downlink physical layer protocol data unit PPDU sent by an access point AP, where the downlink PPDU includes a second extremely high throughput EHT signaling field, the second EHT signaling field is replicated and transmitted in a unit of a second bandwidth within a transmission bandwidth range of the downlink PPDU, the second bandwidth is $2^N$ times a first bandwidth, and N is 0 or a positive integer; and the first STA decodes signaling information in the second EHT signaling field based on the second bandwidth.

It can be learned that in this embodiment of this application, the second EHT signaling field in the downlink PPDU may be transmitted in a unit of a bandwidth $2^N$ times the first bandwidth or the first bandwidth. In this way, when the second EHT field is transmitted in a unit of a large bandwidth $2^N$ times the first bandwidth, a technical problem, that lengths of signaling information carried on an odd content channel and an even content channel need to be balanced when two content channels are used to transmit the second EHT signaling field, can be effectively avoided. In addition, more signaling information may be further carried in the second EHT signaling field, so as to better support OFDMA transmission in an ultra-large bandwidth. When the second EHT field is transmitted in a unit of the first bandwidth, in a scenario such as a scenario in which a transmission bandwidth of the downlink PPDU is a small bandwidth or a non-contiguous bandwidth, an effect of transmitting the second EHT field in a preamble puncturing manner may be further implemented.

In a possible design, the downlink PPDU further includes a legacy preamble field, a binary phase shift keying BPSK symbol field, and a first EHT signaling field. The first EHT signaling field includes M channel estimation subcarriers, the value of M is determined by the AP based on a quantity of subcarriers used in the second EHT signaling field and a quantity of channel estimation subcarriers provided by the legacy preamble and the PBSK symbol field within a range of the second bandwidth, and M is a positive integer.

In this way, when the M channel estimation subcarriers in the first EHT signaling field transmit the second EHT field in a unit of the large bandwidth $2^N$ times the first bandwidth, the first STA may perform, based on the M channel estimation subcarriers, channel estimation on an extra data subcarrier in the second EHT signaling field, so that the first STA can correctly decode the downlink PPDU.

In a possible design, the downlink PPDU further includes first indication information; and the method further includes: The first STA determines the second bandwidth based on the value of N indicated by the first indication information.

In this way, the first STA can learn of a transmission manner of the second EHT signaling field in time through the first indication information in the downlink PPDU. When the first indication information indicates that the value of N is a positive integer, it indicates that the AP transmits the second EHT signaling field in a unit of the bandwidth $2^N$ times the first bandwidth; or when the first indication information indicates that the value of N is 0, it indicates that the AP transmits the second EHT signaling field in a unit of the first bandwidth (that is, in the preamble puncturing manner). Therefore, the first STA can correctly decode, based on a transmission bandwidth of the second EHT signaling field, the signaling information carried in the second EHT signaling field.

In a possible design, the first indication information is located in one of the legacy preamble, the first EHT signaling field, and the BPSK symbol field.

According to a seventh aspect, an embodiment of this application further provides a communication method. The method includes:

An access point AP determines a transmission bandwidth, where the transmission bandwidth is used to communicate with one or more stations STAs, and the transmission bandwidth is 240 MHz or 320 MHz; the access point determines resource unit RU division of the transmission bandwidth, where the transmission bandwidth is divided into at least one resource unit RU, each RU includes at least one subcarrier, and the at least one subcarrier has a fixed position; and the access point communicates with the one or more STAs based on the resource unit RU division of the transmission bandwidth.

In a possible design, the at least one resource unit RU includes any one or any combination of the following: a 26-subcarrier RU, a 52-subcarrier RU, a 106-subcarrier RU, a 242-subcarrier RU, a 484-subcarrier RU, and a 996-subcarrier RU.

In a possible design, a first bandwidth is 240 MHz, and the first bandwidth sequentially includes 12 left-sideband subcarriers, three 996-subcarrier RUs, and 11 right-sideband subcarriers from a low frequency to a high frequency; and the center of the 996-subcarrier RU at the middle position further includes 51 direct current subcarriers, and the center of each of the first 996-subcarrier RU and the last 996-subcarrier RU further includes five null subcarriers.

In a possible design, the first bandwidth is 240 MHz, and the first bandwidth sequentially includes 12 left-sideband subcarriers, three 996-subcarrier RUs, and 11 right-sideband subcarriers from a low frequency to a high frequency; and the center of the 996-subcarrier RU at the middle position further includes 25 direct current subcarriers and one 26-subcarrier RU distributed on two sides of the 25 direct current subcarriers, and the center of each of the first 996-subcarrier RU and the last 996-subcarrier RU includes five null subcarriers.

In a possible design, the first bandwidth is 320 MHz, and the first bandwidth sequentially includes 12 left-sideband subcarriers, four 996-subcarrier RUs, and 11 right-sideband subcarriers from a low frequency to a high frequency; and the center of each of the four 996-subcarrier RUs includes five null subcarriers, and 69 direct current subcarriers are further included between the second 996-subcarrier RU and the third 996-subcarrier RU.

In a possible design, the first bandwidth is 320 MHz, and the first bandwidth sequentially includes 12 left-sideband subcarriers, four 996-subcarrier RUs, and 11 right-sideband subcarriers from a low frequency to a high frequency; and the center of each of the four 996-subcarrier RUs includes five null subcarriers, and 17 direct current subcarriers and one 52-subcarrier RU distributed on two sides of the 17 direct current subcarriers are included between the second 996-subcarrier RU and the third 996-subcarrier RU.

According to an eighth aspect, an embodiment of this application provides an apparatus used on an access point side. The apparatus may be an access point, or may be a chip in an access point. The apparatus has any function of implementing the access point in any one of the first aspect, the third aspect, the fifth aspect, and the seventh aspect. The function may be implemented by hardware, or may be implemented by hardware executing corresponding software. The hardware or the software includes one or more units corresponding to the foregoing function.

In a possible implementation, when the apparatus is an access point, the access point may include a processor and a transceiver. The processor is configured to support the access point in performing a corresponding function in the foregoing methods. The transceiver is configured to: support communication between the access point and a station, and send information or an instruction in the foregoing methods to the station. Optionally, the access point may further include a memory. The memory is configured to couple to the processor, and the memory stores a program instruction and data that are necessary for the access point.

In a possible implementation, the apparatus includes a processor, a baseband circuit, a radio frequency circuit, and an antenna. The processor is configured to control functions of each circuit part. The baseband circuit is configured to generate various signaling and messages such as a downlink PPDU, and send, to a first STA through the antenna, the signaling and messages resulting from processing of the radio frequency circuit such as analog conversion, filtering, amplification, and up-conversion. Optionally, the apparatus may further include a memory. The memory stores a program instruction and data that are necessary for the access point.

In a possible implementation, when the apparatus is a chip in an access point, the chip includes a processing module and a transceiver module. The processing module may be, for example, a processor. For example, the processor is configured to generate various messages and signaling, and perform processing such as encoding, modulation, and amplification on various messages resulting from protocol encapsulation. The processor may be further configured to perform demodulation, decoding, and decapsulation to obtain the signaling and messages. The transceiver module may be, for example, an input/output interface, a pin, or a circuit on the chip. The processing module may execute a computer-executable instruction stored in a storage unit, to support the access point in performing a corresponding function in the foregoing methods. Optionally, the storage unit may be a storage unit in the chip, for example, a register or a buffer, or the storage unit may be a storage unit in the access point but outside the chip, for example, a read-only memory (ROM) or another type of static storage device capable of storing static information and instructions, or a random access memory (RAM).

In a possible implementation, the apparatus may include a processor and a modem. The processor may be configured to run an instruction or an operating system, to control an access point function. The modem may perform encapsulation, encoding/decoding, modulation/demodulation, equalization, or the like on data according to a protocol, to generate a radio frame, so as to support the access point AP in performing a corresponding function in any one of the first aspect, the third aspect, the fifth aspect, and the seventh aspect.

In a possible implementation, the apparatus includes a processor. The processor is configured to: couple to a memory, read an instruction in the memory, and perform, according to the instruction, the method according to any one of the first aspect, the third aspect, the fifth aspect, and the seventh aspect. The memory may be located inside the processor, or may be located outside the processor.

The processor mentioned anywhere above may be a general-purpose central processing unit (CPU), a microprocessor, an application-specific integrated circuit (ASIC), or one or more integrated circuits configured to control program execution of the communication methods in the foregoing aspects.

According to a ninth aspect, an embodiment of this application provides an apparatus used on a station side. The apparatus has any function of implementing the first station in any one of the second aspect, the fourth aspect, and the sixth aspect. The function may be implemented by hardware, or may be implemented by hardware executing corresponding software. The hardware or the software includes one or more units corresponding to the foregoing function.

In a possible implementation, the apparatus may be a first station, and the first station includes a processor and a transceiver. The processor is configured to support the first station STA in performing a corresponding function in the foregoing methods. The transceiver is configured to: support communication between the first STA and an access point, and receive information or an instruction in the foregoing methods sent by the access point. Optionally, the first station STA may further include a memory. The memory is configured to couple to the processor, and the memory stores a program instruction and data that are necessary for the first station STA.

In a possible implementation, the apparatus includes a processor, a memory, a transceiver, an antenna, and an input/output apparatus. The processor is mainly configured to: control the entire apparatus, and execute a computer program instruction, to support the apparatus in performing an action described in any method embodiment in the second aspect, the fourth aspect, and the sixth aspect, and the like. The memory is mainly configured to store a program instruction and data that are necessary for the first station. The transceiver is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, and a keyboard, is mainly configured to receive data input by a user and output data to the user.

In a possible implementation, the apparatus may be a chip in a first station, the chip includes a processing module and a transceiver module. The processing module may be, for example, a processor. For example, the processor is configured to generate various messages and signaling, and perform processing such as encoding, modulation, and amplification on various messages resulting from protocol encapsulation. The processor may be further configured to perform demodulation, decoding, and decapsulation to obtain the signaling and messages. The transceiver module may be, for example, an input/output interface, a pin, or a circuit on the chip. The processing module may execute a computer-executable instruction stored in a storage unit, to support the first station STA in performing a corresponding function in the foregoing methods. Optionally, the storage unit may be a storage unit in the chip, for example, a register or a buffer, or the storage unit may be a storage unit in the first station but outside the chip, for example, a read-only memory (ROM) or another type of static storage device capable of storing static information and instructions, or a random access memory (RAM).

In a possible implementation, the apparatus may include a processor and a modem. The processor may be configured to run an instruction or an operating system, to control a first station function. The modem may perform encapsulation, encoding/decoding, modulation/demodulation, equalization, or the like on data according to a protocol, to generate a radio frame, so as to support the first station STA in performing a corresponding function in any one of the second aspect, the fourth aspect, and the sixth aspect.

In a possible implementation, the apparatus includes a processor. The processor is configured to: couple to a memory, read an instruction in the memory, and perform, according to the instruction, the method according to any one of the second aspect, the fourth aspect, and the sixth aspect. The memory may be located inside the processor, or may be located outside the processor.

The processor mentioned anywhere above may be a general-purpose central processing unit (CPU), a microprocessor, an application-specific integrated circuit (ASIC), or one or more integrated circuits configured to control program execution of the communication methods in the foregoing aspects.

According to a tenth aspect, this application provides a computer-readable storage medium. The computer-readable storage medium stores an instruction, and the instruction may be executed by one or more processors on a processing circuit. When the instruction is run on a computer, the computer is enabled to perform the method in any one of the first aspect, the third aspect, the fifth aspect, and the seventh aspect or any possible implementation thereof.

According to an eleventh aspect, this application provides a computer-readable storage medium. The computer-readable storage medium stores an instruction, and the instruction may be executed by one or more processors on a processing circuit. When the instruction is run on a computer, the computer is enabled to perform the method in any one of the second aspect, the fourth aspect, and the sixth aspect or any possible implementation thereof.

According to a twelfth aspect, a computer program product including an instruction is provided. When the computer program product runs on a computer, the computer is enabled to perform the method in any one of the first aspect, the third aspect, the fifth aspect, and the seventh aspect or any possible implementation thereof.

According to a thirteenth aspect, a computer program product including an instruction is provided. When the computer program product runs on a computer, the computer is enabled to perform the method in any one of the second aspect, the fourth aspect, and the sixth aspect or any possible implementation thereof.

According to a fourteenth aspect, this application provides a chip system. The chip system includes a processor, configured to support an access point in implementing a function in the first aspect, the third aspect, the fifth aspect, and the seventh aspect, for example, generating or processing data and/or information in the foregoing aspects. In a possible design, the chip system further includes a memory, and the memory is configured to store a program instruction and data that are necessary for a data sending device. The chip system may include a chip, or may include a chip and another discrete component.

According to a fifteenth aspect, this application provides a chip system. The chip system includes a processor, configured to support a first STA in implementing a function in the second aspect, the fourth aspect, and the sixth aspect, for example, generating or processing data and/or information in the foregoing aspects. In a possible design, the chip system further includes a memory, and the memory is configured to store a program instruction and data that are necessary for a data sending device. The chip system may include a chip, or may include a chip and another discrete component.

According to a sixteenth aspect, an embodiment of this application provides a wireless communications system. The system includes at least one access point and at least one first station in the foregoing aspects.

BRIEF DESCRIPTION OF DRAWINGS

FIG. 2 is a network architecture diagram of a wireless local area network to which an embodiment of this application is applicable;

FIG. 3 is an internal structural diagram of an access point and a station according to an embodiment of this application;

FIG. 9 is a schematic diagram of a frame structure of a trigger frame according to an embodiment of this application;

FIG. 12 is a schematic diagram of a transmission structure of a downlink HE MU PPDU according to Embodiment 3 of this application;

FIG. 13 is a schematic diagram of a transmission structure of another downlink HE MU PPDU according to Embodiment 3 of this application;

FIG. 14 is a schematic diagram of a transmission structure of another downlink HE MU PPDU according to Embodiment 3 of this application;

FIG. 16A, FIG. 16B, and FIG. 16C and FIG. 17A, FIG. 17B, and FIG. 17C are schematic diagrams of spectrum division manners of a 240 MHz ultra-large bandwidth according to an embodiment of this application;

FIG. 24 is a PPDU structure of 802.11ac;

FIG. 25 is a schematic structural diagram of an apparatus used on an AP side according to an embodiment of this application;

FIG. 26 is another schematic structural diagram of an apparatus used on an AP side according to an embodiment of this application;

DESCRIPTION OF EMBODIMENTS

Figure 1:
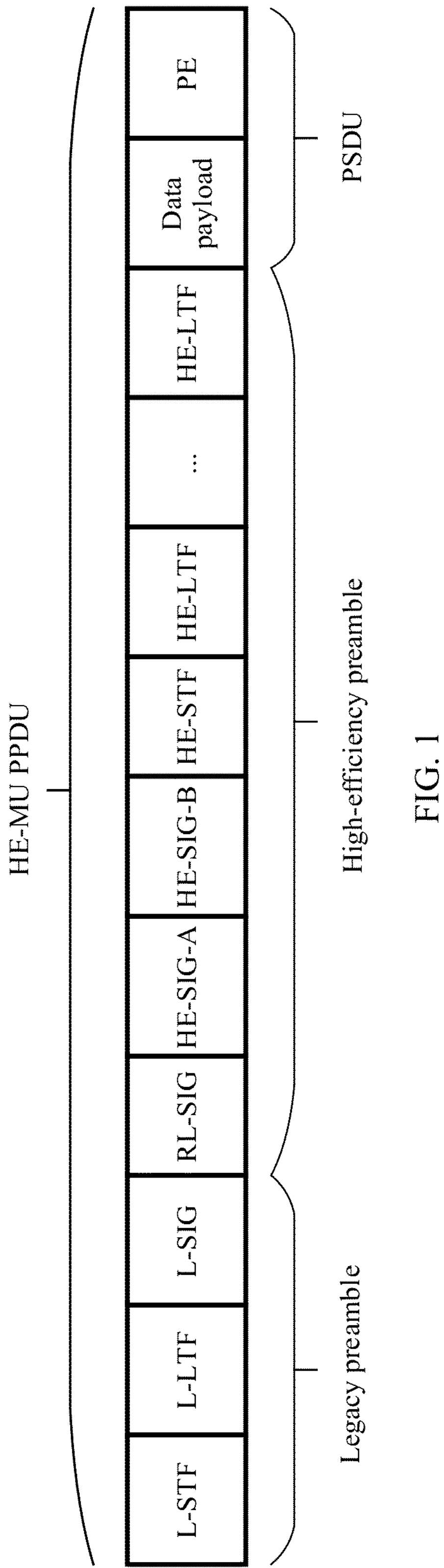
FIG. 1 is a schematic diagram of a frame structure of an HE MU PPDU according to an embodiment of this application.

To make objectives, technical solutions and advantages of this application clearer, the following describes the embodiments of this application in detail with reference to the accompanying drawings in this specification. It should be noted that terms used in implementations of this application are merely used to explain specific embodiments of this application, but are not intended to limit this application.

It should be understood that, in the following description, words such as “first” and “second” are merely used for distinction and description, and shall not be understood as an indication or implication of relative importance or an indication or implication of an order.

It should be understood that, the technical solutions of the embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5G communications system.

The technical solutions in the embodiments of this application may be further applicable to a wireless local area network (WLAN) scenario, may be applicable to an IEEE 802.11 system standard, for example, the IEEE 802.11ax standard, or a next-generation standard or a still next-generation standard of the IEEE 802.11ax standard, and may be applicable to a wireless local area network system such as an internet of things (IoT) network or an internet of vehicles (V2X) network.

For ease of description, an example application scenario shown in FIG. 2 is used for description in this embodiment of this application. FIG. 2 is an example of a network architecture diagram of a WLAN to which an embodiment of this application is applicable. The WLAN includes an AP, and a STA 1 and a STA 2 associated with the AP. The AP can schedule a radio resource for the STA 1 and the STA 2, and transmit data, including uplink data information and/or downlink data information, for the STA 1 and the STA 2 on the scheduled radio resource.

For ease of description, only one AP is shown in FIG. 2. However, it should be understood that the WLAN system may further include more APs, and the APs may communicate with each other through a distributed system (DS). Any AP can schedule a radio resource for a STA associated with the AP and/or a STA unassociated with the AP, and transmit data for the STA on the scheduled radio resource. Further, STAs in the WLAN system may also communicate with each other. This is not specifically limited in this embodiment of this application.

Stations STAs in this application may be various user terminals, user apparatuses, access apparatuses, subscriber stations, subscriber units, mobile stations, user agents, user devices, or other devices that have a wireless communication function. The user terminals may include various handheld devices, vehicle-mounted devices, wearable devices, computing devices that have the wireless communication function or another processing device connected to a wireless modem, and include various forms of user equipment (UE), mobile stations (MS), terminals, terminal devices, portable communications devices, handheld devices, portable computing devices, entertainment devices, game devices or systems, global positioning system devices, or any other suitable device configured to perform network communication via wireless media. Herein, for ease of description, the devices mentioned above are collectively referred to as stations or STAs.

The access point AP in this application is an apparatus that is deployed in a wireless communications network and that provides a wireless communication function for a STA associated with the access point AP. The access point AP may be used as a hub of the communications system, and may be a communications device such as a base station, a router, a gateway, a repeater, a communications server, a switch, or a bridge. The base station may include a macro base station, a micro base station, a relay station, and the like in various forms. Herein, for ease of description, the devices mentioned above are collectively referred to as access points AP.

Specifically, the AP and the STA in this application may be an AP and a STA that are applicable to the IEEE 802.11 system standard. FIG. 3 is an internal structural diagram of an AP and a STA according to an embodiment of this application. The 802.11 system standard focuses on an 802.11 physical layer (physical, PHY) and a media access control (MAC) part in FIG. 3. Therefore, the STA provided in this embodiment of this application is usually a terminal product that supports the MAC and the PHY in the 802.11 system standard, for example, a mobile phone or a laptop. It should be noted that, although FIG. 3 shows only a structural diagram of an AP with a plurality of antennas and a STA with a single antenna, in an actual scenario, both the AP and the STA may have a plurality of antennas, and may be devices with more than two antennas.

The following describes, with reference to specific embodiments, the communication method provided in this application.

Embodiment 1

Figure 4:
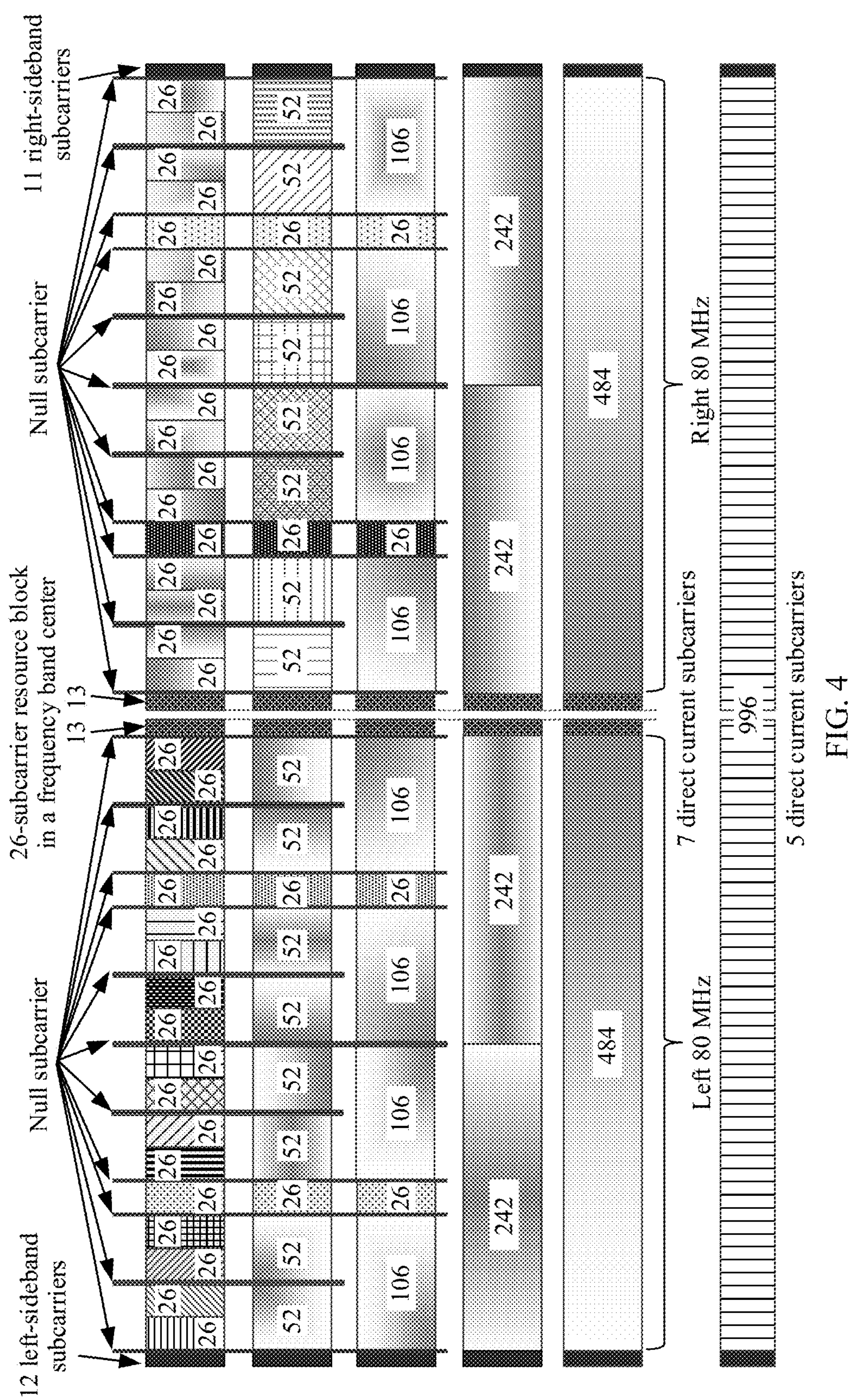
FIG. 4 is a schematic diagram of resource division when a spectrum bandwidth is 80 MHz according to an embodiment of this application.

When OFDMA and multi-user multiple-input multiple-output (MU-MIMO) technologies are applied, an AP divides a spectrum bandwidth into several resource units (RU). According to an IEEE 802.11ax protocol, for 20 MHz, 40 MHz, 80 MHz, and 160 MHz bandwidths, a spectrum bandwidth may be divided into a plurality of types of resource units, including a 26-subcarrier resource unit, a 52-subcarrier resource unit, a 106-subcarrier resource unit, a 242-subcarrier resource unit (the largest resource unit in the 20 MHz bandwidth), a 484-subcarrier resource unit (the largest resource unit in the 40 MHz bandwidth), a 996-subcarrier resource unit (the largest resource unit in the 80 MHz bandwidth), and a 996*2-subcarrier resource unit (the largest resource unit in the 160 MHz bandwidth). Each resource unit (RU) includes consecutive subcarriers. For example, the 26-subcarrier resource unit includes 26 consecutive subcarrier. It should be noted that RUs that can be supported by different spectrum bandwidths have different types and quantities, but in a same bandwidth, hybrid-type resource units can be supported. FIG. 4 shows an example of resource division for a spectrum bandwidth of 80 MHz.

To simplify sending and receiving complexity, the current 802.11ax protocol specifies that only one STA is allowed to occupy one RU in the spectrum bandwidth. In other words, data information of one STA can be transmitted only on consecutive subcarriers. Therefore, in the prior art, when performing multi-user transmission, an AP allocates a best RU to a most suitable STA. After the AP allocates one RU to one STA, if remaining RUs in the spectrum bandwidth are not suitable for other STAs, because there is a limitation that only one RU can be allocated to one STA, these RUs may be idle and are not allocated to the first STA, thereby causing a waste of radio resources and affecting a throughput of the entire system.

Figures 5, 6:
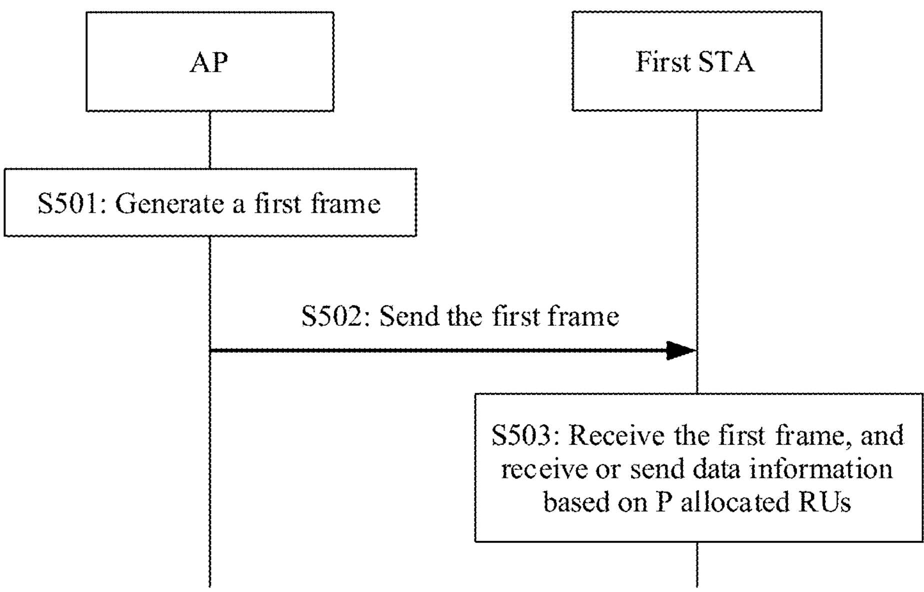
FIG. 5 is a schematic flowchart of a communication method according to Embodiment 1 of this application.
FIG. 6 is a schematic diagram of RU allocation according to an embodiment of this application.

Therefore, an embodiment of this application further provides a communication method, to improve a frequency selective gain of an OFDMA system and increase a system throughput. FIG. 5 shows an example of a communication method according to an embodiment of this application. The method may include the following steps.

Step S501: An access point AP generates a first frame, where the first frame includes P station information fields, each of the P station information fields corresponds to one resource unit RU allocated to a first station STA, P is a positive integer greater than 1, each station information field further includes end indication information, and the end indication information is used to indicate whether the station information field is the last station information field in the P station information fields.

Step S502: The AP sends the first frame to the first STA.

Step S503: The first STA receives the first frame, and receives or sends data information based on the P allocated RUs.

In specific implementation of step S501, the AP may generate the first frame, where the first frame includes P station information fields, and each of the P station information fields is used to indicate one RU allocated to the first station STA. Because P is a positive integer greater than or equal to 1, in this embodiment of this application, the AP may allocate P RUs to the first STA, and indicate each RU through one station information field.

It should be noted that, in this embodiment of this application, the P RUs allocated by the AP to the first STA may be consecutive or inconsecutive in a spectrum bandwidth. This is not specifically limited in this embodiment of this application. In addition, types of the P RUs (or may be referred to as sizes of the RUs) may be the same or may be different. This is also not specifically limited in this embodiment of this application. For example, if P is 2, two RUs allocated to the first STA may be both 26-subcarrier RUs (namely, resource units including 26 subcarriers), or one of the two RUs may be a 26-subcarrier RU, and the other RU may be a 52-subcarrier RU (namely, a resource unit including 52 subcarriers). It should be noted that the RU may be a resource unit specified in IEEE 802.11, where a type and a corresponding subcarrier position are specified. For example, a resource unit in 802.11ax may also be a resource unit that may be obtained through division by another wireless communications system to support OFDMA transmission.

During each data transmission, the AP divides the spectrum bandwidth into several RUs. Therefore, when performing resource allocation, the AP may determine, based on information such as a quantity of resource units that can be simultaneously supported by the first STA for transmission, and a service volume that needs to be transmitted by the first STA, a quantity of RUs allocated to the first STA and a type of each RU. In a possible design, in a process of associating with the AP, a STA may include, in an association request frame, information about a quantity of resource units that can be simultaneously supported by the STA for transmission, so that the AP can properly schedule a radio resource based on a capability of the STA. Alternatively, in another possible design, a WLAN system may preset a quantity of resource units that are simultaneously supported by each STA for transmission. Alternatively, a WLAN system may not limit a quantity of resource units that are simultaneously supported by a STA for transmission, and the AP allocates resource units to each STA based on a resource status of the AP. This is not specifically limited in this embodiment of this application.

In a possible implementation, the P RUs allocated to the first STA may be used to jointly carry a same data frame of the first STA, where different RUs are used to carry different parts of the same data frame. This may be implemented in a manner such as distribution of encoded bits or data frame segmentation. In another possible implementation, the P RUs allocated to the first STA may be used to respectively carry a plurality of data frames of the first STA. Herein, a data frame carried on the RU may be a downlink data frame, for example, an aggregate MAC layer protocol data unit (aggregate MAC protocol data unit, A-MPDU) or a single MAC layer protocol data unit (MAC protocol data unit, MPDU), or may be an uplink data frame. This is not specifically limited in this embodiment of this application. It should be noted that the data frame in this application includes a data frame, a control frame, a management frame, and the like in IEEE 802.11.

FIG. 6 is an example of a schematic diagram of RU allocation according to an embodiment of this application. As shown in FIG. 6, if a spectrum bandwidth is divided into nine RUs, four STAs simultaneously perform data transmission on the spectrum bandwidth. A first STA is allocated to an RU 1, an RU 4, and an RU 9, a second STA is allocated to an RU 2 and an RU 3, a third STA is allocated to an RU 5, an RU 6, and an RU 7, and a fourth STA is allocated to an RU 8. For the first STA, the RU 1, the RU 4, and the RU 9 may be configured to carry one downlink data frame sent by the AP to the first STA. When sending the downlink data frame, the AP may allocate, through a bit parser at a transmit end, the encoded data frame to the RU 1, the RU 4, and the RU 9 according to a specific rule. In addition, the RU 1, the RU 4, and the RU 9 are respectively configured to transmit different parts of the data frame. Alternatively, each of the RU 1, the RU 4, and the RU 9 is configured to independently transmit one downlink data frame sent by the AP to the first STA.

As described above, one RU allocated by the AP to the STA may be indicated through one station information field. If the AP allocates P RUs to the first STA, the first frame includes at least P station information fields used to indicate the P RUs. However, generally, the AP may allocate RUs in the spectrum bandwidth to a plurality of STAs for multi-user OFDMA transmission, or may simultaneously allocate one or more RUs in the spectrum bandwidth to a plurality of STAs for MU-MIMO transmission. Therefore, a quantity of station information fields actually included in the first frame is greater than P, that is, the first frame further includes a station information field of another STA that simultaneously performs data transmission with the first STA, so that each STA participating in transmission can learn of a resource unit allocated to the STA.

It is assumed that the first frame includes a total of Q station information fields, and Q is a positive integer greater than or equal to P. To effectively distinguish RUs allocated to different STAs, each station information field further includes an identifier of a STA. After each of a plurality of STAs participating in simultaneous transmission receives the first frame, each STA needs to read only signaling information in a station information field that includes an identifier of the STA, so as to determine an RU allocated by the AP to the STA through the station information field.

In a possible design, the Q station information fields may be arranged according to an order of positions, of RUs in the spectrum bandwidth, indicated by the Q station information fields or corresponding resource allocation indication fields. For example, the Q station information fields may be arranged according to an order of RUs from a low frequency to a high frequency, or may be arranged according to an order of RUs from a high frequency to a low frequency. This is not specifically limited in this embodiment of this application. Because the P RUs allocated to the first STA may be inconsecutive in the spectrum bandwidth, the P station information fields used to indicate the P RUs may also be inconsecutively arranged in the Q station information fields.

Therefore, in this embodiment of this application, each station information field in the first frame may further include the end indication information, to indicate a position of the last station information field in a plurality of station information fields related to a same STA. If the STA has read the last station information field related to the STA, it indicates that all RUs allocated by the AP to the STA have been indicated, and the STA does not need to continue to read another subsequent station information field unrelated to the STA, thereby effectively reducing power consumption of the STA.

Specifically, the end indication information may have a plurality of possible implementations. In a possible design, the end indication information may be located in a first indication field in each station information field, and when a value of the first indication field is a first value, it indicates that the station information field is the last station information field in the P station information fields, or when a value of the first indication field is a second value, it indicates that the station information field is not the last station information field in the P station information fields.

Using the first STA as an example, for the last station information field in the P station information fields, a value of a first indication field in the station information field is the first value, and for other station information fields, other than the last station information field, in the P station information fields, values of first indication fields in these station information fields may be the second value that is different from the first value. Therefore, in the P station information fields, the last station information field may be effectively distinguished from the other station information fields. In this way, when the first STA reads a station information field, if it is determined that the station information field includes an identifier of the first STA, and a value of a first indication field in the station information field is a first set value, it may be determined that the station information field is the last station information field in the P station information fields. The first STA may no longer read a subsequent station information field, but may enter a state of preparing to send or receive data.

For example, the first indication field may be a field that occupies one or more bits in the station information field, and a value of the field may be 0 or 1. In this way, the first value may be set to 1, and the second value may be set to 0, so that the last station information field in the P station information fields is effectively distinguished through the value of the first indication field.

It should be noted that, when the end indication information uses this implementation, as shown in FIG. 6, a plurality of RUs allocated to a same STA may use a same modulation and coding scheme (MCS), or may use different MCSs. This is not specifically limited in this embodiment of this application.

In another possible design, the end indication information may be an MCS field in each station information field. When a value of the MCS field is an MCS used when the RU carries data, it indicates that the station information field is the last station information field in the P station information fields, or when a value of the MCS field is a specific MCS, it indicates that the station information field is not the last station information field in the P station information fields.

Using the first STA as an example, for the last station information field in the P station information fields, a value of an MCS field in the station information field may be an MCS used when the RU allocated to the first STA carries data, and for other station information fields, other than the last station information field, in the P station information fields, values of MCS fields in these station information fields may be specific MCSs.

It can be learned that, in the P station information fields related to the first STA, because values of MCS fields in the first P−1 station information fields are all specific MCS values, and MCSs used when RUs indicated by the P−1 station information fields carry data information are not described, only the MCS field in the last station information field describes the MCS used when the RU allocated to the first STA carries the data information. Therefore, when the first STA reads a station information field, if it is determined that the station information field includes an identifier of the first STA, and a value of an MCS field in the station information field is a specific MCS, it may be determined that the station information field is not the last station information field, and the first STA needs to read a subsequent station information field until the last station information field related to the first STA is read. Because the AP indicates the MCS only through the last station information field, it is required that the P RUs allocated to the first STA use a same MCS when carrying the data information.

In this embodiment of this application, the specific MCS may be a special, unused, undefined, or invalid MCS value. For example, a current MCS field is generally represented by 4 bits, but used and defined MCS values include only 0 to 11, and 12 to 15 are not used yet. Therefore, an MCS value from 12 to 15 may be used as the specific MCS value, to indicate that a station information field in which the specific MCS value is located is not the last station information field related to a current STA.

It should be noted that the first frame in step S501 may be a downlink multi-user physical layer protocol data unit (MU PPDU) or a trigger frame. An application scenario and a frame structure of the downlink MU PPDU are different from those of the trigger frame. However, when the AP allocates P RUs to the first STA, both the downlink MU PPDU and the trigger frame have the foregoing P station information fields.

Specifically, the downlink MU PPDU in this embodiment of this application is specifically used in a downlink multi-user data transmission scenario. When the AP needs to perform downlink multi-user data transmission, the AP may generate a downlink MU PPDU, indicate, in the downlink MU PPDU, an RU allocated to each STA, and directly send, to each STA, downlink data information to be sent to each STA through a data field of the downlink MU PPDU, where downlink data information of each STA is transmitted only on an RU allocated to the STA.

The downlink MU PPDU may alternatively be a next-generation extremely high throughput multi-user physical layer protocol data unit (EHT MU PPDU) obtained through evolution according to the current 802.11ax protocol. This is not specifically limited in this embodiment of this application.

Figure 7:
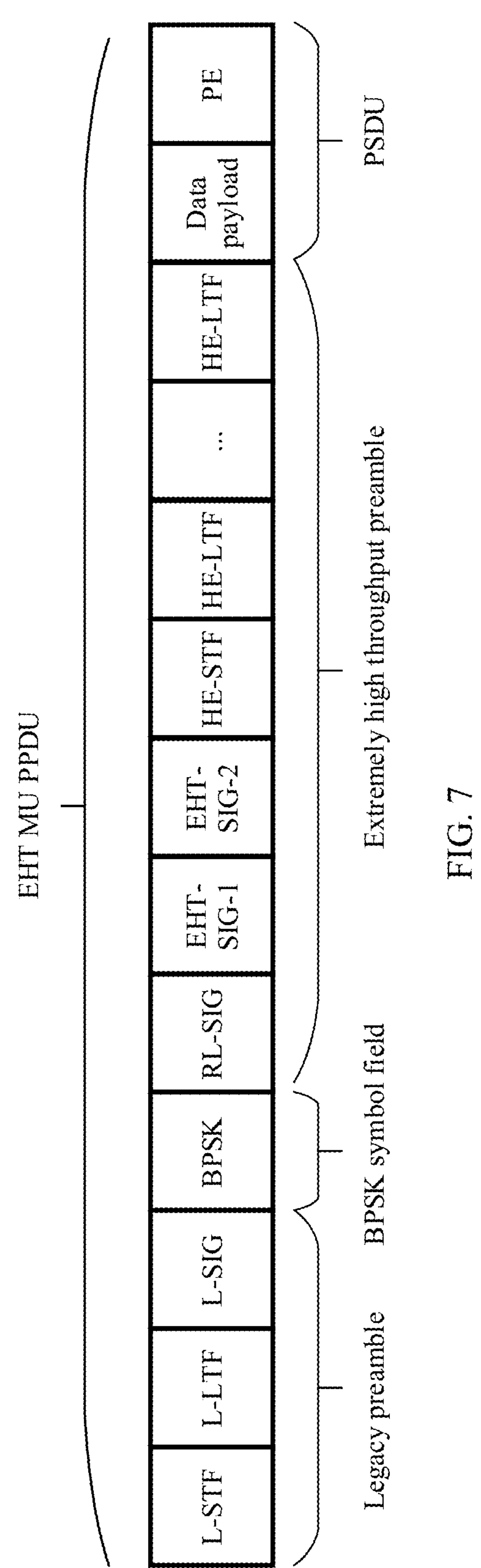
FIG. 7 shows a frame structure of a downlink MU PPDU according to an embodiment of this application.

FIG. 7 shows an example of a frame structure of the downlink MU PPDU. As shown in FIG. 7, the downlink MU PPDU may include fields such as an L-preamble field, a binary phase shift keying (BPSK) symbol field, a first extremely high throughput (EHT) signaling field, a second EHT signaling field, an extremely high throughput short training field (EHT-STF), an extremely high throughput long training field (EHT-LTF), and a data field. In this embodiment of this application, the P station information fields used to indicate the RU allocated to the first STA may be located in the second EHT signaling field.

In another possible implementation, the downlink MU PPDU may include fields such as an L-preamble field, a first EHT signaling field modulated through BPSK (where if the first EHT signaling field includes a plurality of OFDM symbols, it only needs to be ensured that the first OFDM symbol is modulated through BPSK), a second EHT signaling field, an EHT-STF field, an EHT-LTF field, and a data field. A third EHT-SIG field may exist after the EHT-LTF field, where subcarrier spacings of the EHT-STF field, the EHT-LTF field, the third EHT-SIG field, and the data field are different from a subcarrier spacing of the legacy preamble field. For example, the subcarrier spacings of the EHT-LTF field, the third EHT-SIG field, and the data field are less than the subcarrier spacing of the legacy preamble field, where the subcarrier spacings of the former are 78.125 kHz, and the subcarrier spacing of the latter is 312.5 kHz.

A function of the first EHT signaling field is similar to a function of an HE-SIG-A field in an HE-preamble part of a current HE MU PPDU, and the first EHT signaling field may also be referred to as an EHT-SIG 1 field or an EHT-SIG A field, or may have another name. This is not specifically limited in this embodiment of this application. Likewise, a function of the second EHT signaling field is similar to a function of an HE-SIG-B field in the HE-preamble part of the current HE MU PPDU, and the second EHT signaling field may be referred to as an EHT-SIG 2 field or an EHT-SIG B field, or may have another name. This is also not specifically limited in this embodiment of this application.

Specifically, the second EHT signaling field may include resource allocation indication information and Q station information fields including the P station information fields, where Q is a positive integer greater than or equal to P. The resource allocation indication information is used to indicate that a transmission bandwidth of the downlink PPDU is divided into several RUs. Positions of the P station information fields related to the first STA in the Q station information fields and the resource allocation indication information jointly determine the RU allocated to the first STA.

Figure 8:
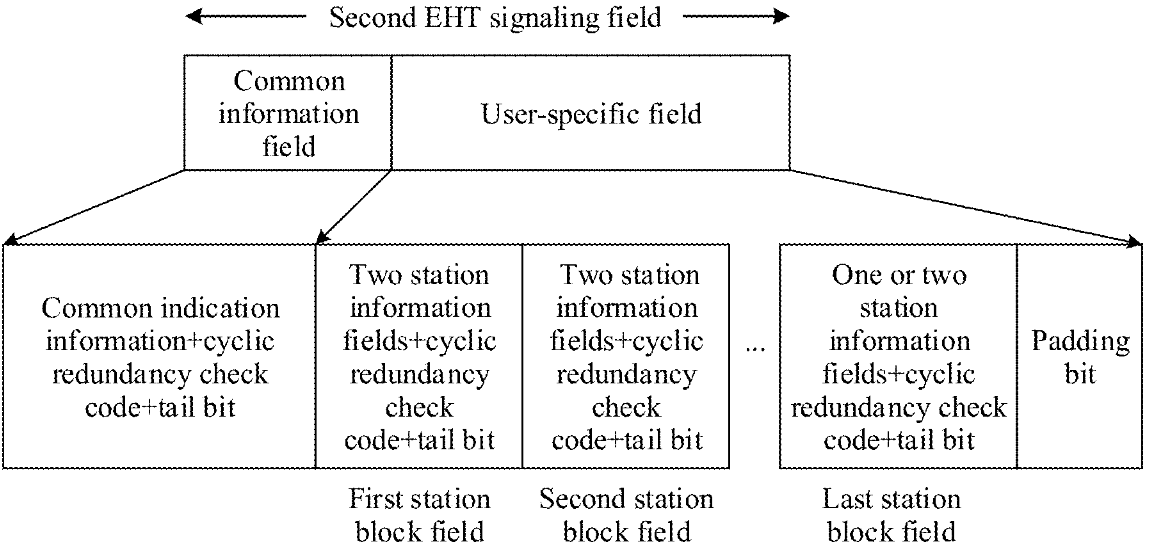
FIG. 8 is a schematic diagram of a frame structure of a second EHT signaling field in a downlink MU PPDU frame according to an embodiment of this application.

FIG. 8 shows an example of a frame structure of a second EHT signaling field in a downlink MU PPDU frame according to an embodiment of this application. As shown in FIG. 8, the second EHT signaling field may include a common information field (common field) and a user specific field (user specific). The user-specific field may also be referred to as a station-specific field. The resource allocation indication information is located in the common information field, and is used to indicate several RUs obtained by dividing the spectrum bandwidth according to a specific spectrum order, and each RU sequentially corresponds to one station information field in the station-specific field.

In a possible design, the resource allocation indication information may be represented by a plurality of bit sequences that are sequentially arranged in a specified spectrum order, where one bit sequence is used to represent a spectrum division result in a unit spectrum bandwidth. For example, the unit spectrum bandwidth may be 20 MHz, and a spectrum division result in each unit spectrum bandwidth is represented by an 8-bit sequence. Therefore, if the overall spectrum bandwidth is 160 MHz, the resource allocation indication information needs to be represented by 8*8-64 bits in total. If the second EHT signaling field is transmitted in a "preamble puncturing" manner (where this part of content is described in detail in Embodiment 3), in two content channels included in the second EHT signaling field, each content channel needs to include resource allocation indication information of 64/2=32 bits.

The spectrum order may be an arrangement order of RUs from a low frequency to a high frequency, or may be an arrangement order of RUs from a high frequency to a low frequency. This is not specifically limited in this embodiment of this application only if the order of RUs indicated in the resource allocation indication information is consistent with an arrangement order of station information fields in the station-specific field.

In addition, the common information field may further include an indication for indicating whether to participate in MU-MIMO transmission, for example, carry an indication of information about a quantity of stations corresponding to each resource unit. If a quantity of stations corresponding to a resource unit is 1, single-user transmission is performed on the resource unit, or if there are a plurality of stations corresponding to the resource unit, MU-MIMO transmission is performed on the resource unit. This is not specifically limited in this embodiment of this application.

The Q station information fields may be located in the station-specific field. Specifically, the station-specific field includes several station block fields, a cyclic redundancy check code (CRCC) field, and a tail bit (tail) field. The last station block field in the station-specific field includes one or two station information fields, a CRC field, and a tail field, and all other station block fields other than the last station block field include two station information fields, a CRC field, and a tail field.

In this embodiment of this application, content of the station information fields may be slightly different depending on whether the station information fields participate in MU-MIMO transmission. For example, each station information field that does not participate in MU-MIMO transmission may include an 11-bit station identifier, a 3-bit quantity of streams, 1-bit transmit end beamforming, a 4-bit MCS, 1-bit dual carrier modulation (DCM), and a 1-bit coding indication, which are 21 bits in total. Alternatively, 1-bit end indication information is further included on this basis.

Each station information field that participates in MU-MIMO transmission includes an 11-bit station identifier, a 4-bit spatial stream configuration table, a 4-bit MCS, a 1-bit coding indication, and 1-bit reservation, which are 21 bits in total. Alternatively, 1-bit end indication information is further included on this basis.

The trigger frame in this embodiment of this application may be used in an uplink multi-user data transmission scenario. When a plurality of STAs need to simultaneously send uplink data information, the AP first sends the trigger frame to each STA participating in multi-user data transmission, and indicates, in the trigger frame, an RU allocated to each STA. Subsequently, after receiving the trigger frame, each STA simultaneously responds with an uplink OFDMA frame, MU-MIMO frame, or hybrid frame of OFDMA and MU-MIMO. Then, the AP may send an acknowledgment frame based on the received uplink OFDMA frame, MU-MIMO frame, or hybrid frame of OFDMA and MU-MIMO, to trigger each STA to transmit the uplink data information on the RU allocated by the AP to the STA.

FIG. 9 shows an example of a frame structure of a trigger frame according to an embodiment of this application. As shown in FIG. 9, the trigger frame may include a frame control field (frame control), a duration field (duration), a receiver address (RA), a transmitter address (TA), a common information field (common info), Q station information fields (per STA info), a bit padding field, and a frame check sequence field (frame check sequence, FCS).

In this embodiment of this application, the P station information fields used to indicate the RU allocated to the first STA are located in Q station information fields, and Q herein is a positive integer greater than or equal to P. Each station information field may be arranged according to an order of positions, of RUs in the spectrum bandwidth, indicated by the station information field. The spectrum order may be an order of RUs from a low frequency to a high frequency, or may be an order of RUs from a high frequency to a low frequency. This is not specifically limited in this embodiment of this application.

Functions of the common information field and the station information field of the trigger frame are similar to those of the common information field and the station information field in the second EHT signaling field in the downlink MU PPDU. However, a difference lies in that the common information field of the trigger frame no longer carries joint resource unit indication information, but places independent resource allocation information in each station information field.

Specifically, each station information field in the trigger frame includes a 1-bit association identifier, 8-bit resource unit indication information, 1-bit uplink error correction coding, a 4-bit MCS, 1-bit uplink DCM, 6-bit spatial stream allocation, a 7-bit uplink received signal strength indicator (RSSI), several other specific signaling indicator bits related to a type of the trigger frame, and the like.

It should be noted that in this embodiment of this application, any STA (namely, the first STA) associated with the AP is used as an example for description. For another STA, the resource allocation manner of allocating a plurality of RUs and indicating the last station information field provided in this embodiment of this application is also applicable. In a possible implementation, the AP may alternatively allocate the P RUs to a same station set that includes a plurality of stations, for example, allocate the P RUs to the first STA and a second STA, so that these STAs can apply MU-MIMO transmission on the allocated P RUs. It may also be understood that the first station mentioned in this embodiment of this application may be replaced with a first station set including a plurality of stations, that is, the plurality of stations in the first station set perform MU-MIMO transmission on corresponding P resource units.

Embodiment 2

Figures 10, 11:
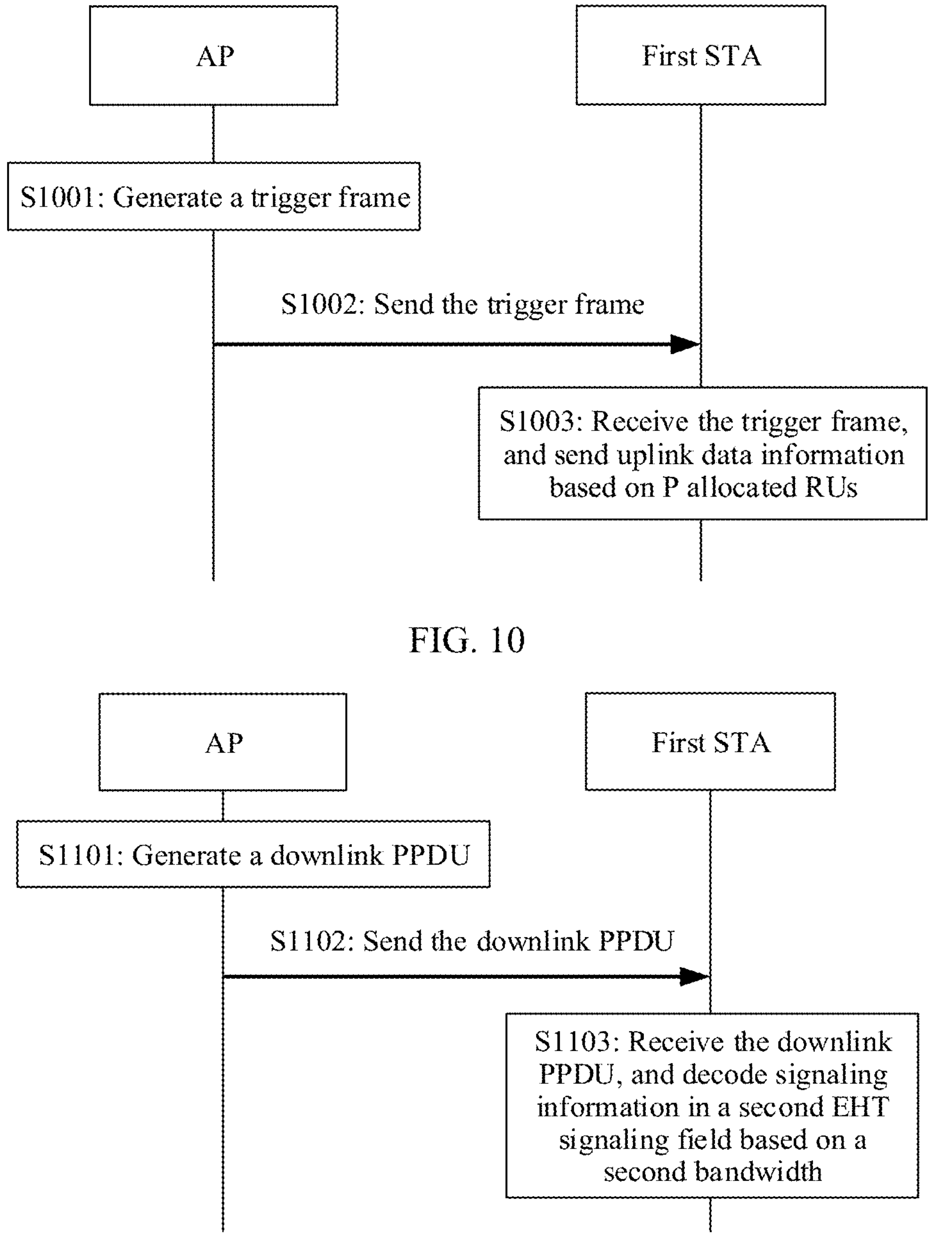
FIG. 10 is a schematic flowchart of a communication method according to Embodiment 2 of this application.
FIG. 11 is a schematic flowchart of a communication method according to Embodiment 3 of this application.

FIG. 10 shows an example of another communication method according to an embodiment of this application. The method may include the following steps.

Step S1001: An access point AP generates a trigger frame, where the trigger frame includes P station information fields, each of the P station information fields corresponds to one resource unit RU allocated to a first station STA, the P station information fields are consecutively arranged, and P is a positive integer greater than 1.

Step S1002: The AP sends the trigger frame to the first STA.

Step S1003: The first STA receives the trigger frame, and sends uplink data information based on the P allocated RUs.

An application scenario, a frame structure, and other content in each station information field other than end indication information of the trigger frame in this embodiment of this application may be the same as those described in Embodiment 1, and details are not described herein again. Although it is described in step S1002 and step S1003 that the AP sends the trigger frame to the first STA and the first STA receives the trigger frame, it should be understood that, in a multi-user data transmission scenario, the trigger frame herein is a trigger frame sent to a plurality of STAs participating in multi-user data transmission. The trigger frame may include Q station information fields, to indicate an allocated resource to each STA, where Q is a positive integer greater than or equal to P.

Considering that each station information field in the trigger frame already includes independent resource unit indication information, in this embodiment of this application, a plurality of station information fields related to a same station may be consecutively arranged. In this way, there is no need to additionally set end indication information in the station information fields. When any STA participating in multi-user data transmission reads the station information fields, if it is found, when the STA reads a next station information field, that the next station information field includes an identifier of another STA, it may be determined that all RUs allocated by the AP to the STA have been indicated, and a previous station information field is the last station information field related to the station.

The first STA is used as an example. Because each RU allocated to the first STA is indicated through one station information field, in this embodiment of this application, the P station information fields that include an identifier of the first STA may be consecutively arranged. This is also true for another STA participating in multi-user data transmission.

In another possible implementation, the station information field may include resource unit indication information of a plurality of resource units allocated to a related STA. For example, information about all the P RUs allocated to the first STA may be indicated in a same station information field. In this way, in this scenario, station identifiers included in the Q station information fields are different from each other.

Embodiment 3

To resolve a technical problem that when an orthogonal frequency division multiple access (OFDMA) technology is used to perform multi-user data communication, lengths of signaling information carried on odd and even HE SIG B channels need to be balanced during HE MU PPDU transmission, an embodiment of this application provides a communication method to transmit a second EHT signaling field in an EHT MU PPDU through a large bandwidth.

FIG. 11 shows an example of a communication method according to an embodiment of this application. The method may include the following steps.

Step S1101: An access point AP generates a downlink physical layer protocol data unit PPDU, and the downlink PPDU includes a second extremely high throughput EHT signaling field.

Step S1102: The AP sends the downlink PPDU to a first STA, and the second EHT signaling field is replicated and transmitted in a unit of a second bandwidth within a transmission bandwidth range of the downlink PPDU, where the second bandwidth is $2^N$ times a first bandwidth, and N is 0 or a positive integer.

Step S1103: The first STA receives the downlink PPDU sent by the AP, and decodes signaling information in the second EHT signaling field based on the second bandwidth.

Specifically, the downlink PPDU in step S1101 may be a next-generation extremely high throughput multi-user physical layer protocol data unit (EHT MU PPDU) obtained through evolution according to the current 802.11ax protocol.

FIG. 12 shows an example of a transmission structure of the EHT MU PPDU. As shown in FIG. 12, the EHT MU PPDU may include fields such as an L-preamble field, a binary phase shift keying (BPSK) symbol field, a first EHT signaling field, a second EHT signaling field, an extremely high throughput short training field (EHT-STF), an extremely high throughput long training field (EHT-LTF), and a data field.

In another possible implementation, the BPSK symbol field may not exist, but it is required that the first OFDM symbol of the first EHT signaling field needs to use a BPSK symbol. Specifically, the EHT MU PPDU may include fields such as an L-preamble field, a first EHT signaling field modulated through BPSK (where if the first EHT signaling field includes a plurality of OFDM symbols, it only needs to be ensured that the first OFDM symbol is modulated through BPSK), a second EHT signaling field, an EHT-STF field, an EHT-LTF field, and a data field. A third EHT-SIG field may exist after the EHT-LTF field, where subcarrier spacings of the EHT-STF field, the EHT-LTF field, the third EHT-SIG field, and the data field are different from a subcarrier spacing of the legacy preamble field. For example, the subcarrier spacings of the EHT-LTF field, the third EHT-SIG field, and the data field are less than the subcarrier spacing of the legacy preamble field, where the subcarrier spacings of the former are 78.125 kHz, and the subcarrier spacing of the latter is 312.5 kHz.

Because an 802.11n receive end performs automatic detection by determining a constellation point mapping manner of the first OFDM field after L-SIG, when the first field of a new physical layer preamble uses a constellation point mapping manner QBPSK, the following problem exists: The 802.11n receive end determines, based on that the constellation point mapping manner of the first OFDM field after the L-SIG is rotation binary phase shift keying (QBPSK), that the PPDU is a high throughput HT PPDU; if the PPDU is not an HT PPDU, the 802.11n receive end may incorrectly decode the first field of the new preamble, for example, cyclic redundancy check cannot succeed, and then the 802.11n receive end does not remain silent for a period of time to comply with a length field of the L-SIG; and this behavior may interfere with a PPDU that is being transmitted.

In this embodiment of this application, the first field of the new physical layer preamble uses a non-rotated constellation point mapping manner other than QBPSK. This can avoid a dangerous behavior that the 802.11n receive end incorrectly determines that a next-generation PPDU is an HT PPDU and then does not comply with the length field in the L-SIG. It should be noted that, for another receive end, for example, a receive end of 802.11a, 802.11ac, or 802.11ax, even if a next-generation PPDU is incorrectly determined as a PPDU of 802.11a, a VHT PPDU of 802.11ac, or an HE PPDU of 802.11ax through automatic detection, the dangerous behavior that the 802.11n receive end does not comply with the length field in the L-SIG does not occur.

A function of the first EHT signaling field is similar to a function of an HE-SIG-A field in an HE-preamble part of a current HE MU PPDU, and the first EHT signaling field may also be referred to as an EHT-SIG 1 field or an EHT-SIG A field, or may have another name. This is not specifically limited in this embodiment of this application. Likewise, a function of the second EHT signaling field is similar to a function of an HE-SIG-B field in the HE-preamble part of the current HE MU PPDU, and the second EHT signaling field may be referred to as an EHT-SIG 2 field or an EHT-SIG B field, or may have another name. This is also not specifically limited in this embodiment of this application.

In specific implementation of step S1102, the AP may send the downlink PPDU to the first STA. The second EHT signaling field in the downlink PPDU may be replicated and transmitted in a unit of the second bandwidth within the transmission bandwidth range of the downlink PPDU, and the second bandwidth is $2^N$ times the first bandwidth, and N is 0 or a positive integer. In addition, the L-preamble field, the BPSK symbol field, and the first EHT signaling field in the downlink PPDU may be replicated and transmitted in a unit of the first bandwidth within the transmission bandwidth range of the downlink PPDU, and the first bandwidth may also be referred to as a basic bandwidth. Generally, the first bandwidth may be 20 MHz.

The EHT-STF field, the EHT-LTF, and the data field in the downlink PPDU may be transmitted on resource units RUs obtained by the AP by dividing a transmission bandwidth of the downlink PPDU. The RUs may be RUs of a same size or type (for example, may be all 26 RUs or all 52 RUs), or may be RUs of different sizes or types. This is not specifically limited in this embodiment of this application. It should be noted that the RU may be a resource unit specified in an IEEE 802.11 standard, where a type and a position of a corresponding subcarrier are specified. For example, a resource unit in 802.11ax may also be a resource unit that may be obtained through division by another wireless communications system to support OFDMA transmission. This is not specifically limited in this embodiment of this application.

Figure 13:
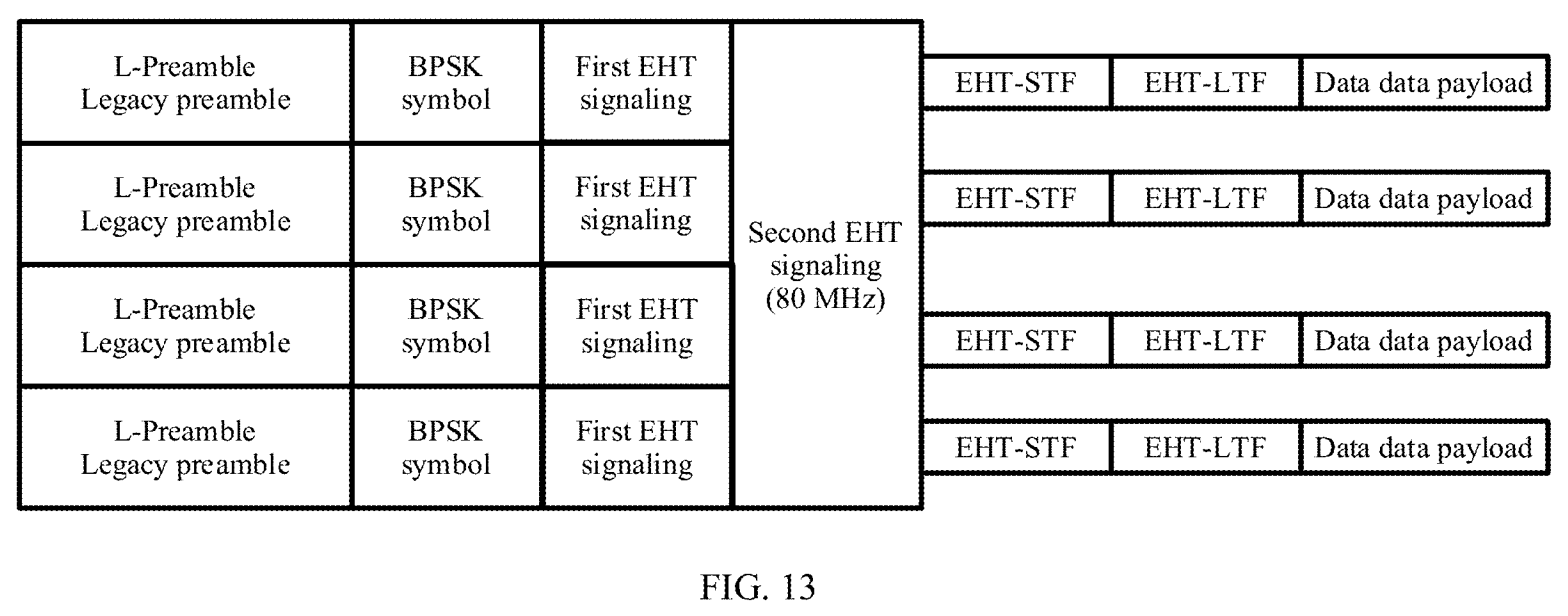

FIG. 12 and FIG. 13 show examples of cases in which N is a positive integer. As shown in FIG. 12, when a value of N is 1, if the first bandwidth is 20 MHz, the second bandwidth may be 40 MHz. In this way, when sending the downlink PPDU, the AP may replicate and transmit the L-preamble field, the BPSK symbol field, and the first EHT signaling field in a unit of 20 MHz, and replicate and transmit the second EHT signaling field in a unit of 40 MHz.

As shown in FIG. 13, when a value of N is 2, if the first bandwidth is 20 MHz, the second bandwidth may be 80 MHz. In this way, when sending the downlink PPDU, the AP may replicate and transmit the L-preamble field, the BPSK symbol field, and the first EHT signaling field in a unit of 20 MHz, and replicate and transmit the second EHT signaling field in a unit of 80 MHz.

In this embodiment of this application, each OFDM symbol of the second EHT signaling field uses a subcarrier spacing of 312.5 kHz. Therefore, in a 20 MHz transmission bandwidth, a second EHT signaling field may include 64 subcarriers, including 52 data subcarriers and four pilot subcarriers; in a 40 MHz transmission bandwidth, a second EHT signaling field may include 128 subcarriers, including 108 data subcarriers and six pilot subcarriers; and in an 80 MHz transmission bandwidth, a second EHT signaling field may include 256 subcarriers, including 234 data subcarriers and eight pilot subcarriers.

It can be learned from this that, the second bandwidth (that is, N is a positive integer) greater than the first bandwidth is used to replicate and transmit the second EHT signaling field. Therefore, not only a technical problem can be avoided, where the technical problem is that the second EHT signaling field is transmitted on two content channels (similar to a current transmission manner of an HE-SIG B in 802.11ax) and lengths of signaling information carried on an odd content channel and an even content channel need to be balanced, but also more signaling information may be further transmitted in the second EHT signaling field, so that a transmission structure of the downlink PPDU is applicable to multi-user data transmission in an ultra-large spectrum bandwidth scenario. For example, the second EHT signaling field replicated and transmitted in the 40 MHz transmission bandwidth may carry signaling information that is four bits more than that carried in the second EHT signaling field replicated and transmitted in the 20 MHz transmission bandwidth.

To support that the second EHT signaling field is replicated and transmitted in a unit of the second bandwidth (where the second bandwidth herein is a second bandwidth when N is a positive integer) in the transmission bandwidth range of the downlink PPDU, the first EHT signaling field in the downlink PPDU provided in this embodiment of this application may further include M channel estimation subcarriers, to perform channel estimation on an extra data subcarrier when the second EHT signaling field is transmitted through the second bandwidth, so that a receive end can correctly perform decoding. The M channel estimation subcarriers carry a specified value or a specified bit sequence that is known to the first STA. For example, the specified value may be 1 or −1.

Specifically, M is a positive integer, and the value of M is determined by the AP based on a quantity of subcarriers used in the second EHT signaling field and a quantity of channel estimation subcarriers that can be provided by the L-preamble field and the BPSK symbol field within a range of the second bandwidth. In this embodiment of this application, the value of M is equal to the quantity of subcarriers used in the second EHT signaling field minus the quantity of channel estimation subcarriers that can be provided by the L-preamble field and the BPSK symbol field.

For example, if the first bandwidth is 20 MHz, and the second bandwidth is 40 MHz, two L-LTFs of L-preamble fields transmitted in the first 20 MHz bandwidth and the second 20 MHz bandwidth may provide 104 channel estimation subcarriers, two L-SIG and two BPSK symbol fields of the L-preamble field may provide eight channel estimation subcarriers, and a second EHT signaling field of a 40 MHz bandwidth includes 114 used subcarriers in total. Therefore, two channel estimation subcarriers need to be inserted into the first EHT signaling field for channel estimation, that is, 114−104−8=2. Herein, the inserting two channel estimation subcarriers specifically refers to inserting two channel estimation subcarriers into a first EHT signaling field transmitted in two 20 MHz bandwidths corresponding to every 40 MHz bandwidth of the transmission bandwidth. Considering that a sequence number of an inserted subcarrier changes with a PPDU bandwidth, the sequence number of the inserted channel estimation subcarrier is not specifically described in this embodiment of this application.

For another example, if the first bandwidth is 20 MHz, and the second bandwidth is 80 MHz, four L-LTFs of L-preamble fields transmitted in the first 20 MHz bandwidth to the fourth 20 MHz bandwidth may provide 208 channel estimation subcarriers, four L-SIG and four BPSK symbol fields of the L-preamble field may provide 16 channel estimation subcarriers, and a second EHT signaling field of an 80 MHz bandwidth includes 242 used subcarriers in total. Therefore, 18 channel estimation subcarriers need to be inserted into the first EHT signaling field for channel estimation, that is, 242−208−16=18. Herein, the inserting 18 channel estimation subcarriers specifically refers to inserting 18 channel estimation subcarriers into a first EHT signaling field transmitted in four 20 MHz bandwidths corresponding to every 80 MHz bandwidth of the transmission bandwidth. Considering that a sequence number of an inserted subcarrier changes with a PPDU bandwidth, the sequence number of the inserted channel estimation subcarrier is not specifically described in this embodiment of this application.

In another possible implementation, an additional channel estimation subcarrier may not be inserted into the first EHT signaling field, but a known signal is carried on a subcarrier that corresponds to the second EHT signaling field and on which additional channel estimation is required. In this way, the known signal carried by the additional data subcarrier may be used to help perform channel estimation on a subsequent field.

In this embodiment of this application, the second EHT signaling field in the downlink PPDU may be replicated and transmitted in a unit of the second bandwidth greater than the first bandwidth within the transmission bandwidth range of the downlink PPDU in the manner described above, or in another feasible implementation, the second EHT signaling field may alternatively be transmitted in a full bandwidth range of the downlink PPDU. For example, if the transmission bandwidth of the downlink PPDU is 320 MHz, a transmission bandwidth (namely, the second bandwidth) of the second EHT signaling in the downlink PPDU may also be 320 MHz. Correspondingly, a corresponding quantity of channel estimation subcarriers also need to be inserted, for channel estimation, into the first EHT signaling within the full bandwidth range.

It should be understood that, when the second EHT signaling field is replicated and transmitted in a unit of the second bandwidth, the second bandwidth should be less than or equal to the transmission bandwidth of the downlink PPDU. In this embodiment of this application, the transmission bandwidth of the downlink PPDU may be spectrum bandwidths such as 20 MHz, 40 MHz, 80 MHz, and 160 MHz bandwidths that are currently specified in the 802.11 protocol and that can be used, or ultra-large bandwidths such as 240 MHz and 320 MHz bandwidths that are to be introduced in a next-generation IEEE 802.11 protocol, or the transmission bandwidth of the downlink PPDU may be a larger spectrum bandwidth to be introduced in the future. This is not specifically limited in this embodiment of this application.

It should be noted that, in this embodiment of this application, the value of N may alternatively be 0. In other words, although more signaling information may be carried when the second bandwidth that is greater than the basic bandwidth (that is, the value of N is a positive integer) is used to transmit the second EHT signaling field, in some specific scenarios, the AP may also perform transmission in the transmission bandwidth range of the downlink PPDU in a unit of the first bandwidth, and content of the second EHT signaling field transmitted in an odd first bandwidth may be different from content of the second EHT signaling field transmitted in an even first bandwidth, as shown in FIG. 14.

Therefore, the downlink PPDU may further include first indication information, to indicate whether the value of N is a positive integer. When the value of N is a positive integer, it means that the AP transmits the second EHT signaling field in a unit of the second bandwidth greater than the first bandwidth. When the value of N is 0, it means that the AP transmits the second EHT signaling field in a unit of the first bandwidth (that is, the second bandwidth is the same as the first bandwidth in this case). The first indication information may be located in one field of the L-preamble field, the first EHT signaling field, or the BPSK symbol field in the downlink PPDU.

In this embodiment of this application, the specific scenario may be a scenario in which the transmission bandwidth of the downlink PPDU is a non-contiguous bandwidth, or the transmission bandwidth of the downlink PPDU is less than the second bandwidth (where the second bandwidth is a second bandwidth when the value of N is a positive integer). In this scenario, due to a limitation of the transmission bandwidth, if the AP still transmits the second EHT signaling field by using the second bandwidth greater than the first bandwidth, no signaling information can be transmitted in some first bandwidths within a range of the second bandwidth, and the signaling information can be transmitted only in some first bandwidths in the range of the second bandwidth. This is essentially the same as transmitting the second EHT signaling field in a unit of the first bandwidth. Therefore, this may also be referred to as a "preamble puncturing transmission manner".

In a possible design, the first indication information may be bandwidth indication information in the first EHT signaling field. When the bandwidth indication information indicates that the transmission bandwidth of the downlink PPDU is a contiguous bandwidth, and the transmission bandwidth is greater than or equal to the second bandwidth, the value of N is a positive integer, or when the bandwidth indication information indicates that the transmission bandwidth of the downlink PPDU is a non-contiguous bandwidth or the transmission bandwidth is less than the second bandwidth, the value of N is 0.

For example, the first bandwidth is 20 MHz. Assuming that the value of N is a positive integer, N is 2, and the second bandwidth is 40 MHz, the value of N is a positive integer 2 and the AP actually transmits the second EHT signaling field in a unit of 40 MHz, only when the transmission bandwidth of the downlink PPDU is a contiguous bandwidth and is greater than or equal to 40 MHz. When the transmission bandwidth of the downlink PPDU is a non-contiguous bandwidth or the transmission bandwidth is less than 40 MHz, the value of N is 0, to indicate that the second EHT signaling field is transmitted in the preamble puncturing manner.

Embodiment 4

Figure 15:
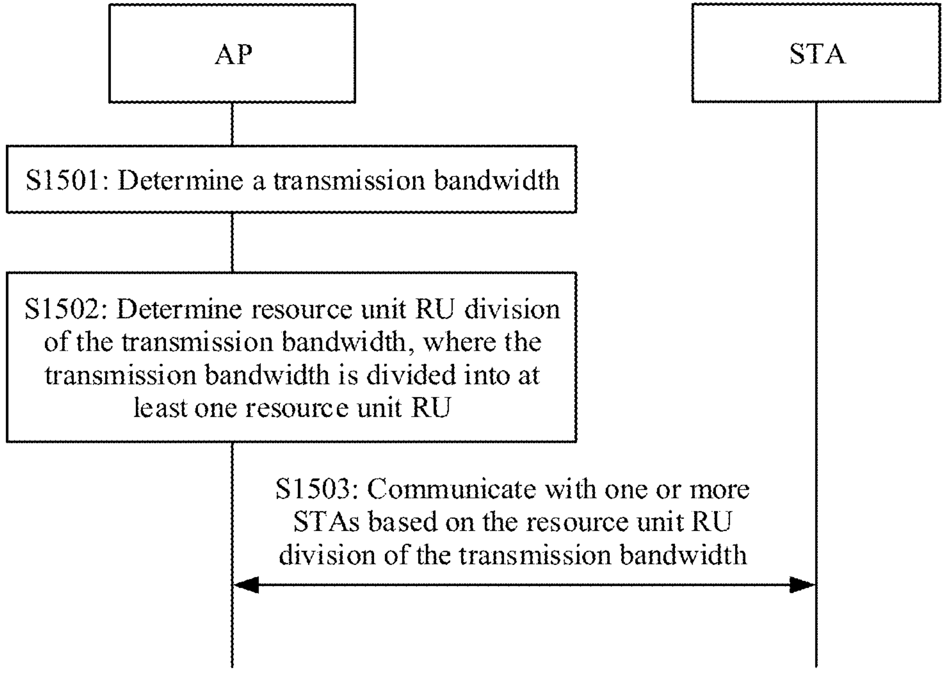
FIG. 15 is a schematic flowchart of a communication method according to Embodiment 4 of this application.

An embodiment of this application further provides another communication method. As shown in FIG. 15, the method specifically includes the following steps.

Step S1501: An access point AP determines a transmission bandwidth, where the transmission bandwidth is used to communicate with one or more stations STAs, and the transmission bandwidth is 240 MHz or 320 MHz.

Step S1502: The access point determines resource unit RU division of the transmission bandwidth, where the transmission bandwidth is divided into at least one resource unit RU, each RU includes at least one subcarrier, and the at least one subcarrier has a fixed position.

Step S1503: The access point communicates with the one or more STAs based on the resource unit RU division of the transmission bandwidth.

In a possible design, the at least one resource unit RU includes any one or any combination of the following: a 26-subcarrier RU, a 52-subcarrier RU, a 106-subcarrier RU, a 242-subcarrier RU, a 484-subcarrier RU, and a 996-subcarrier RU.

It can be learned from the foregoing content that this embodiment of this application provides a corresponding spectrum division manner for an ultra-large bandwidth such as a 240 MHz or 320 MHz bandwidth. The following separately describes in detail spectrum division manners for spectrum bandwidths of 240 MHz and 320 MHz. It should be noted that a larger bandwidth to be introduced in an 802.11 system standard in the future may also be applicable to a spectrum division manner that is the same as or similar to that in this embodiment of this application. This is not specifically limited in this embodiment of this application.

1. 240 MHz

Figure 16A:
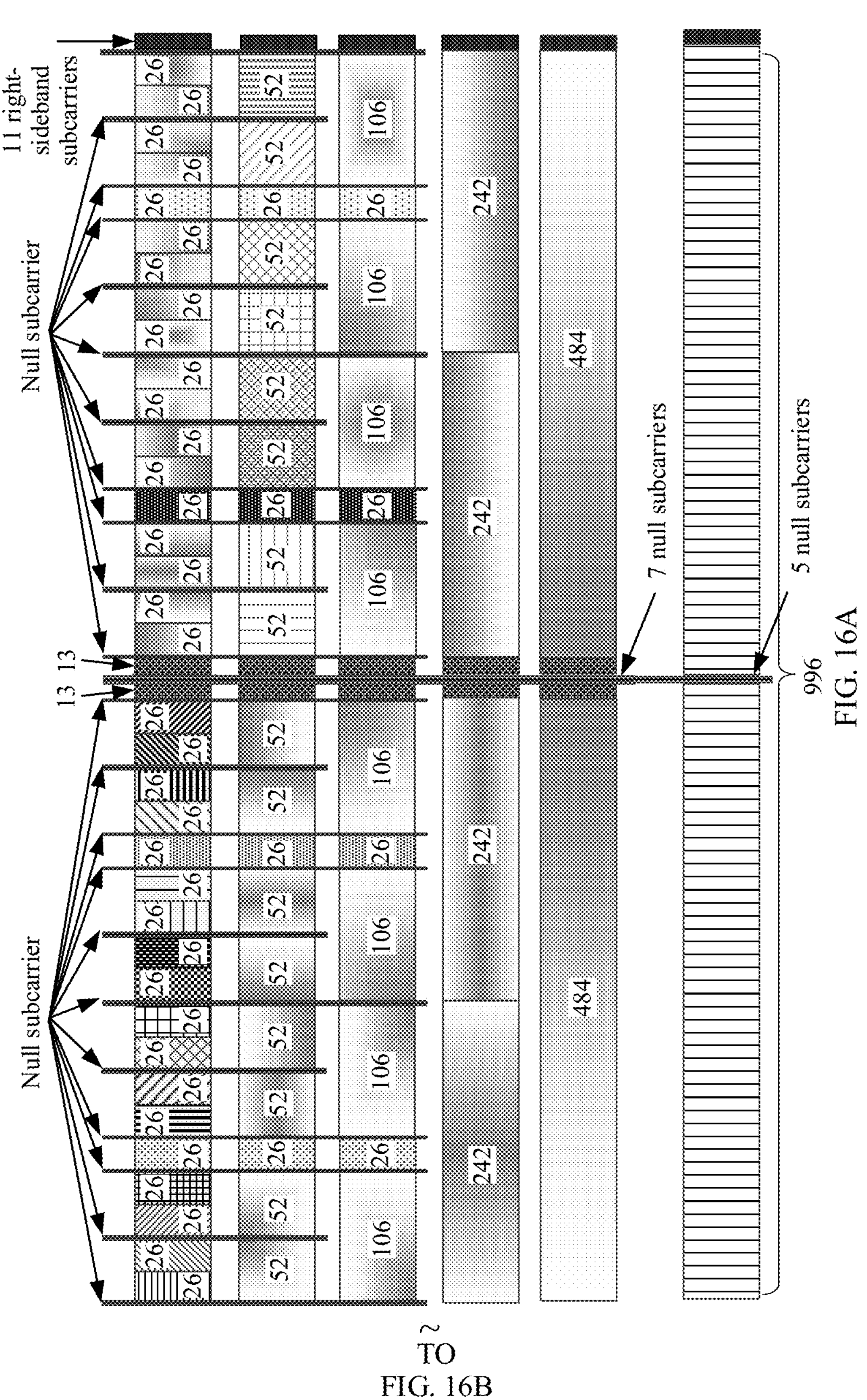
Figure 16B:
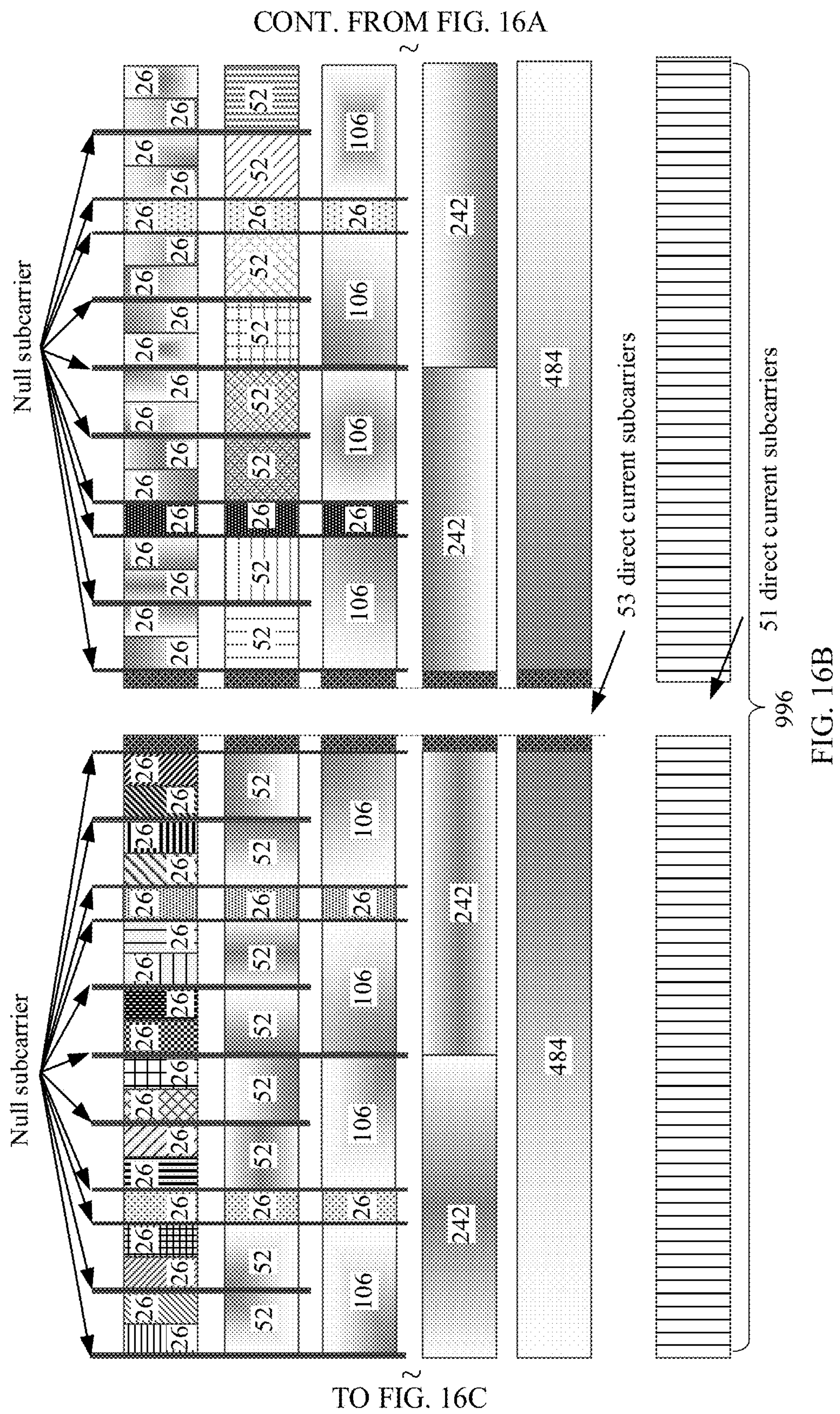
Figure 16C:
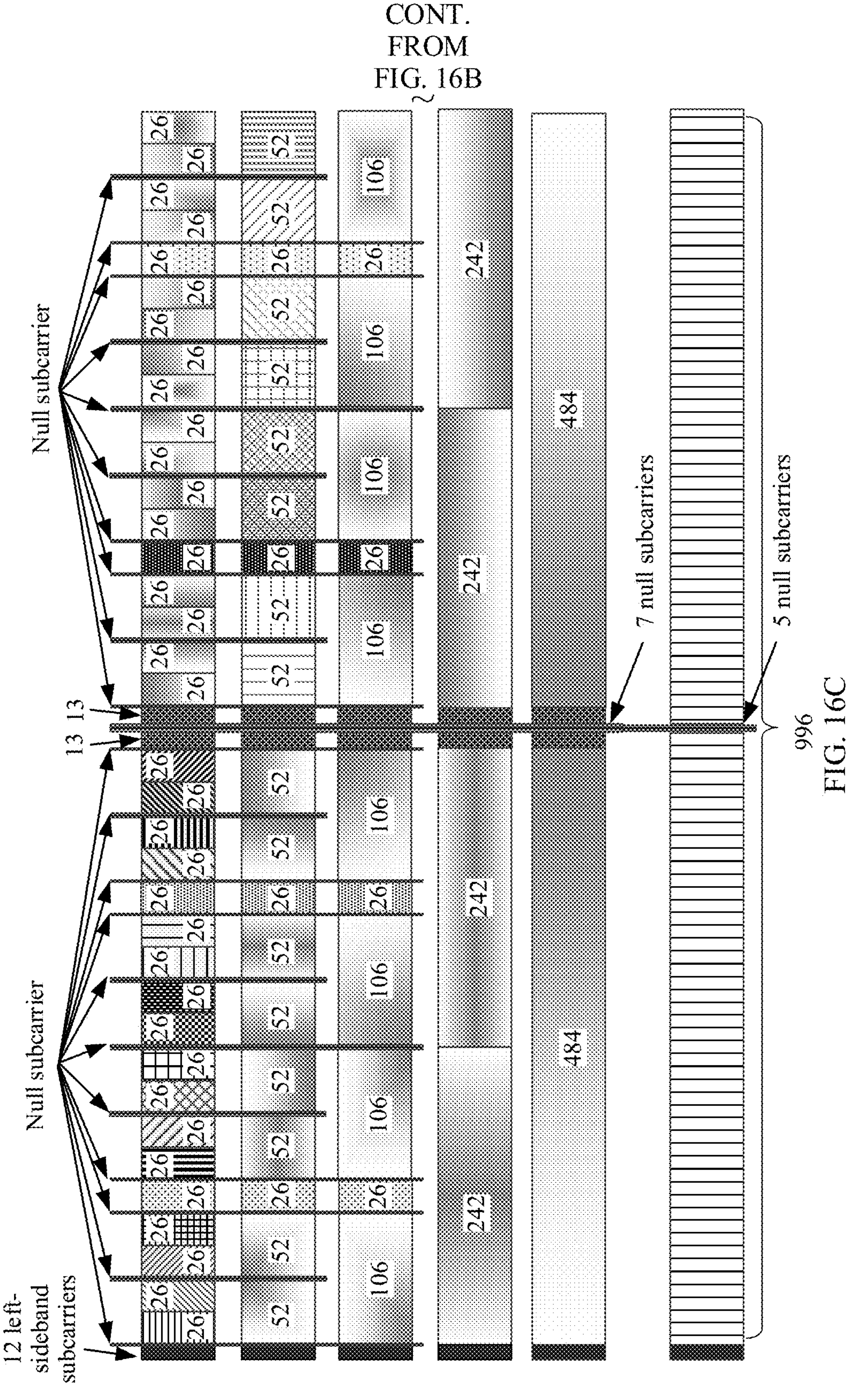

The 240 MHz bandwidth includes 3072 subcarriers in total, and a subcarrier spacing is 78.125 kHz. FIG. 16A, FIG. 16B, and FIG. 16C and FIG. 17A, FIG. 17B, and FIG. 17C show examples of two spectrum division manners of a 240 MHz bandwidth according to an embodiment of this application. As shown in FIG. 16A, FIG. 16B, and FIG. 16C, the 240 MHz bandwidth may be considered as including three independent 80 MHz bandwidths. When a spectrum is divided into smaller resource units such as a 26-RU, a 52-RU, a 106-RU, a 242-RU, and a 484-RU, spectrum division of each 80 MHz bandwidth may be similar to spectrum division of the 80 MHz bandwidth shown in FIG. 8.

For a case in which the spectrum is divided into 996-RUs (the largest resource unit in the 80 MHz bandwidth), as shown in FIG. 16A, FIG. 16B, and FIG. 16C, a possible spectrum division manner is that the entire spectrum bandwidth includes 12 left-sideband subcarriers (guard) and 11 right-sideband subcarriers. There are three 996-RUs between the left-sideband subcarriers and the right-sideband subcarriers, centers of the first and the third 996-RUs each include five null subcarriers, and the center of the spectrum bandwidth includes 51 direct current subcarriers. Sequence numbers of the 12 left-sideband subcarriers are specifically [−1536: −1525], sequence numbers of the 11 right-sideband subcarriers are specifically [1525: 1535], the three 996-subcarrier RUs are specifically located in [−1524: −1027 −1021: −524], [524: 1021 1027: 1524], and [−523: −26 26: 523], the null subcarriers between the first and the third 996-RUs are specifically located in [−1026: −1020] and [1022: 1026], and sequence numbers of the 51 direct current subcarriers are specifically [−25: 25]. In another implementation, a quantity of the direct current subcarriers may be less than 51, for example, may be five [−2: 2] or seven [−3: 3], and remaining subcarriers may be null subcarriers.

Figure 17A:
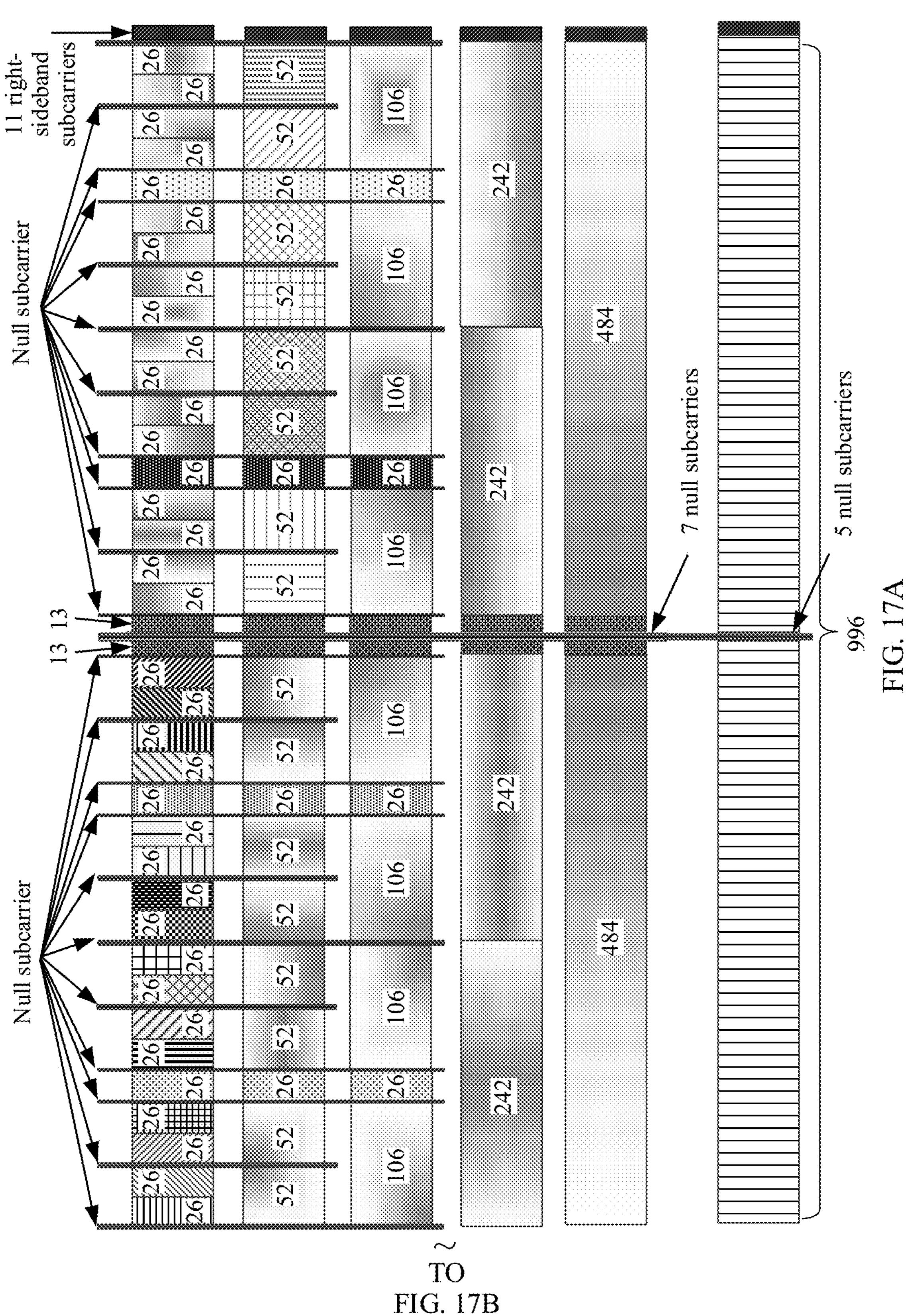
Figure 17C:
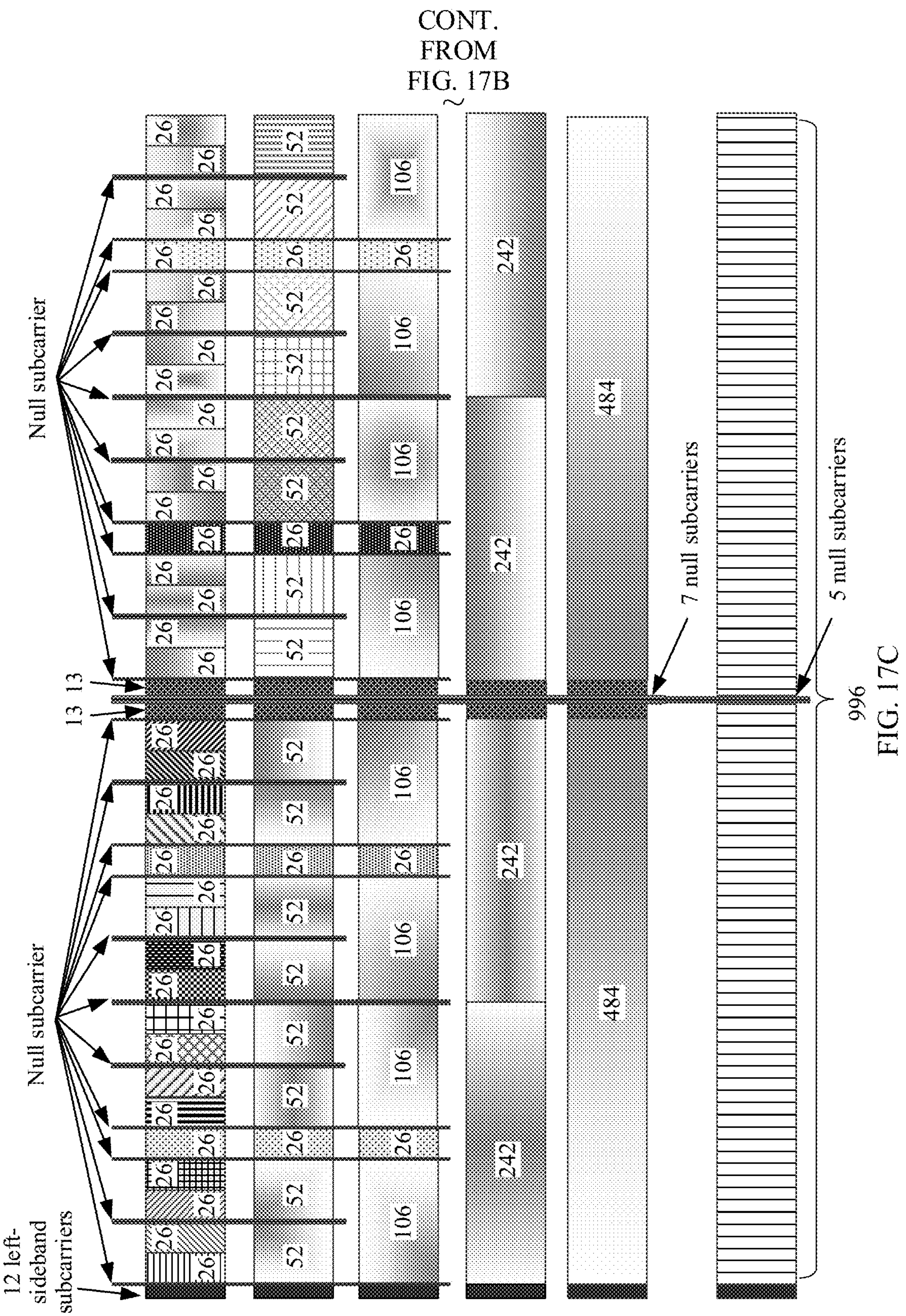
Figure 18A:
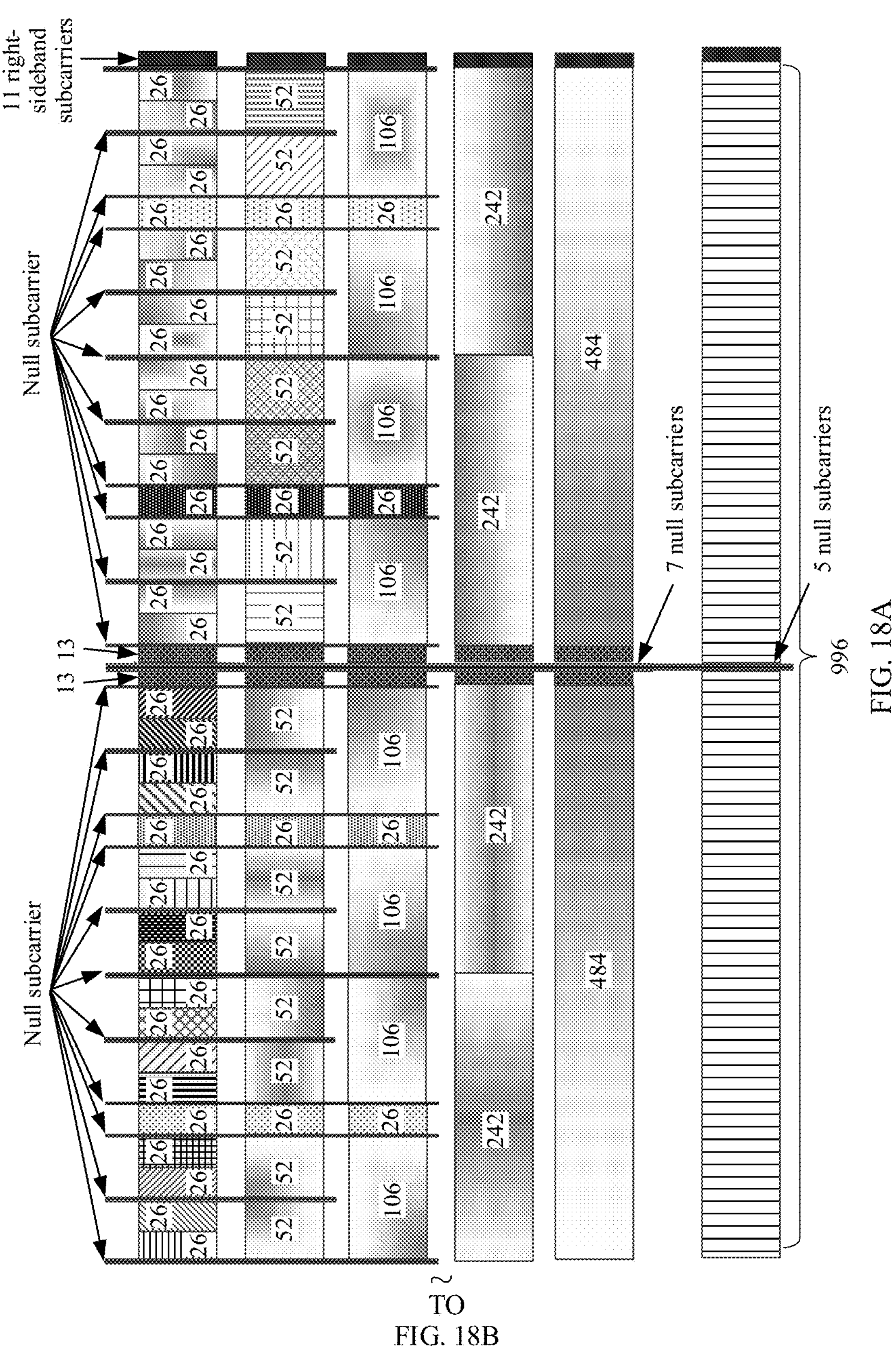
FIG. 18A, FIG. 18B, FIG. 18C, and FIG. 18D and FIG. 19A, FIG. 19B, FIG. 19C, and FIG. 19D are schematic diagrams of spectrum division manners of a 320 MHz ultra-large bandwidth according to an embodiment of this application.
Figure 18B:
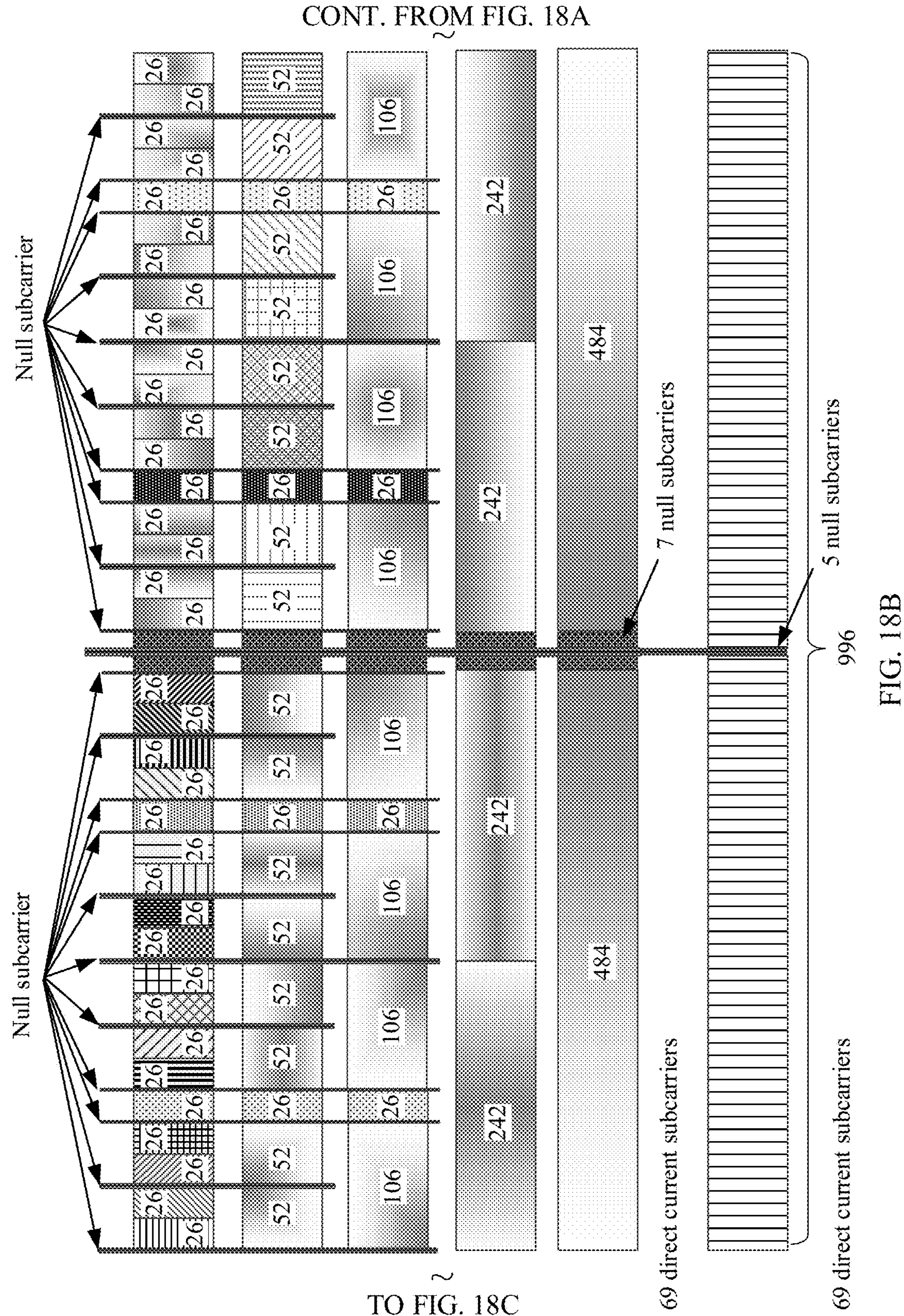
Figure 18C:
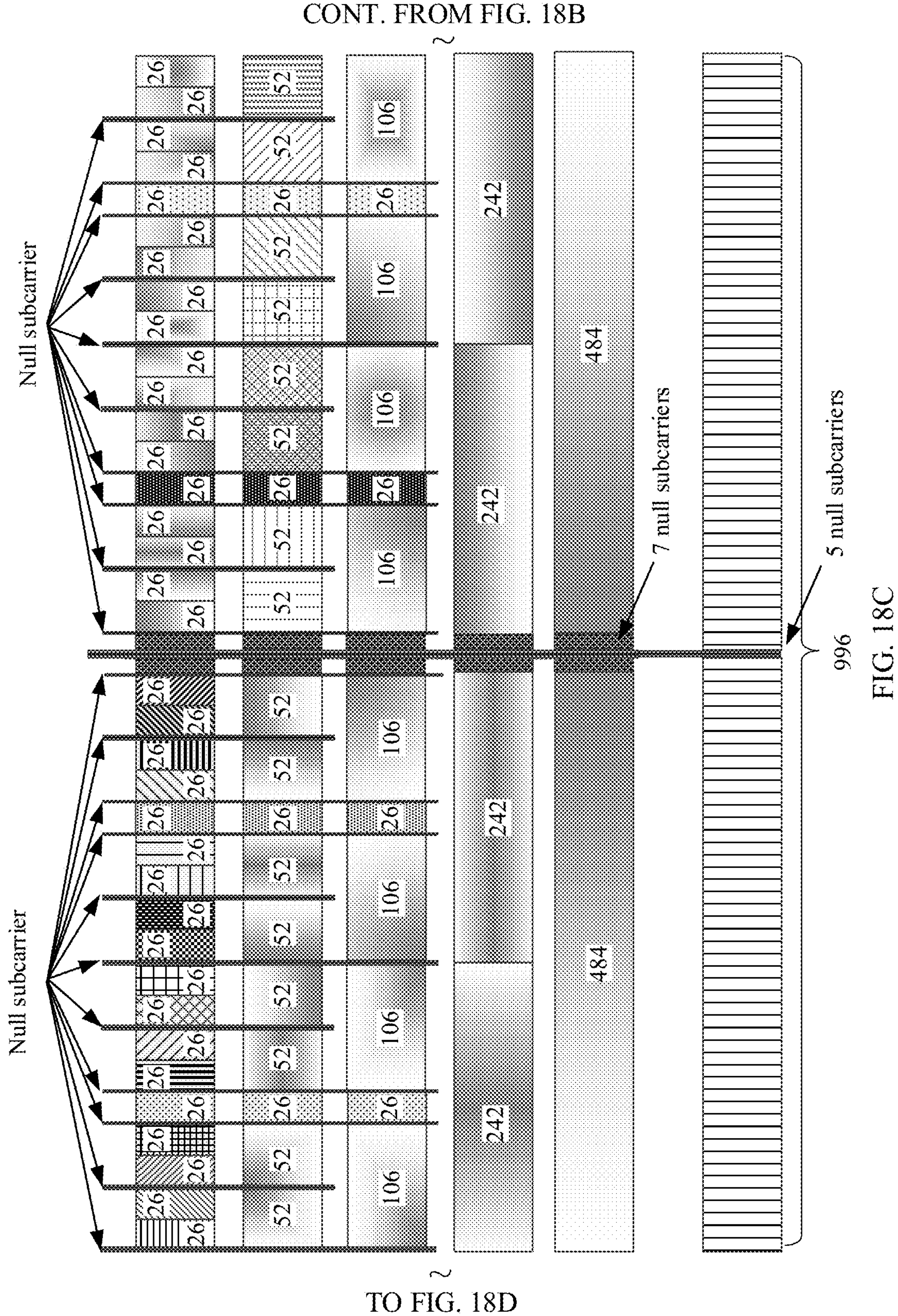
Figure 18D:
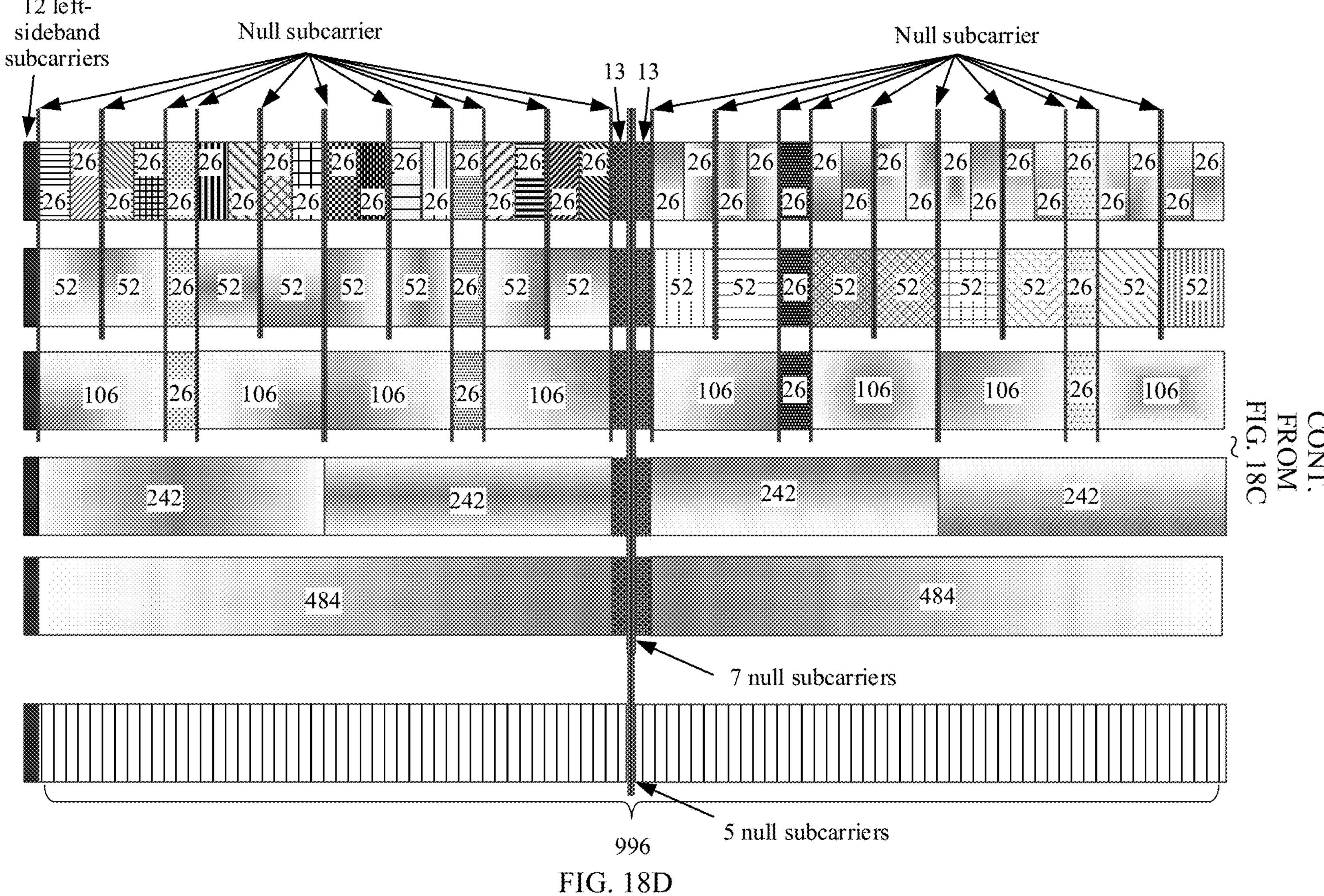
Figure 19A:
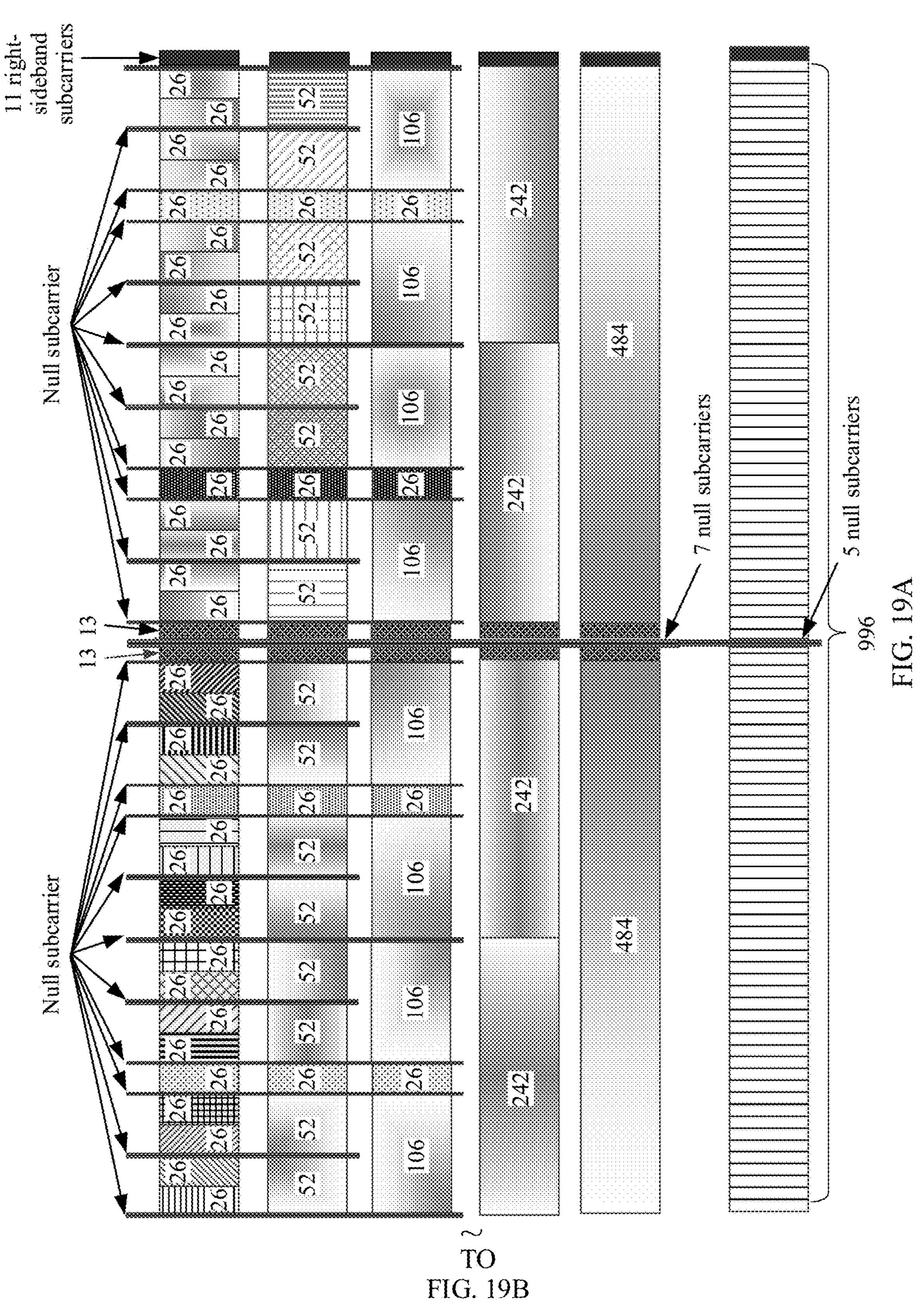
Figure 19B:
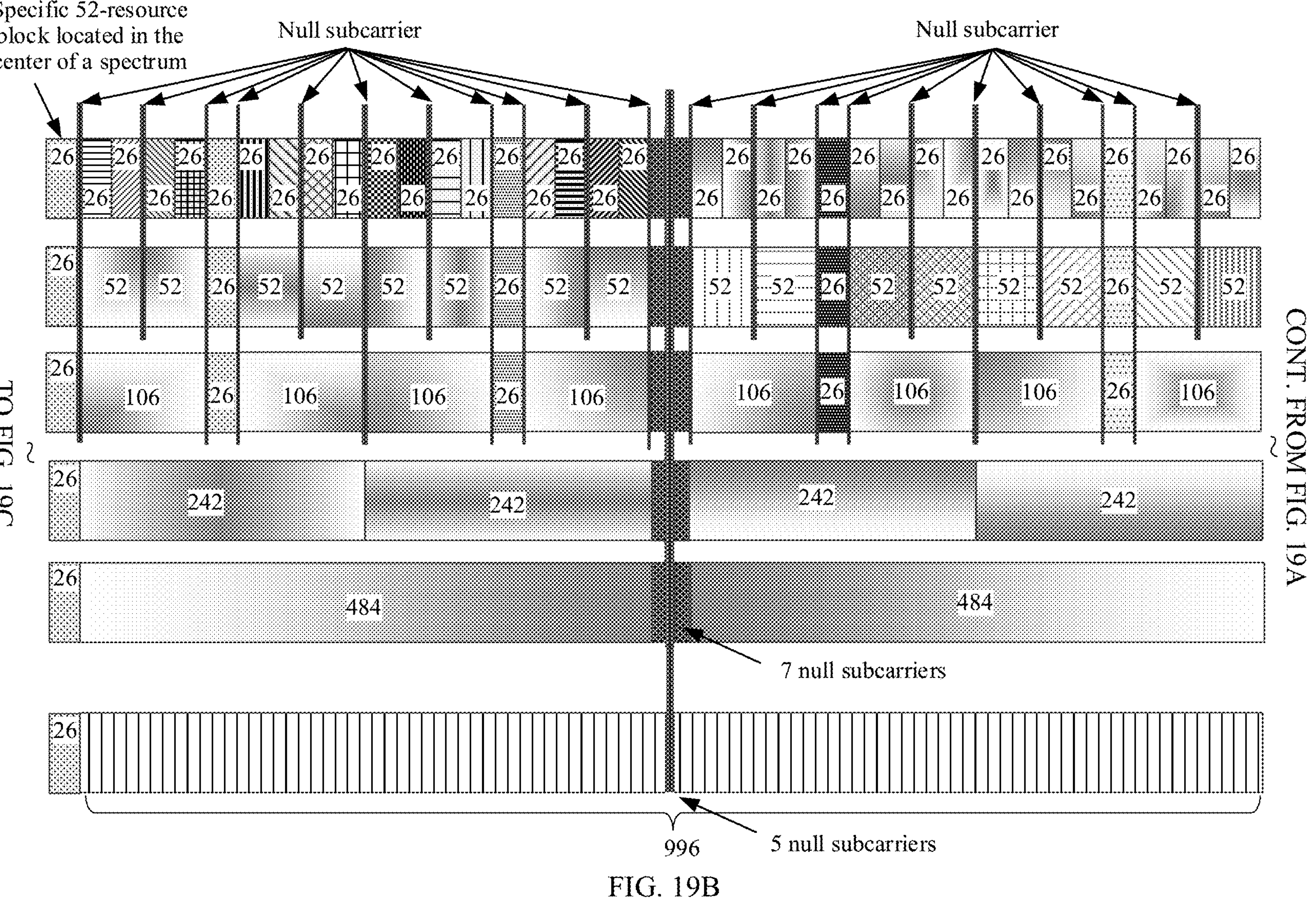
Figure 19C:
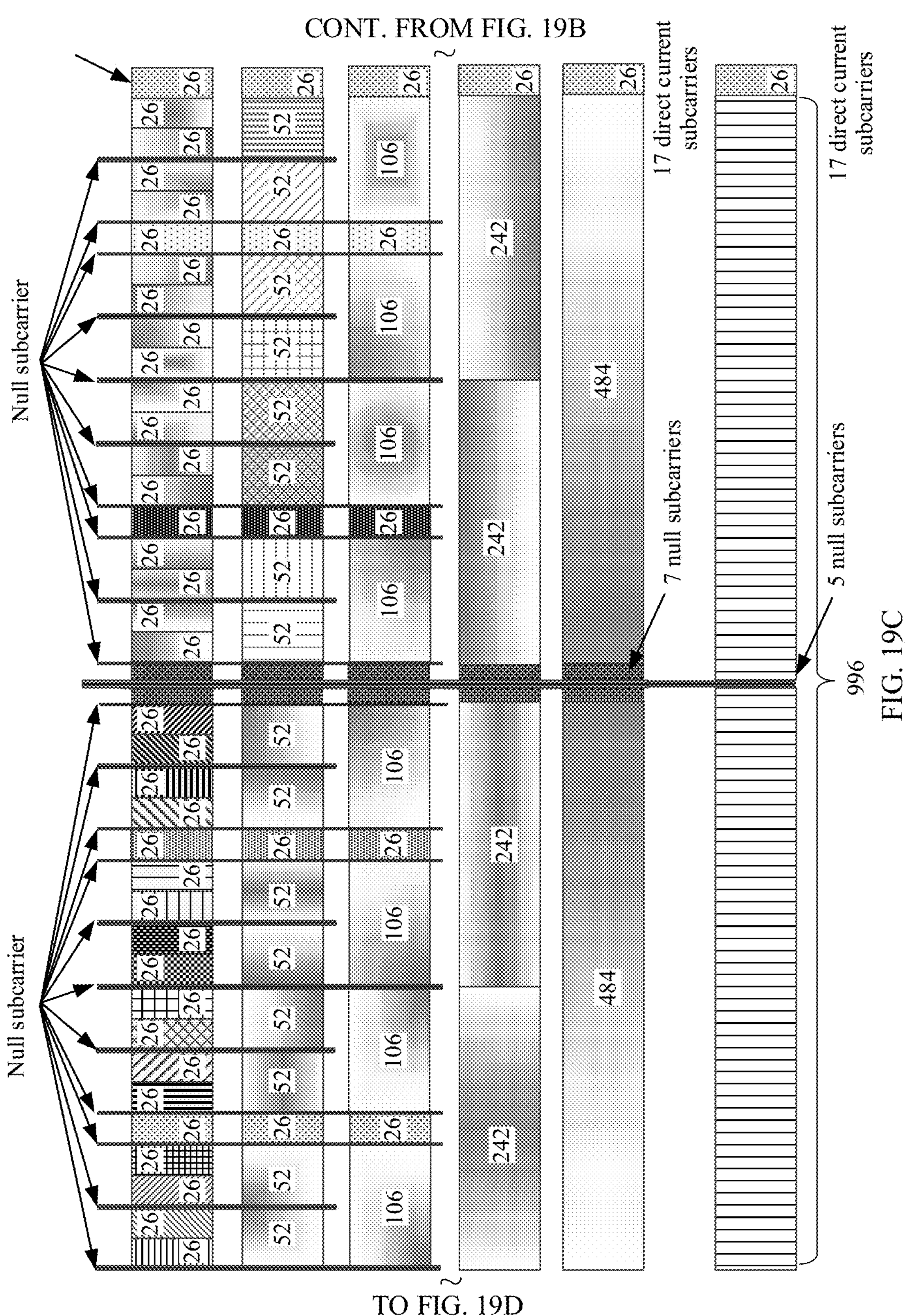
Figure 19D:
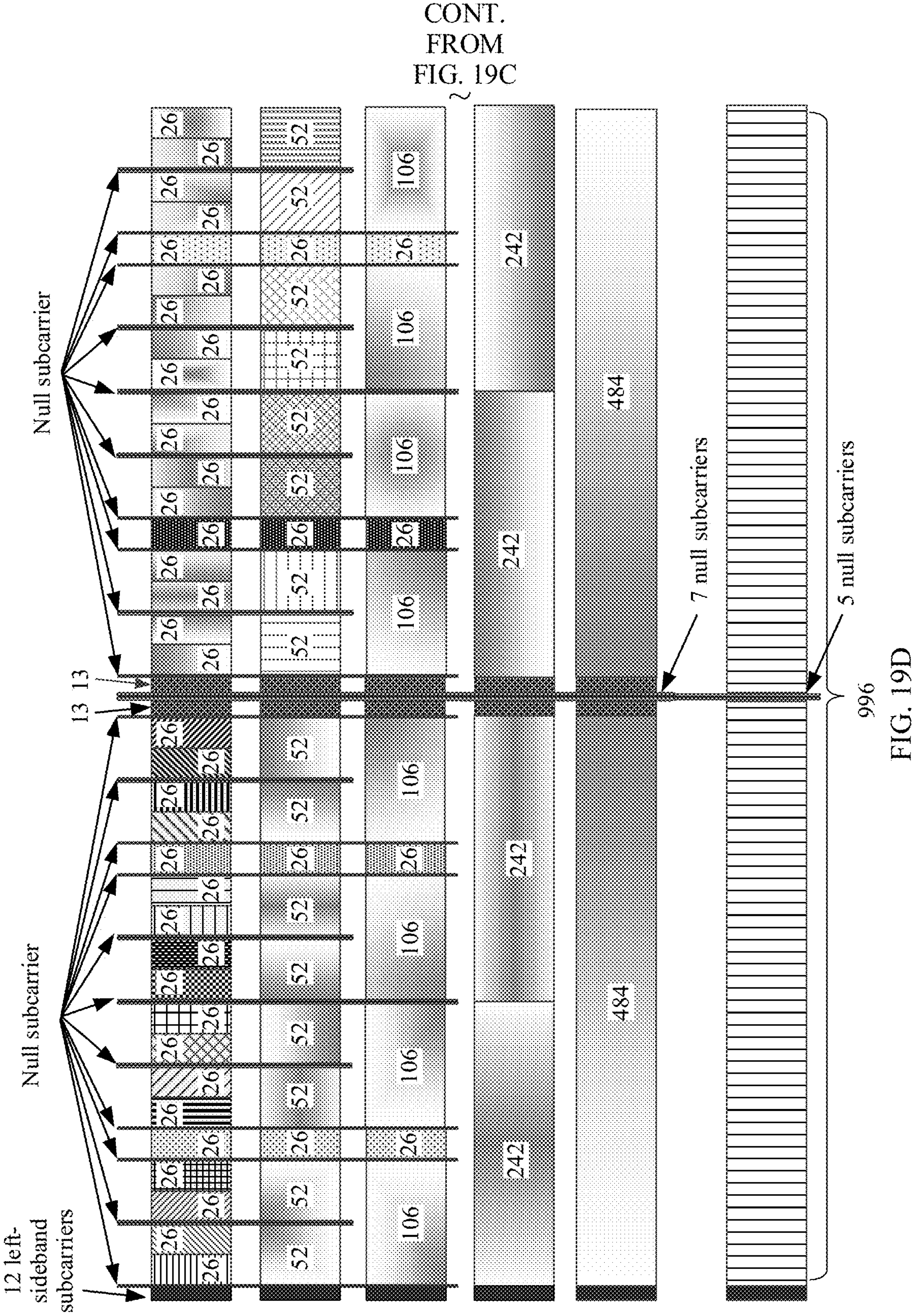

As shown in FIG. 17A, FIG. 17B, and FIG. 17C, in another possible spectrum division manner, 26 subcarriers in the 51 direct current subcarriers in the previous spectrum division manner are classified into one 26-subcarrier RU. The 26-subcarrier RU is specifically located in [−25: −13 13: 25], and remaining subcarriers or some of remaining subcarriers are still direct current subcarriers and are located in the center of the spectrum bandwidth.

Because of the additional 26-subcarrier RU, correspondingly, second EHT signaling field of a downlink MU PPDU may further carry second indication information, to indicate whether the specific 26-subcarrier RU located in the middle of the spectrum is used. In an implementation, the second indication information may be located in a common information field in the second EHT signaling. For example, the second indication information may be represented by one bit. When the second indication information is 1, it indicates that the specific 26-subcarrier RU is used; otherwise, it indicates that the specific 26-subcarrier RU is not used. In another implementation, the second indication information may be a special station information field in the second EHT signaling field, and the special station information field is indicated by using a special station identifier (where no station identifier is allocated).

2. 320 MHz

The 320 MHz bandwidth includes 4096 subcarriers in total, and FIG. 18A, FIG. 18B, FIG. 18C, and FIG. 18D and FIG. 19A, FIG. 19B, FIG. 19C, and FIG. 19D show examples of two spectrum division manners of a 320 MHz bandwidth according to an embodiment of this application. As shown in FIG. 18A, FIG. 18B, FIG. 18C, and FIG. 18D, the 320 MHz bandwidth may be considered as including four independent 80 MHz bandwidths. When a spectrum is divided into smaller resource units such as a 26-subcarrier RU, a 52-subcarrier RU, a 106-subcarrier RU, a 242-subcarrier RU, and a 484-subcarrier RU, spectrum division of each 80 MHz bandwidth may be similar to spectrum division of the 80 MHz bandwidth shown in FIG. 8.

For a case in which the spectrum is divided into 996-subcarrier RUs (the largest resource unit in the 80 MHz bandwidth), as shown in FIG. 18A, FIG. 18B, FIG. 18C, and FIG. 18D, a possible spectrum division manner is that the entire spectrum bandwidth includes 12 left-sideband subcarriers (guard) and 11 right-sideband subcarriers. There are four 996-subcarrier RUs between the left-sideband subcarriers and the right-sideband subcarriers, the center of each 996-subcarrier RU includes five null subcarriers, and the center of the spectrum bandwidth further includes 69 direct current subcarriers. Sequence numbers of the 12 left-sideband subcarriers are specifically [−2048: −2037], sequence numbers of the 11 right-sideband subcarriers are specifically [2037: 2047], the four 996-RUs are specifically located in [−2036: −1539-1533: −1036], [−1035: −538-532: −35], [35: 532 538: 1035], and [1036: 1533 1539: 2036], the null subcarriers of each 996-subcarrier RU are specifically located in [−1538: −1534], [−537: −533], [533: 537], and [1034: 1538], and sequence numbers of the 69 direct current subcarriers are specifically [−34: 34]. In another implementation, a quantity of the direct current subcarriers may be less than 69, for example, may be five [−2: 2] or seven [−3: 3], and remaining subcarriers may be null subcarriers.

As shown in FIG. 19A, FIG. 19B, FIG. 19C, and FIG. 19D, in another possible spectrum division manner, 52 subcarriers in the 69 direct current subcarriers in the previous spectrum division manner are classified into one independent 52-subcarrier RU. The RU is specifically located in [−34: −9 9: 34], and remaining subcarriers or some of remaining subcarriers are still direct current subcarriers and are located in the center of the spectrum bandwidth.

Because of the additional 52-subcarrier RU, correspondingly, a second EHT signaling of a downlink MU PPDU may further carry third indication information, to indicate whether the specific 52-subcarrier RU located in the middle of the spectrum is used. In an implementation, the third indication information may be located in a common information field in the second EHT signaling. For example, the third indication information may be represented by one bit. When the second indication information is 1, it indicates that the specific 52-subcarrier RU is used; otherwise, it indicates that the specific 52-subcarrier RU is not used. In another implementation, the third indication information may be a special station information field in the second EHT signaling field, and the special station information field is indicated by using a special station identifier (where no station identifier is allocated).

It should be noted that the foregoing spectrum division manners are described merely by using a case in which the spectrum bandwidth is divided into RUs of a single type as an example. It should be understood that hybrid-type RUs may still be supported in an ultra-large bandwidth provided in this embodiment of this application, and RUs of different types only need to be combined with each other according to the spectrum division manner shown in FIG. 16A, FIG. 16B, and FIG. 16C to FIG. 19A, FIG. 19B, FIG. 19C, and FIG. 19D.

Embodiment 5

A wireless fidelity (wifi) protocol before 802.11ax, for example, 802.11ac, requires that a contiguous bandwidth needs to be occupied during data transmission, and specifies that four types of bandwidths are available: 20 MHz, 40 MHz, 80 MHz, and 160 MHz bandwidths. In specific application, one 20 MHz bandwidth in a bandwidth is denoted as a primary 20 MHz bandwidth. If a 20 MHz bandwidth in the bandwidth is occupied by another station, a bandwidth of a transmitted PPDU needs to be reduced. The reduced bandwidth needs to include the primary 20 MHz bandwidth, and other 20 MHz bandwidths contiguous to the primary 20 MHz bandwidth are all idle and available. For example, in a contiguous 80 MHz bandwidth, the first 20 MHz bandwidth is a primary 20 MHz bandwidth, but a channel of the second 20 MHz bandwidth is busy. According to a contiguous bandwidth requirement, only a PPDU of the primary 20 MHz bandwidth can be transmitted in this case, that is, an idle 40 MHz bandwidth in the 80 MHz bandwidth is wasted.

To aggregate more channels to form a larger available bandwidth (where a maximum bandwidth may reach 160 MHz), the 802.11ax protocol proposes a preamble puncturing transmission manner, to allow aggregation of non-contiguous channels. In the foregoing example, an access point is allowed to send a PPDU of 20 MHz+40 MHz, so that idle channels are more effectively used. Specifically, in the four transmission bandwidths specified in the 802.11ax standard, the preamble puncturing transmission manner may exist only in the bandwidths of 80 MHz and 160 MHz. The following separately describes four preamble puncturing transmission manners proposed in 802.11ax.

Figures 20, 21, 22:
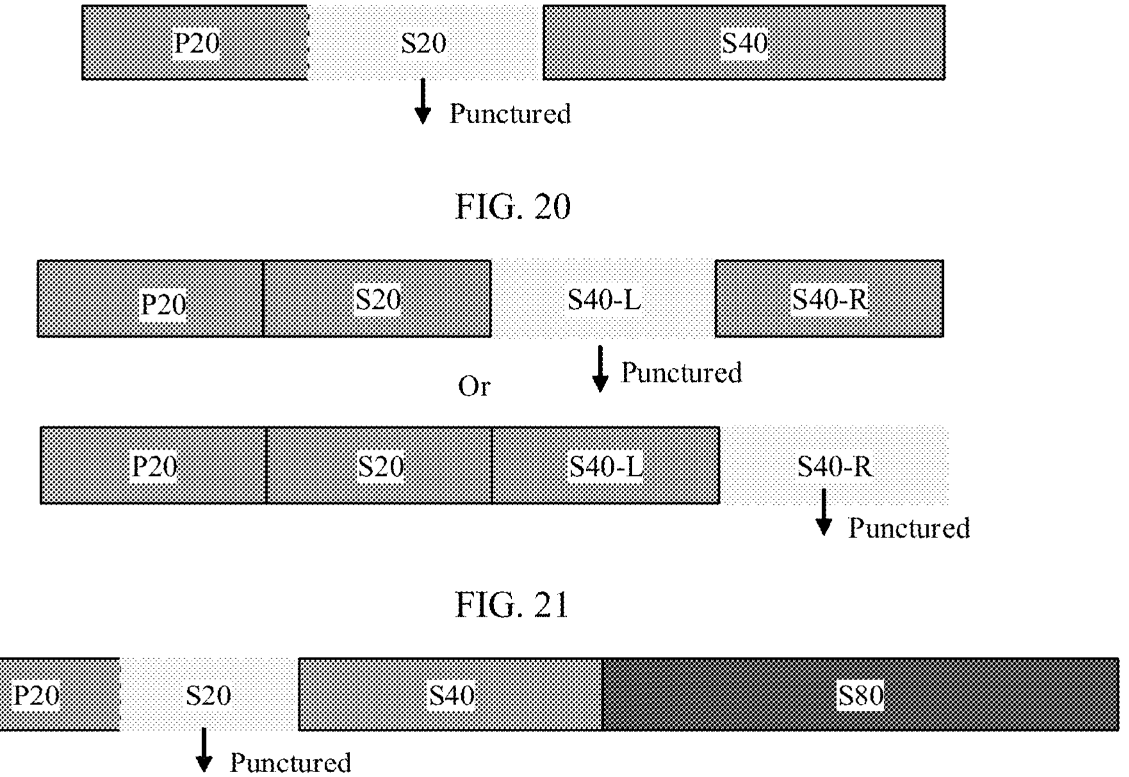
FIG. 20 is a first multi-user puncture mode in an 802.11ax 80 MHz bandwidth.
FIG. 21 is a second multi-user puncture mode in an 802.11ax 80 MHz bandwidth.
FIG. 22 is a first multi-user puncture mode in an 802.11ax 160 MHz bandwidth.

The 80 MHz bandwidth includes a primary 20 MHz bandwidth P20, a secondary 20 MHz bandwidth S20, and a secondary 40 MHz bandwidth S40. S40 is further divided into S40-L (the left 20 MHz bandwidth in S40) and S40-R (the right 20 MHz bandwidth in S40). A corresponding preamble puncturing transmission manner in the 80 MHz bandwidth is shown in FIG. 20 and FIG. 21. In FIG. 20, only S20 is punctured in the 80 MHz bandwidth, and in FIG. 21, only one 20 MHz bandwidth in S40 is punctured in the 80 MHz bandwidth.

Figure 23:
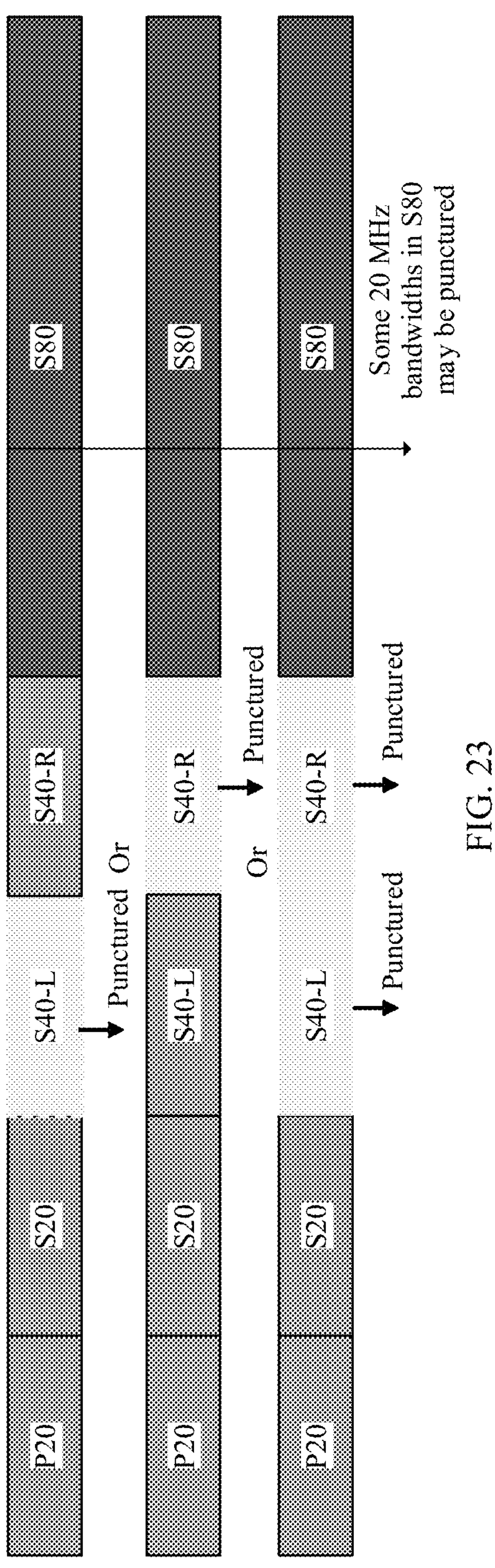
FIG. 23 is a second multi-user puncture mode in an 802.11ax 160 MHz bandwidth.

The 160 MHz bandwidth includes a primary 20 MHz bandwidth P20, a secondary 20 MHz bandwidth S20, a secondary 40 MHz bandwidth S40, and a secondary 80 MHz bandwidth S80. S40 is further divided into S40-L and S40-R. A corresponding preamble puncturing manner in the 160 MHz bandwidth is shown in FIG. 22 and FIG. 23. In FIG. 22, only S20 is punctured in a primary 80 MHz bandwidth (including P20, S20, and S40) in the 160 MHz bandwidth, and some 20 MHz bandwidths in the secondary 80 MHz bandwidth may be punctured. This is indicated by an HE-SIG-B field in 802.11ax. In FIG. 23, in the 160 MHz bandwidth, a primary 40 MHz bandwidth (including P20 and S20) in a primary 80 MHz bandwidth (including P20, S20, and S40) is not punctured, and some 20 MHz bandwidths in the secondary 40 MHz bandwidth and the secondary 80 MHz bandwidth may be punctured. This is indicated by the HE-SIG-B field in 802.11ax.

The foregoing mentioned two preamble puncturing transmission manners of the 80 MHz bandwidth and two preamble puncturing transmission manners of the 160 MHz bandwidth in 802.11ax may be indicated through one piece of indication information. The indication information is located in an HE-SIG-A field in an 802.11ax PPDU preamble. It should be noted that neither the second preamble puncture mode in the 80 MHz bandwidth nor the two preamble puncture modes in the 160 MHz bandwidth can specifically indicate a 20 MHz bandwidth that is punctured. A receive end needs to further parse resource allocation indication information in a common information part field of a next HE-SIG-B field in an 802.11ax HE PPDU preamble. The HE-SIG-B is mainly used to perform multi-user transmission, including OFDMA and MU-MIMO, on a plurality of stations, and provide resource unit allocation information and station transmission parameters for the plurality of stations. In other words, the preamble puncturing transmission manners of 802.11ax are applicable only to multi-user transmission.

Therefore, Embodiment 5 of this application provides a preamble puncturing transmission manner that may be used in single-user transmission and multi-user transmission in a next-generation EHT protocol in 802.11ax. Specifically, in one manner, a multi-user puncturing transmission mode of 802.11ax is used, that is, 20 MHz bandwidths that are punctured within the bandwidth are jointly indicated through a SIG 1 field and a SIG 2 field. In this manner, an additional SIG 2 field is required, and at least one OFDM symbol is required. If the OFDM symbol uses BPSK, and BCC coding with a code rate of 0.5, overheads of one OFDM are 26 bits.

In another manner, an additional field is not used, and a first EHT signaling field is directly used to directly indicate channels that are punctured. Herein, it is assumed that a maximum bandwidth supported by an EHT is a 320 MHz bandwidth.

Implementation 1: Because the primary 20 MHz bandwidth cannot be punctured, a total of 15 bitmaps are required to indicate, from a low frequency to a high frequency (or from a high frequency to a low frequency), channels that are punctured. For example, if a bit is set to 1, it indicates that a corresponding channel can be used, or if a bit is set to 0, it indicates that a corresponding channel cannot be used and is punctured. This manner is simple but requires 15-bit overheads.

Implementation 2: To simplify a physical layer design, a maximum of one puncturing is allowed for a contiguous bandwidth. Therefore, a specific preamble puncture mode signaling indication includes a 3-bit bandwidth indication (indicating bandwidths that include 20 MHz, 40 MHz, 80 MHz, 160 MHz, and 320 MHz bandwidths, and may further include a 240 MHz bandwidth and the like), a 4-bit indication for indicating start positions (positions from a low frequency to a high frequency or from a high frequency to a low frequency) of the first punctured 20 MHz bandwidth, and a 2-bit indication for indicating a width (including 20 MHz, 40 MHz, 80 MHz, and 160 MHz bandwidths) of punctured bandwidths, where a total of 9 bits are required. Alternatively, all puncturing cases are directly listed in a table form, and an 8-bit table is required. A width of a punctured bandwidth may be further limited, for example, the punctured bandwidth can only be 20 MHz, and only 7 bits are required. Alternatively, all puncturing cases are directly listed in a table form, and a 6-bit table is required.

Embodiment 6

A frame structure of a PPDU (which may be denoted as a very high throughput (VHT) PPDU or an 802.11ac PPDU) defined in a current 802.11ac standard includes data, a legacy physical layer preamble, and a new physical layer preamble, as shown in FIG. 24. The legacy physical layer preamble includes a legacy-short training field (L-STF), a legacy-long training field (L-LTF), and a legacy-signaling field (L-SIG). The new physical layer preamble includes a very high throughput signaling field A (VHT-SIG AA), a very high throughput short training field (VHT-STF), a very high throughput long training field (VHT-LTF), and a very high throughput field B (VHT-SIG B), where the VHT-SIG-A (which may also be denoted as VHTSIGA) includes two OFDM symbols, and duration of each symbol is 4 μs. In addition, the VHT-LTF is used to help a receive end correctly perform channel estimation, so as to help a station correctly decode received data information.

802.11 ac supports simultaneous transmission of a maximum of eight data streams, including single-user MIMO and multi-user MIMO. When a quantity of streams is n, a quantity of OFDM symbols of the VHT-LTF included in FIG. 24 is n, that is, n VHT-LTF fields are included. The n VHT-LTF fields are used to help the station simultaneously estimate channels of n spatial streams. To accurately estimate the channel of the spatial stream and keep a VHT-LTF of each stream orthogonal, 802.11ac proposes to multiply a P matrix by the VHT-LTF.

When the quantity of streams is 2, the P matrix is:

$$P_{VHTLTF,2*2}=\begin{bmatrix}1 & -1\\ 1 & 1\end{bmatrix} \quad \text{Formula 1}$$

When the quantity of streams is 3 or 4, the P matrix is:

$$P_{VHTLTF,4*4}=\begin{bmatrix}1 & -1 & 1 & 1\\ 1 & 1 & -1 & 1\\ 1 & 1 & 1 & -1\\ -1 & 1 & 1 & 1\end{bmatrix} \quad \text{Formula 2}$$

When the quantity of streams is 5 or 6, the P matrix is:

$$P_{VHTLTF,6\times 6}=\begin{bmatrix}1 & -1 & 1 & 1 & 1 & -1\\ 1 & -w^{1} & w^{2} & w^{3} & w^{4} & -w^{5}\\ 1 & -w^{2} & w^{4} & w^{6} & w^{8} & -w^{10}\\ 1 & -w^{3} & w^{6} & w^{9} & w^{12} & -w^{15}\\ 1 & -w^{4} & w^{8} & w^{12} & w^{16} & -w^{20}\\ 1 & -w^{5} & w^{10} & w^{15} & w^{20} & -w^{25}\end{bmatrix} \quad \text{Formula 3}$$

where $w=e^{\frac{-j2\pi}{6}}$.

When the quantity of streams is 7 or 8, the P matrix is:

$$P_{VHTLTF,8\times 8}=\begin{bmatrix}P_{VHTLTF,4\times 4} & P_{VHTLTF,4\times 4}\\ P_{VHTLTF,4\times 4} & -P_{VHTLTF,4\times 4}\end{bmatrix} \quad \text{Formula 4}$$

In a specific use method, that the quantity of streams is 2 is used as an example. Two values of a subcarrier k of the VHT-LTF in frequency domain are point-multiplied by a P matrix element, where k is a sequence number of a used data subcarrier, not including a pilot subcarrier, of a VHT-LTF OFDM symbol in frequency domain. A horizontal axis is a time domain (that is, a dimension of a VHT-LTF field sent by each antenna in time is a quantity of VHT-LTD fields), and a vertical axis is a space domain (that is, a dimension of a VHT-LTF field sent by a plurality of antennas in space is a quantity of spatial streams).

$$\begin{bmatrix}1\times VHTLTF_k & -1\times VHTLTF_k\\ 1\times VHTLTF_k & 1\times VHTLTF_k\end{bmatrix} \quad \text{Formula 5}$$

In addition, when the quantity of streams is an odd number n, each antenna sends n+1 (an even number) VHT-LTF fields in time, and a plurality of antennas send n (an odd number) streams in space. The first n rows and the first n+1 columns of the P matrix are point-multiplied by the VHT-LTF field.

A maximum quantity of streams supported by 802.11ax is still 8, and the P matrix of 802.11ac is still used. When a plurality of streams are sent, a data subcarrier, not including a pilot subcarrier, of a high-efficiency long training sequence field (HE-LTF) of a channel estimation sequence in 802.11ax is point-multiplied by the P matrix. However, single-user transmission in a next-generation EHT protocol in 802.11ax uses more streams, up to 16 streams. The present invention proposes a new P-matrix design applicable to more than eight streams. A general principle of the P matrix is as follows:

1. The P matrix is a unitary matrix, that is, $P^{-1}=P^{T}$, where (−1) is matrix inversion, and T is matrix transposition.

2. A value of an element of the P matrix is 1 or −1, or $P_{m,n}=\exp(-j2\pi(m-1)(n-1)/s)$, where m is a row sequence number, n is a column sequence number, and s is a corresponding quantity of streams.

In addition, a value of a pilot subcarrier in a channel estimation LTF field does not need to be point-multiplied by the P matrix. To implement phase tracking by using the pilot subcarrier when MIMO channel estimation is not performed, a value on a pilot subcarrier of an LTF field that is sent in time by each stream (in a space dimension) is point-multiplied by the first row of the P matrix, that is, values on pilot subcarriers of n LTF fields are point-multiplied by n elements in the first row of the P matrix. To avoid a spectral line problem, elements in the first row of the P matrix cannot all be 1.

The designed P matrix is as follows:

When the quantity of streams is equal to 9 or 10, the P matrix is:

$$P_{10*10}=\begin{bmatrix}1 & -1 & 1 & 1 & 1 & -1 & 1 & 1 & 1 & -1\\ 1 & -w^{1} & w^{2} & w^{3} & w^{4} & -w^{5} & w^{6} & w^{7} & w^{8} & -w^{9}\\ 1 & -w^{2} & w^{4} & w^{6} & w^{8} & -w^{10} & w^{12} & w^{14} & w^{16} & -w^{18}\\ 1 & -w^{3} & w^{6} & w^{9} & w^{12} & -w^{15} & w^{18} & w^{21} & w^{24} & -w^{27}\\ 1 & -w^{4} & w^{8} & w^{12} & w^{16} & -w^{20} & w^{24} & w^{28} & w^{32} & -w^{36}\\ 1 & -w^{5} & w^{10} & w^{15} & w^{20} & -w^{25} & w^{30} & w^{35} & w^{40} & -w^{45}\\ 1 & -w^{6} & w^{12} & w^{18} & w^{24} & -w^{30} & w^{36} & w^{42} & w^{48} & -w^{54}\\ 1 & -w^{7} & w^{14} & w^{21} & w^{28} & -w^{35} & w^{42} & w^{49} & w^{56} & -w^{63}\\ 1 & -w^{8} & w^{16} & w^{24} & w^{32} & -w^{40} & w^{48} & w^{56} & w^{64} & -w^{72}\\ 1 & -w^{9} & w^{18} & w^{27} & w^{36} & -w^{45} & w^{54} & w^{63} & w^{72} & -w^{81}\end{bmatrix} \quad \text{Formula 6}$$

where $$w=e^{\frac{-j2\pi}{10}},$$

and columns multiplied by −1 is the second, sixth, and tenth columns. In another implementation, columns multiplied by −1 may be any several columns other than the first column, to ensure that the elements in the first row of the P matrix are not all 1.

When the quantity of streams is equal to 11 or 12, the P matrix is:

$$P_{12\times 12} = \begin{bmatrix} 1 & -1 & 1 & 1 & 1 & -1 & 1 & 1 & 1 & -1 & 1 & 1 \\ 1 & -w^{1} & w^{2} & w^{3} & w^{4} & -w^{5} & w^{6} & w^{7} & w^{8} & -w^{9} & w^{10} & w^{11} \\ 1 & -w^{2} & w^{4} & w^{6} & w^{8} & -w^{10} & w^{12} & w^{14} & w^{16} & -w^{18} & w^{20} & w^{22} \\ 1 & -w^{3} & w^{6} & w^{9} & w^{12} & -w^{15} & w^{18} & w^{21} & w^{24} & -w^{27} & w^{30} & w^{33} \\ 1 & -w^{4} & w^{8} & w^{12} & w^{16} & -w^{20} & w^{24} & w^{28} & w^{32} & -w^{36} & w^{40} & w^{44} \\ 1 & -w^{5} & w^{10} & w^{15} & w^{20} & -w^{25} & w^{30} & w^{35} & w^{40} & -w^{45} & w^{50} & w^{55} \\ 1 & -w^{6} & w^{12} & w^{18} & w^{24} & -w^{30} & w^{36} & w^{42} & w^{48} & -w^{54} & w^{60} & w^{66} \\ 1 & -w^{7} & w^{14} & w^{21} & w^{28} & -w^{35} & w^{42} & w^{49} & w^{56} & -w^{63} & w^{70} & w^{77} \\ 1 & -w^{8} & w^{16} & w^{24} & w^{32} & -w^{40} & w^{48} & w^{56} & w^{64} & -w^{72} & w^{80} & w^{88} \\ 1 & -w^{9} & w^{18} & w^{27} & w^{36} & -w^{45} & w^{54} & w^{63} & w^{72} & -w^{81} & w^{90} & w^{99} \\ 1 & -w^{10} & w^{20} & w^{30} & w^{40} & -w^{50} & w^{60} & w^{70} & w^{80} & -w^{90} & w^{100} & w^{110} \\ 1 & -w^{11} & w^{22} & w^{33} & w^{44} & -w^{55} & w^{66} & w^{77} & w^{88} & -w^{99} & w^{110} & w^{121} \end{bmatrix} \quad \text{Formula 7}$$

Formula 7 where $$w = e^{\frac{-j2\pi}{12}},$$

and columns multiplied by −1 is the second, sixth, and tenth columns. In another implementation, columns multiplied by −1 may be any several columns other than the first column, to ensure that the elements in the first row of the P matrix are not all 1.

When the quantity of streams is equal to 13 or 14, the P matrix is:

$$P_{14\times 14} = \begin{bmatrix} 1 & -1 & 1 & 1 & 1 & -1 & 1 & 1 & 1 & -1 & 1 & 1 & 1 & -1 \\ 1 & -w^{1} & w^{2} & w^{3} & w^{4} & -w^{5} & w^{6} & w^{7} & w^{8} & -w^{9} & w^{10} & w^{11} & w^{12} & -w^{13} \\ 1 & -w^{2} & w^{4} & w^{6} & w^{8} & -w^{10} & w^{12} & w^{14} & w^{16} & -w^{18} & w^{20} & w^{22} & w^{24} & -w^{26} \\ 1 & -w^{3} & w^{6} & w^{9} & w^{12} & -w^{15} & w^{18} & w^{21} & w^{24} & -w^{27} & w^{30} & w^{33} & w^{36} & -w^{39} \\ 1 & -w^{4} & w^{8} & w^{12} & w^{16} & -w^{20} & w^{24} & w^{28} & w^{32} & -w^{36} & w^{40} & w^{44} & w^{48} & -w^{52} \\ 1 & -w^{5} & w^{10} & w^{15} & w^{20} & -w^{25} & w^{30} & w^{35} & w^{40} & -w^{45} & w^{50} & w^{55} & w^{60} & -w^{65} \\ 1 & -w^{6} & w^{12} & w^{18} & w^{24} & -w^{30} & w^{36} & w^{42} & w^{48} & -w^{54} & w^{60} & w^{66} & w^{72} & -w^{78} \\ 1 & -w^{7} & w^{14} & w^{21} & w^{28} & -w^{35} & w^{42} & w^{49} & w^{56} & -w^{63} & w^{70} & w^{77} & w^{84} & -w^{91} \\ 1 & -w^{8} & w^{16} & w^{24} & w^{32} & -w^{40} & w^{48} & w^{56} & w^{64} & -w^{72} & w^{80} & w^{88} & w^{96} & -w^{104} \\ 1 & -w^{9} & w^{18} & w^{27} & w^{36} & -w^{45} & w^{54} & w^{63} & w^{72} & -w^{81} & w^{90} & w^{99} & w^{108} & -w^{117} \\ 1 & -w^{10} & w^{20} & w^{30} & w^{40} & -w^{50} & w^{60} & w^{70} & w^{80} & -w^{90} & w^{100} & w^{110} & w^{120} & -w^{130} \\ 1 & -w^{11} & w^{22} & w^{33} & w^{44} & -w^{55} & w^{66} & w^{77} & w^{88} & -w^{99} & w^{110} & w^{121} & w^{132} & -w^{143} \\ 1 & -w^{12} & w^{24} & w^{36} & w^{48} & -w^{60} & w^{72} & w^{84} & w^{96} & -w^{108} & w^{120} & w^{132} & w^{144} & -w^{156} \\ 1 & -w^{13} & w^{26} & w^{39} & w^{52} & -w^{65} & w^{78} & w^{91} & w^{104} & -w^{117} & w^{130} & w^{143} & w^{165} & -w^{169} \end{bmatrix} \quad \text{Formula 8}$$

Formula 8 where $$w = e^{\frac{-j2\pi}{14}},$$

and columns multiplied by −1 is the second, sixth, tenth, and fourteenth columns. In another implementation, columns multiplied by −1 may be any several columns other than the first column, to ensure that the elements in the first row of the P matrix are not all 1.

When the quantity of streams is equal to 15 or 16, the P matrix is:

$$P_{16\times16} = \begin{bmatrix} P_{VHTLTF,8\times8} & P_{VHTLTF,8\times8} \\ P_{VHTLTF,8\times8} & -P_{VHTLTF,8\times8} \end{bmatrix} \quad \text{Formula 9}$$

$$\text{or } P_{16\times16} = \begin{bmatrix} P_{VHTLTF,8\times8} & P_{VHTLTF,8\times8} \\ P_{VHTLTF,8\times8} & P_{VHTLTF,8\times8} \end{bmatrix} \quad \text{Formula 10}$$

where T is matrix transposition.

Based on a same technical concept, an embodiment of this application further provides an apparatus 2500 used on a first access point side, configured to implement a function performed by the first access point AP in the foregoing method embodiments.

In an implementation, as shown in FIG. 25, the apparatus 2500 may include a processing module 2501 and a transceiver module 2502.

The processing module 2501 is configured to generate a downlink physical layer protocol data unit PPDU, and the downlink PPDU includes a second extremely high throughput EHT signaling field.

The transceiver module 2502 is configured to send the downlink PPDU to a first station STA, and the second EHT signaling field is replicated and transmitted in a unit of a second bandwidth within a transmission bandwidth range of the downlink PPDU, where the second bandwidth is $2^N$ times a basic bandwidth, and N is 0 or a positive integer.

For specific processing processes of the processing module 2501 and the transceiver module 2502, refer to the descriptions in the method embodiments shown in FIG. 5, FIG. 10, FIG. 11, and FIG. 15. Details are not described herein again.

In another implementation, the apparatus may be a first access point. As shown in FIG. 26, an apparatus 2600 may include a processor 2601, a memory 2602, a baseband circuit 2603, a radio frequency circuit 2604, and an antenna 2605. The processor 2601 is configured to control a function of each circuit part, to support the first access point AP in performing a corresponding function in the foregoing methods. The memory 2602 is configured to store a program instruction and data that are necessary for the first access point. The baseband circuit 2603 is configured to generate various signaling and messages such as a downlink PPDU, and send, to a first STA through the antenna 2605, the signaling and messages resulting from processing of the radio frequency circuit such as analog conversion, filtering, amplification, and up-conversion.

The apparatus 2600 may further have another implementation. For example, in an implementation, when the apparatus may be a chip in a first access point, the chip includes a processing module and a transceiver module. The processing module may be, for example, a processor. For example, the processor is configured to generate various messages and signaling, and perform processing such as encoding, modulation, and amplification on various messages resulting from protocol encapsulation. The processor may be further configured to perform demodulation, decoding, and decapsulation to obtain the signaling and messages. The transceiver module may be, for example, an input/output interface, a pin, or a circuit on the chip. The processing module may execute a computer-executable instruction stored in a storage unit, to support the first access point AP in performing a corresponding function in the foregoing methods. Optionally, the storage unit may be a storage unit in the chip, for example, a register or a buffer, or the storage unit may be a storage unit in the first access point but outside the chip, for example, a read-only memory (ROM) or another type of static storage device capable of storing static information and instructions, or a random access memory (RAM).

In another possible implementation, the apparatus may include a processor and a modem. The processor may be configured to run an instruction or an operating system, to control a first access point function. The modem may perform encapsulation, encoding/decoding, modulation/demodulation, equalization, or the like on data according to a protocol, to generate a radio frame, so as to support the first access point AP in performing a corresponding function in any one of the first aspect to the fourth aspect.

In still another possible implementation, the apparatus includes a processor. The processor is configured to: couple to a memory, read an instruction in the memory, and perform, according to the instruction, the method according to any one of the first aspect to the fourth aspect. The memory may be located inside the processor, or may be located outside the processor.

The processor mentioned anywhere above may be a general-purpose central processing unit (CPU), a microprocessor, an application-specific integrated circuit (ASIC), or one or more integrated circuits configured to control program execution of the transmission methods in the foregoing aspects.

Based on a same technical concept, an embodiment of this application further provides an apparatus 2700 used on a first station side, configured to implement a function performed by the first station STA in the foregoing method embodiments.

Figure 27:
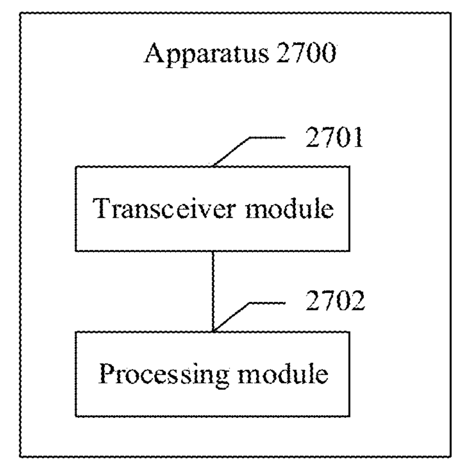
FIG. 27 is a schematic structural diagram of an apparatus used on a first STA side according to an embodiment of this application.

In an implementation, as shown in FIG. 27, the apparatus 2700 may include a transceiver module 2701 and a processing module 2702.

The transceiver module 2701 is configured to receive a downlink physical layer protocol data unit PPDU sent by a first access point AP. The downlink PPDU includes a second extremely high throughput EHT signaling field, and the second EHT signaling field is replicated and transmitted in a unit of a second bandwidth within a transmission bandwidth range of the downlink PPDU, where the second bandwidth is $2^N$ times a basic bandwidth, and N is 0 or a positive integer.

The processing module 2702 is configured to decode signaling information in the second EHT signaling field based on the second bandwidth.

For specific processing processes of the transceiver module 2701 and the processing module 2702, refer to the descriptions in the method embodiments shown in FIG. 5, FIG. 10, FIG. 11, and FIG. 15. Details are not described herein again.

Figure 28:
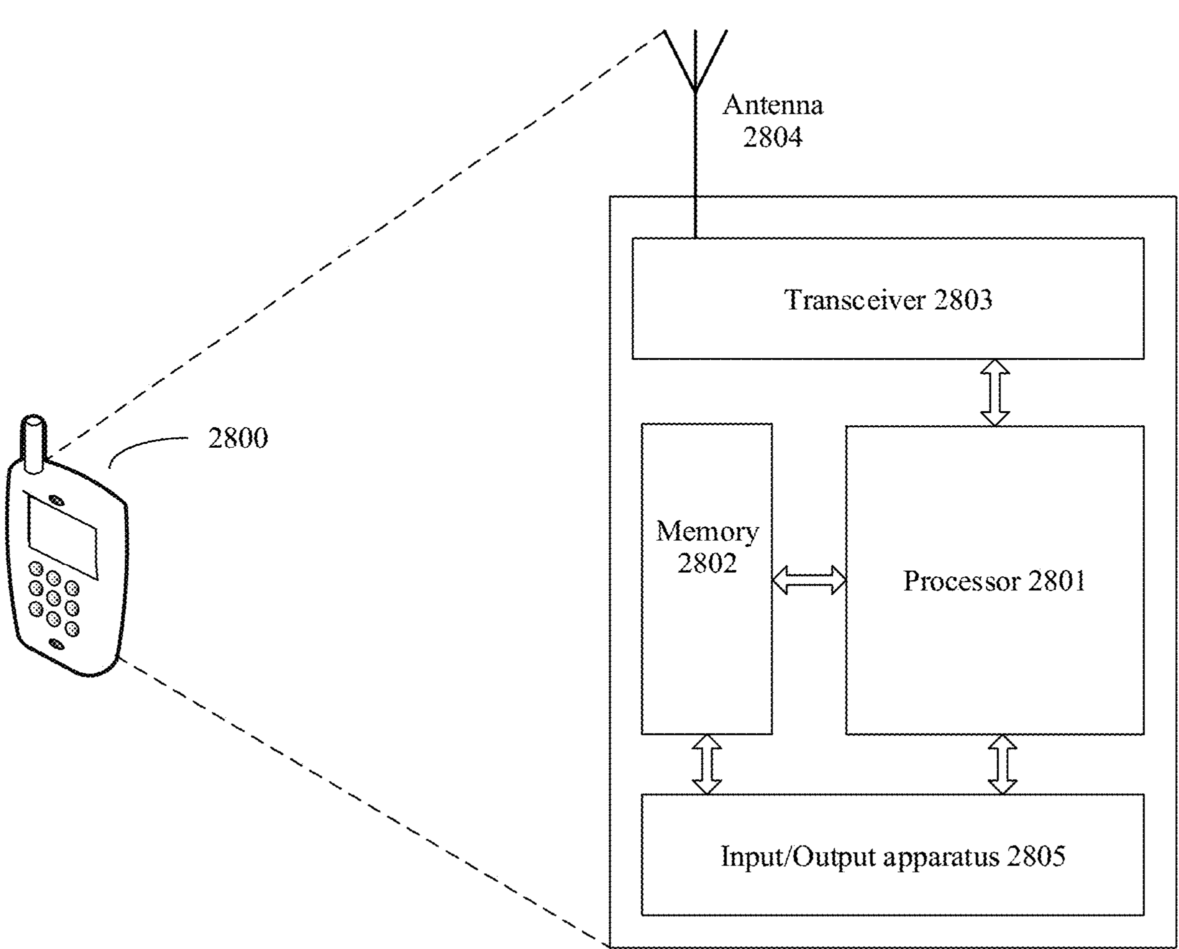
FIG. 28 is another schematic structural diagram of an apparatus used on a first STA side according to an embodiment of this application.

In another implementation, as shown in FIG. 28, an apparatus 2800 may include a processor 2801, a memory 2802, a transceiver 2803, an antenna 2804, and an input/output apparatus 2805. The processor 2801 is mainly configured to: control the entire apparatus, and execute a computer program instruction, to support the apparatus in performing an action described in any method embodiment in the fourth aspect to the seventh aspect, and the like. The memory 2802 is mainly configured to store a program instruction and data that are necessary for the first station. The transceiver 2803 is mainly configured to: perform conversion between a baseband signal and a radio frequency signal, and process the radio frequency signal. The antenna 2804 is mainly configured to receive and send a radio frequency signal in a form of an electromagnetic wave. The input/output apparatus 2805, such as a touchscreen, a display screen, and a keyboard, is mainly configured to receive data input by a user and output data to the user.

The first station further has another possible implementation. For example, the apparatus may be a chip in a first station, the chip includes a processing module and a transceiver module. The processing module may be, for example, a processor. For example, the processor is configured to generate various messages and signaling, and perform processing such as encoding, modulation, and amplification on various messages resulting from protocol encapsulation. The processor may be further configured to perform demodulation, decoding, and decapsulation to obtain the signaling and messages. The transceiver module may be, for example, an input/output interface, a pin, or a circuit on the chip. The processing module may execute a computer-executable instruction stored in a storage unit, to support the first station STA in performing a corresponding function in the foregoing methods. Optionally, the storage unit may be a storage unit in the chip, for example, a register or a buffer, or the storage unit may be a storage unit in the first station but outside the chip, for example, a read-only memory (ROM) or another type of static storage device capable of storing static information and instructions, or a random access memory (RAM).

In a possible implementation, the apparatus may include a processor and a modem. The processor may be configured to run an instruction or an operating system, to control a first station function. The modem may perform encapsulation, encoding/decoding, modulation/demodulation, equalization, or the like on data according to a protocol, to generate a radio frame, so as to support the first station AP in performing a corresponding function in any one of the fourth aspect to the seventh aspect.

In a possible implementation, the apparatus includes a processor. The processor is configured to: couple to a memory, read an instruction in the memory, and perform, according to the instruction, the method according to any one of the fourth aspect to the seventh aspect. The memory may be located inside the processor, or may be located outside the processor.

The processor mentioned anywhere above may be a general-purpose central processing unit (CPU), a microprocessor, an application-specific integrated circuit (ASIC), or one or more integrated circuits configured to control program execution of the communication methods in the foregoing aspects.

Based on a same technical concept, an embodiment of this application provides a computer-readable storage medium. The computer-readable storage medium stores a computer instruction, and when the instruction is run on a computer, the computer is enabled to perform the communication method on the first access point side in the foregoing method embodiments.

An embodiment of this application provides a computer program product including an instruction. When the computer program product runs on a computer, the computer is enabled to perform the method embodiment according to any one of the first aspect to the fourth aspect or any possible implementation thereof.

An embodiment of this application further provides a chip system. The chip system includes a processor, configured to support a first access point AP in implementing the foregoing communication methods, for example, generating or processing data and/or information in the foregoing aspects. In a possible design, the chip system further includes a memory, and the memory is configured to store a program instruction and data that are necessary for a data sending device. The chip system may include a chip, or may include a chip and another discrete component.

An embodiment of this application provides a computer-readable storage medium. The computer-readable storage medium stores a computer instruction, and when the instruction is run on a computer, the computer is enabled to perform the communication method on the first station side in the foregoing method embodiments.

An embodiment of this application provides a computer program product including an instruction. When the computer program product runs on a computer, the computer is enabled to perform the method embodiment according to any one of the fifth aspect to the seventh aspect or any possible implementation thereof.

An embodiment of this application further provides a chip system. The chip system includes a processor, configured to support a first STA in implementing a function in the fifth aspect to the seventh aspect, for example, generating or processing data and/or information in the foregoing aspects. In a possible design, the chip system further includes a memory, and the memory is configured to store a program instruction and data that are necessary for a data sending device. The chip system may include a chip, or may include a chip and another discrete component.

An embodiment of this application further provides a wireless communications system. The system includes at least one first access point and at least one first STA in the foregoing aspects.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A communication method, applied for an access point (AP), the method comprising:

determining, a transmission bandwidth, which is used for the AP communicating with one or more stations (STAs), wherein the transmission bandwidth is 320 MHz including four independent 80 MHz transmission bandwidths, and the 320 MHz transmission bandwidth comprises 4096 subcarriers;

wherein the 320 MHz transmission bandwidth comprises 12 left-sideband subcarriers and 11 right-sideband subcarriers, and wherein four 996-subcarrier resource units (RUS) exist between the 12 left-sideband subcarriers and the 11 right-sideband subcarriers, and the four 996-RUs are located in [−2036: −1539 −1533: −1036], [−1035: −538-532: −35], [35: 532 538: 1035] and [1036: 1533 1539: 2036], and null subcarriers of each 996-subcarrier RU are located in [−1538: −1534], [−537: −533], [533: 537], and [1534: 1538], and one 52-subcarrier RU located in [−34: −9 9: 34] and direct current subcarriers are included between a second 996-subcarrier RU and a third 996-subcarrier RU;

communicating a physical protocol data unit (PPDU), with the one or more stations (STAs) by using the transmission bandwidth, wherein the PPDU carries indication information indicating whether the 52-subcarrier RU located is used;

wherein the PPDU further indicates M channel estimation subcarriers, which are comprised in a first extremely high throughput (EHT) signaling field of the PPDU, wherein M is determined by the AP based on a quantity of subcarriers used in a second EHT signaling field of the PPDU and a quantity of channel estimation subcarriers provided by a legacy preamble of the PPDU and a binary phase shift keying (BPSK) symbol field of the PPDU within a range of a second bandwidth, and M is a positive integer; and wherein the second bandwidth is $2^N$ times a first bandwidth, N is 0 or a positive integer, and the first bandwidth and the second bandwidth are part of the transmission bandwidth.

2. The communication method according to claim 1, wherein a sequence number range of the 12 left-sideband subcarriers is [−2048: −2037], and a sequence number range of the 11 right-sideband subcarriers is [2037: 2047].

3. The communication method according to claim 1, wherein a subcarrier sequence number range of a first RU in the four 996-subcarrier RUs is [−2036: −1539, −1533: −1036]; and a sequence number range of the null subcarrier of the first RU is [−1538: −1534].

4. The communication method according to claim 1, wherein a subcarrier sequence number range of a fourth RU in the four 996-subcarrier RUs is [1036: 1533, 1539: 2036]; and a sequence number range of the null subcarrier of the fourth RU is [1534: 1538].

5. The communication method according to claim 1, wherein the center of the 996 subcarriers comprise five null subcarriers.

6. The communication method according to claim 1, wherein a center of the transmission bandwidth includes 69 direct current subcarriers.

7. A communication method, applied for a station (STA), the method comprising:

communicating a physical protocol data unit (PPDU), with an access point (AP) using a transmission bandwidth which is used for the AP communicating with one or more stations (STAs);

wherein the 320 MHz transmission bandwidth comprises 12 left-sideband subcarriers and 11 right-sideband subcarriers, and wherein four 996-subcarrier resource units (RUs) exist between the 12 left-sideband subcarriers and the 11 right-sideband subcarriers, and the four 996-RUs are located in [−2036: −1539 −1533: −1036], [−1035: −538–532: −35], [35: 532 538: 1035] and [1036: 1533 1539: 2036], and null subcarriers of each 996-subcarrier RU are located in [−1538: −1534], [−537: −533], [533: 537], and [1534: 1538], and one 52-subcarrier RU located in [−34: −9 9: 34] and direct current subcarriers are included between a second 996-subcarrier RU and a third 996-subcarrier RU;

wherein the transmission bandwidth is 320 MHz including four independent 80 MHz transmission bandwidths, and the 320 MHz transmission bandwidth comprises 4096 subcarriers; and wherein the PPDU carries indication information indicating whether the 52-subcarrier RU located is used;

wherein the PPDU further indicates M channel estimation subcarriers, which are comprised in a first extremely high throughput (EHT) signaling field of the PPDU, wherein M is determined by the AP based on a quantity of subcarriers used in a second EHT signaling field of the PPDU and a quantity of channel estimation subcarriers provided by a legacy preamble of the PPDU and a binary phase shift keying (BPSK) symbol field of the PPDU within a range of a second bandwidth, and M is a positive integer; and wherein the second bandwidth is $2^N$ times a first bandwidth, N is 0 or a positive integer, and the first bandwidth and the second bandwidth are part of the transmission bandwidth.

8. The communication method according to claim 7, wherein a sequence number range of the 12 left-sideband subcarriers is [−2048: −2037], and a sequence number range of the 11 right-sideband subcarriers is [2037: 2047].

9. The communication method according to claim 7, wherein a subcarrier sequence number range of a first RU in the four 996-subcarrier RUs is [−2036: −1539, −1533: −1036]; and a sequence number range of the null subcarrier of the first RU is [−1538: −1534].

10. The communication method according to claim 7, wherein a subcarrier sequence number range of a fourth RU in the four 996-subcarrier RUs is [1036: 1533, 1539: 2036]; and a sequence number range of the null subcarrier of the fourth RU is [1534: 1538].

11. The communication method according to claim 7, wherein the center of the 996 subcarriers comprise five null subcarriers.

12. The communication method according to claim 7, wherein a center of the transmission bandwidth includes 69 direct current subcarriers.

13. An apparatus, comprising a processor, wherein the processor is configured to execute computer program instructions stored in a memory to cause the apparatus to perform:

determining, a transmission bandwidth, which is used for an access point (AP) communicating with one or more stations (STAs), wherein the transmission bandwidth is 320 MHz including four independent 80 MHz transmission bandwidths, and the 320 MHz transmission bandwidth comprises 4096 subcarriers;

wherein the 320 MHz transmission bandwidth comprises 12 left-sideband subcarriers and 11 right-sideband subcarriers, and wherein four 996-subcarrier resource units (RUs) exist between the 12 left-sideband subcarriers and the 11 right-sideband subcarriers, and the four 996-RUs are located in [−2036: −1539 −1533: −1036], [−1035: −538-532: −35], [35: 532 538: 1035] and [1036: 1533 1539: 2036], and null subcarriers of each 996-subcarrier RU are located in [−1538: −1534], [−537: −533], [533: 537], and [1534: 1538], and one 52-subcarrier RU located in [−34: −9 9: 34] and direct current subcarriers are included between a second 996-subcarrier RU and a third 996-subcarrier RU;

communicating a physical protocol data unit (PPDU), with the one or more stations (STAs) by using the transmission bandwidth, wherein the PPDU carries indication information indicating whether the 52-subcarrier RU located is used;

wherein the PPDU further indicates M channel estimation subcarriers, which are comprised in a first extremely high throughput (EHT) signaling field of the PPDU, wherein M is determined by the AP based on a quantity of subcarriers used in a second EHT signaling field of the PPDU and a quantity of channel estimation subcarriers provided by a legacy preamble of the PPDU and a binary phase shift keying (BPSK) symbol field of the PPDU within a range of a second bandwidth, and M is a positive integer; and wherein the second bandwidth is $2^N$ times a first bandwidth, N is 0 or a positive integer, and the first bandwidth and the second bandwidth are part of the transmission bandwidth.

14. The apparatus according to claim 13, wherein a sequence number range of the 12 left-sideband subcarriers is [−2048: −2037], and a sequence number range of the 11 right-sideband subcarriers is [2037: 2047].

15. The apparatus according to claim 13, wherein a subcarrier sequence number range of a first RU in the four 996-subcarrier RUs is [−2036: −1539, −1533: −1036]; and a sequence number range of the null subcarrier of the first RU is [−1538: −1534].

16. The apparatus according to claim 13, wherein a subcarrier sequence number range of a fourth RU in the four 996-subcarrier RUs is [1036: 1533, 1539: 2036]; and a sequence number range of the null subcarrier of the fourth RU is [1534: 1538].

17. The apparatus according to claim 13, wherein the center of the 996 subcarriers comprise five null subcarriers.

18. The apparatus according to claim 13, wherein a center of the transmission bandwidth includes 69 direct current subcarriers.

* * * * *